(12) United States Patent
Brown et al.

(10) Patent No.: US 9,928,029 B2
(45) Date of Patent: Mar. 27, 2018

(54) DEVICE, METHOD, AND GRAPHICAL USER INTERFACE FOR PROVIDING AUDIOVISUAL FEEDBACK

(71) Applicant: Apple Inc., Cupertino, CA (US)

(72) Inventors: Matthew I. Brown, San Francisco, CA (US); Avi E. Cieplinski, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 188 days.

(21) Appl. No.: 14/866,570

(22) Filed: Sep. 25, 2015

(65) Prior Publication Data
US 2017/0068511 A1 Mar. 9, 2017

Related U.S. Application Data

(60) Provisional application No. 62/215,244, filed on Sep. 8, 2015.

(51) Int. Cl.
G06F 3/16 (2006.01)
G06F 3/0482 (2013.01)
(Continued)

(52) U.S. Cl.
CPC ............ G06F 3/167 (2013.01); G06F 3/0482 (2013.01); G06F 3/0488 (2013.01);
(Continued)

(58) Field of Classification Search
CPC ................................................... G06F 3/0482
(Continued)

(56) References Cited

U.S. PATENT DOCUMENTS 5,367,631 A   11/1994   Levy
5,687,331 A   11/1997   Volk et al.
(Continued)

FOREIGN PATENT DOCUMENTS

AU   2015101204 A4   10/2015
EP   0 609 819 A1    8/1994
(Continued)

OTHER PUBLICATIONS

Office Action, dated Nov. 18, 2016, received in U.S. Appl. No. 14/867,004, 12 pages.
(Continued)

Primary Examiner — William Titcomb
(74) Attorney, Agent, or Firm — Morgan, Lewis & Bockius LLP

(57) ABSTRACT

An electronic device provides data to present a user interface with a plurality of user interface objects. A current focus is on a first user interface object of the plurality of user interface objects. The device receives an input. In response, the device provides data to move the current focus from the first user interface object to a second user interface object based on a direction and/or magnitude of the input, and provides sound information to provide a sound output concurrently with the movement of the current focus from the first user interface object to the second user interface object. A pitch of the sound output is based on a size of the first user interface object, a type of the first user interface object, a size of the second user interface object, and/or a type of the second user interface object.

27 Claims, 70 Drawing Sheets

(51) Int. Cl.
*G06F 3/0484* (2013.01)
*G06F 3/0488* (2013.01)

(52) U.S. Cl.
CPC ...... *G06F 3/04845* (2013.01); *G06F 3/04847* (2013.01); *G06F 3/165* (2013.01)

(58) Field of Classification Search
USPC ........................................................ 715/727
See application file for complete search history.

(56) References Cited

U.S. PATENT DOCUMENTS

| | | | |
|---|---|---|---|
| 5,973,694 | A | 10/1999 | Steele et al. |
| 7,109,975 | B2 | 9/2006 | Fedorak et al. |
| 7,331,869 | B2 | 2/2008 | Blanco |
| 7,552,396 | B1 | 6/2009 | Bicheno et al. |
| 8,943,036 | B1 | 1/2015 | Coudron |
| 8,963,847 | B2 | 2/2015 | Hunt |
| 8,984,436 | B1 | 3/2015 | Tseng et al. |
| 9,189,094 | B2 | 11/2015 | Morikawa et al. |
| 9,383,904 | B2 | 7/2016 | Lee et al. |
| 9,591,224 | B2 | 3/2017 | Jung et al. |
| 2001/0030667 | A1 | 10/2001 | Kelts |
| 2002/0120934 | A1 | 8/2002 | Abrahams |
| 2003/0004638 | A1 | 1/2003 | Villers et al. |
| 2004/0210851 | A1 | 10/2004 | Premchandran et al. |
| 2004/0263472 | A1 | 12/2004 | Tachikawa |
| 2005/0212757 | A1 | 9/2005 | Marvit et al. |
| 2006/0236251 | A1 | 10/2006 | Kataoka et al. |
| 2006/0268100 | A1 | 11/2006 | Karukka et al. |
| 2007/0021108 | A1 | 1/2007 | Bocking et al. |
| 2007/0055947 | A1 | 3/2007 | Ostojic et al. |
| 2007/0192734 | A1 | 8/2007 | Berstis et al. |
| 2008/0062128 | A1 | 3/2008 | Brodersen et al. |
| 2008/0104537 | A1 | 5/2008 | Scott |
| 2008/0229206 | A1 | 9/2008 | Seymour et al. |
| 2009/0007016 | A1 | 1/2009 | Lindberg et al. |
| 2009/0013254 | A1* | 1/2009 | Walker .................. G06F 3/0482 715/727 |
| 2009/0121903 | A1 | 5/2009 | Misage |
| 2009/0167701 | A1 | 7/2009 | Ronkainen |
| 2009/0177989 | A1 | 7/2009 | Ma et al. |
| 2010/0042947 | A1 | 2/2010 | Ostojic et al. |
| 2010/0194682 | A1 | 8/2010 | Orr et al. |
| 2010/0231534 | A1 | 9/2010 | Chaudhri et al. |
| 2011/0148774 | A1 | 6/2011 | Pihlaja |
| 2011/0185309 | A1 | 7/2011 | Challinor et al. |
| 2011/0231798 | A1 | 9/2011 | Cok |
| 2011/0302532 | A1 | 12/2011 | Missig |
| 2012/0015693 | A1 | 1/2012 | Choi et al. |
| 2012/0019732 | A1 | 1/2012 | Lee et al. |
| 2012/0030569 | A1 | 2/2012 | Migos et al. |
| 2012/0038571 | A1 | 2/2012 | Susani |
| 2012/0047462 | A1 | 2/2012 | Moon et al. |
| 2012/0066593 | A1 | 3/2012 | Schneider |
| 2012/0070129 | A1 | 3/2012 | Lin et al. |
| 2012/0233640 | A1 | 9/2012 | Odryna et al. |
| 2013/0055119 | A1 | 2/2013 | Luong |
| 2013/0097564 | A1 | 4/2013 | Morikawa et al. |
| 2013/0246932 | A1 | 9/2013 | Zaveri et al. |
| 2013/0263251 | A1 | 10/2013 | Fleizach et al. |
| 2013/0300682 | A1 | 11/2013 | Choi et al. |
| 2013/0307792 | A1 | 11/2013 | Andres et al. |
| 2014/0053113 | A1 | 2/2014 | Zoon et al. |
| 2014/0115522 | A1 | 4/2014 | Kataoka et al. |
| 2014/0118251 | A1 | 5/2014 | Liang et al. |
| 2014/0143733 | A1 | 5/2014 | Jung et al. |
| 2014/0176479 | A1 | 6/2014 | Wardenaar |
| 2014/0191954 | A1 | 7/2014 | Marvit et al. |
| 2014/0191983 | A1 | 7/2014 | Choi et al. |
| 2014/0240239 | A1 | 8/2014 | Takahashi et al. |
| 2014/0270708 | A1 | 9/2014 | Girgensohn et al. |
| 2014/0292685 | A1 | 10/2014 | Meegan et al. |
| 2014/0292706 | A1 | 10/2014 | Hunt et al. |
| 2014/0325368 | A1 | 10/2014 | Cragun et al. |
| 2015/0007025 | A1 | 1/2015 | Sassi et al. |
| 2015/0035753 | A1 | 2/2015 | Bystrov et al. |
| 2015/0058796 | A1 | 2/2015 | Thakur et al. |
| 2015/0074603 | A1 | 3/2015 | Abe et al. |
| 2015/0077326 | A1 | 3/2015 | Kramer et al. |
| 2015/0078634 | A1 | 3/2015 | Mankowski |
| 2015/0185877 | A1 | 7/2015 | Watanabe et al. |
| 2015/0189215 | A1 | 7/2015 | Kameoka |
| 2015/0195335 | A1 | 7/2015 | Park |
| 2015/0346984 | A1 | 12/2015 | Flint et al. |
| 2015/0358685 | A1 | 12/2015 | Adjesson |
| 2015/0370425 | A1 | 12/2015 | Chen et al. |
| 2016/0224235 | A1 | 8/2016 | Forsstrom et al. |
| 2016/0370956 | A1 | 12/2016 | Penha et al. |
| 2016/0370957 | A1 | 12/2016 | Penha et al. |
| 2016/0370976 | A1 | 12/2016 | Penha et al. |
| 2016/0370982 | A1 | 12/2016 | Penha et al. |
| 2017/0055039 | A1 | 2/2017 | Earle |
| 2017/0068410 | A1 | 3/2017 | Alonzo Ruiz et al. |
| 2017/0068430 | A1 | 3/2017 | Brown et al. |

FOREIGN PATENT DOCUMENTS

| | | |
|---|---|---|
| EP | 0 890 910 A2 | 1/1999 |
| EP | 2 209 311 A1 | 7/2010 |
| GB | 2409017 A | 6/2005 |
| KR | 2011-0118802 A | 11/2011 |
| KR | 2014-0083300 A | 7/2014 |
| WO | WO 98/21645 | 5/1998 |
| WO | WO 2005/103863 A2 | 11/2005 |
| WO | WO 2009/136236 A1 | 11/2009 |
| WO | WO 2010/078523 A1 | 7/2010 |
| WO | WO 2011/100623 A2 | 8/2011 |
| WO | WO 2011/149357 A1 | 12/2011 |
| WO | WO 2011/156161 A2 | 12/2011 |
| WO | WO 2013/094991 A1 | 6/2013 |
| WO | WO 2013/169842 A2 | 11/2013 |
| WO | WO 2013/169849 A2 | 11/2013 |
| WO | WO 2013/169865 A2 | 11/2013 |
| WO | WO 2013/169875 A2 | 11/2013 |
| WO | WO 2014/105278 A1 | 7/2014 |
| WO | WO 2014/105279 A1 | 7/2014 |
| WO | WO 2014/143633 A1 | 9/2014 |

OTHER PUBLICATIONS

Notice of Allowance, dated Mar. 10, 2017, received in U.S. Appl. No. 14/867,004, 5 pages.
Office Action, dated Dec. 15, 2016, received in Chinese Patent Application No. 201620468315.3, which corresponds with U.S. Appl. No. 14/867,004, 1 page.
Office Action, dated Mar. 2, 2017, received in Danish Patent Appplicaiton No. 201500590, which corresponds with U.S. Appl. No. 14/867,004, 3 pages.
Office Action, dated Nov. 30, 2016, received in Australian Patent Application No. 2016101667, which corresponds with U.S. Appl. No. 14/868,298, 6 pages.
Office Action, dated Dec. 15, 2016, received in Chinese Patent Application No. 201620468752.5, which corresponds with U.S. Appl. No. 14/868,298, 3 page.
Notice of Allowance, dated Dec. 16, 2016, received in U.S. Appl. No. 14/872,042, 11 pages.
International Search Report and Written Opinion, dated Dec. 12, 2016, received in International Patent Application No. PCT/US2016/046412, which corresponds with U.S. Appl. No. 14/867,004, 20 pages.
International Search Report and Written Opinion, dated Jan. 19, 2017, received in International Patent Application No. PCT/US2016/046409, which corresponds with U.S. Appl. No. 14/866,570, 18 pages.
Notice of Allowance, dated Mar. 28, 2016, received in U.S. Appl. No. 14/867,004, 12 pages.
Office Action, dated Apr. 11, 2016, received in Danish Patent Application No. 201500583, which corresponds with U.S. Appl. No. 14/866,570, 8 pages.

(56) References Cited

OTHER PUBLICATIONS

Office Action, dated Apr. 7, 2016, received in Danish Patent Application No. 201500586, which corresponds with U.S. Appl. No. 14/866,986, 8 pages.
Dolby Laboratories, "Kogan KALED39SMTWA User Manual," https://assets.kogan.com/files/usermanuals/KALED39SMTWA-A, Oct. 12, 2012, 38 pages.
Notice of Allowance, dated Jul. 26, 2016, received in U.S. Appl. No. 14/867,004, 5 pages.
Office Action, dated Aug. 12, 2016, received in Australian Patent Application No. 2016100650, which corresponds with U.S. Appl. No. 14/867,004, 4 pages.
Office Action, dated Jul. 11, 2016, received in Danish Patent Application No. 201500590, which corresponds with U.S. Appl. No. 14/867,004, 3 pages.
Certificate of Examination, dated Aug. 4, 2016, received in Australian Patent Application No. 2016100651, which corresponds with U.S. Appl. No. 14/866,986, 1 page.
Office Action, dated Jul. 15, 2016, received in Danish Patent Application No. 201500591, which corresponds with U.S. Appl. No. 14/868,298, 4 pages.
Notice of Allowance, dated Jul. 29, 2016, received in U.S. Appl. No. 14/866,986, 6 pages.
Office Action, dated Aug. 29, 2016, received in Chinese Patent Application No. 201620468315.3, which corresponds with U.S. Appl. No. 14/867,004, 1 page.
Certificate of Registration, dated Aug. 29, 2016, received in German Patent Application No. 202016003233.0, which corresponds with U.S. Appl. No. 14/867,004, 3 pages.
Office Action, dated Sep. 9, 2016, received in Danish Patent Application No. 201500590, which corresponds with U.S. Appl. No. 14/867,004, 2 pages.
Office Action, dated Oct. 27, 2016, received in Danish Patent Application No. 201500590, which corresponds with U.S. Appl. No. 14/867,002, 2 pages.
Innovation (unexamined) Patent, dated Sep. 1, 2016, received in Australian Patent Application No. 2016101424, which corresponds with U.S. Appl. No. 14/866,570, 1 page.
Office Action, dated Oct. 28, 2016, received in Australian Patent Application No. 2016101424, which corresponds with U.S. Appl. No. 14/866,570, 7 pages.
Office Action, dated Sep. 19, 2016, received in Danish Patent Application No. 201500583, which corresponds with U.S. Appl. No. 14/866,570, 3 pages.
Innovation (unexamined) Patent, dated Sep. 29, 2016, received in Application No. 2016100651, which corresponds with U.S. Appl. No. 14/866,986, 1 page.
Office Action, dated Sep. 28, 2016, received in Chinese Patent Application No. 201620468752.5, which corresponds with U.S. Appl. No. 14/866,986, 1 page.
Certificate of Registration, dated Aug. 29, 2016, received in German Patent Application No. 202016003250.0, which corresponds with U.S. Appl. No. 14/866,986, 3 pages.
Office Action, dated Sep. 9, 2016, received in Danish Patent Application No. 201500591, which corresponds with U.S. Appl. No. 14/868,298, 2 pages.
Innovation (unexamined) Patent, dated Aug. 18, 2016, received in Australian Patent Application No. 2016101423, which corresponds with U.S. Appl. No. 14/866,986, 1 page.
Office Action, dated Oct. 20, 2016, received in Australian Patent Application No. 2016101423, which corresponds with U.S. Appl. No. 14/866,986, 7 pages.
Office Action, dated Sep. 19, 2016, received in Danish Patent Application No. 201500586, which corresponds with U.S. Appl. No. 14/866,986, 8 pages.

International Search Report and Written Opinion, dated Nov. 3, 2016, received in International Patent Application No. PCT/2016/033641, which corresponds with U.S. Appl. No. 14/867,004, 19 pages.
Christie et al., Remote/TV User Interface Interactions, U.S. Appl. No. 14/262,435, filed Apr. 25, 2014, 155 pages.
Focus (computing)—Wikipedia, the free encyclopedia, https://en.wikipedia.org.wiki/Focus_(computing), 4 pages.
Office Action, dated Mar. 11, 2016, received in Danish Patent Application No. 201500590, which corresponds with U.S. Appl. No. 14/867,004, 9 pages.
Office Action, dated Mar. 8, 2016, received in Danish Patent Application No. 201500591, which corresponds with U.S. Appl. No. 14/868,298, 10 pages.
Office Action, dated Mar. 11, 2016, received in U.S. Appl. No. 14/866,986, 10 pages.
Apple, "Final Cut Pro X: Pan Audio", https://supportapple.com/kb/PH12578?locale=en_US, Apr. 17, 2017, 4 pages.
Reddit, "I Made an Intelligent SMS Notification App that Vibrates Differently Based on the Contents" http://www.reddit.com/r/Android/comments/1uksxi/i_made_an intelligent_sms_notification_app_that/, Jan. 5, 2014, 8 pages.
YouTube,"Hands-On With Immersion HD Integrator Hi-Fi Haptics", http://www.engadget.com, Feb. 23, 2012, 9 pages.
Webster, Customize Vibration Alert with Mumble! [App Review], http://www.androidguys.com/2014/01/21/customize-vibration-alerts-mumble-app-review, Jan. 21, 2014, 5 pages.
Woods, "11 Android Apps to Make Notifications More Interesting", http://www.thenextweb.com, Apr. 19, 2014, 6 pages.
Office Action, dated May 30, 2017, received in Danish Patent Appplicaiton No. 201500590, which corresponds with U.S. Appl. No. 14/867,004, 2 pages.
Intent to Grant, dated Jul. 5, 2017, received in Danish Patent Appplicaiton No. 201500590, which corresponds with U.S. Appl. No. 14/867,004, 2 pages.
Office Action, dated Oct. 17, 2017, received in European Patent Application No. 16730557.2, which corresponds with U.S. Appl. No. 14/867,004, 9 pages.
Office Action, dated Dec. 7, 2017, received in Korean Patent Application No. 2017-7033777, which corresponds with U.S. Appl. No. 14/867,004, 5 pages.
Office Action, dated Apr. 28, 2017, received in Australian Patent Application No. 2016101424, which corresponds with U.S. Appl. No. 14/866,570, 3 pages.
Office Action, dated Aug. 1, 2017, received in Australian Patent Application No. 2017100472, which corresponds with U.S. Appl. No. 14/866,570, 3 pages.
Intent to Grant, dated Jul. 3, 2017, received in Danish Patent Application No. 201500583, which corresponds with U.S. Appl. No. 14/866,570, 2 pages.
Notice of Allowance, dated Oct. 23, 2017, received in Danish Patent Application No. 201500583, which corresponds with U.S. Appl. No. 14/866,570, 2 pages.
Notice of Allowance, dated Oct. 19, 2017, received in U.S. Appl. No. 14/866,525, 9 pages.
Office Action, dated Oct. 4, 2017, received in U.S. Appl. No. 14/868,298, 12 pages.
Office Action, dated Sep. 29, 2017, received in U.S. Appl. No. 14/872,011, 16 pages.
Notice of Allowance, dated Jul. 12, 2017, received in Danish Patent Application No. 201500586, which corresponds with U.S. Appl. No. 14/866,986, 2 pages.
Patent, dated Oct. 23, 2017, received in Danish Patent Application No. 201500586, which corresponds with U.S. Appl. No. 14/866,986, 7 pages.
Extended European Search Report, dated Oct. 13, 2017, received in European Patent Application No. 17175448.4, which corresponds with U.S. Appl. No. 14/867,004, 9 pages.

* cited by examiner

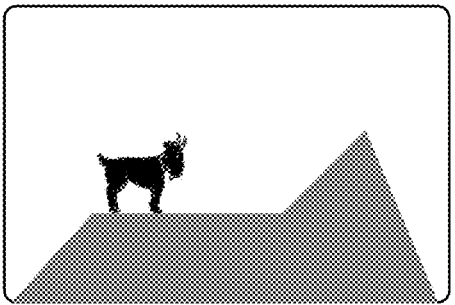
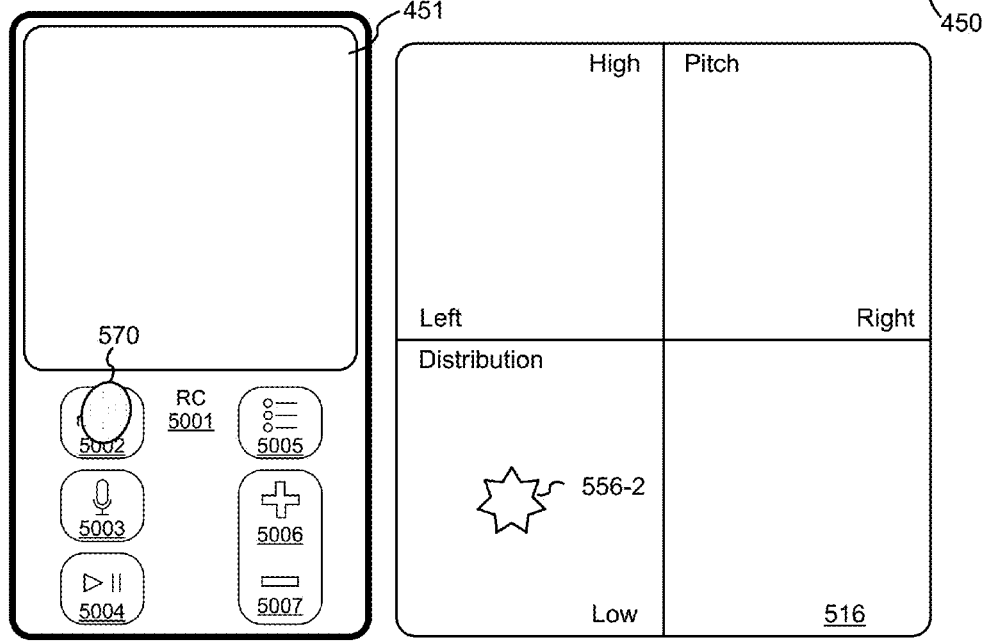
Figure 5FF

600

602
Provide to a display, data to present a user interface generated by the device. The user interface includes a first user interface object with first visual characteristics and a second user interface object with second visual characteristics that is distinct from the first user interface object.

604
The first visual characteristics include a size and/or a location of the first user interface object.

606
The first visual characteristics of the first user interface object and the second visual characteristics of the second user interface object are determined independently of a user input.

608
Provide, to an audio system, sound information to provide a sound output. The sound output includes a first audio component that corresponds to the first user interface object and a second audio component that corresponds to the second user interface object and is distinct from the first audio component.

610
The second audio component is selected based at least in part on the first audio component.

612
While the user interface is being presented on the display and the sound output is being provided: provide, to the display, data to update the user interface and provide, to the audio system, sound information to update the sound output. Updating the user interface and updating the sound output includes: changing at least one visual characteristic of the first visual characteristics of the first user interface object in conjunction with changing the first audio component that corresponds to the first user interface object and changing at least one visual characteristic of the second visual characteristics of the second user interface object in conjunction with changing the second audio component that corresponds to the second user interface object. Providing the data to update the user interface occurs independently of user input.

614
The first audio component that corresponds to the first user interface object is changed in accordance with changes to at least one visual characteristic of the first visual characteristics of the first user interface object.

616
At least one visual characteristic of the first visual characteristics of the first user interface object is changed in accordance with changes to the first audio component.

618
Updating the user interface and updating the sound output further includes: ceasing to display the first user interface object and ceasing to provide a sound output that includes the first audio component that corresponds to the first user interface object; ceasing to display the second user interface object and ceasing to provide a sound output that includes the second audio component that corresponds to the second user interface object; and/or displaying one or more respective user interface objects and providing a sound output that includes one or more respective audio components that correspond to the one or more respective user interface objects.

620
Updating the sound output includes determining whether predetermined inactivity criteria are satisfied; and, in accordance with a determination that the predetermined inactivity criteria are satisfied, changing a volume of the sound output.

Figure 6B

622
A pitch of a respective audio component corresponds to an initial size of a corresponding user interface object, a stereo balance of the respective audio component corresponds to a location of the corresponding user interface object on the display, and/or a change in a volume of the respective audio component corresponds to a change in a size of the corresponding user interface object.

624
Detect a user input. In response to detecting the user input, provide, to the audio system, sound information to change respective audio components that correspond to respective user interface objects and provide, to the display, data to update the user interface and display one or more control user interface objects.

626
The sound information provided to the audio system includes information to provide a sound output that includes an audio component that is not harmonious with the respective audio components that correspond to respective user interface objects.

628
Prior to detecting a user input, provide, to the display, data to display the user interface and update the user interface without providing, to the audio system, sound information to provide the sound output; and, subsequent to detecting the user input, provide, to the display, data to display the user interface and update the user interface and providing, to the audio system, sound information to provide the sound output and update the sound output.

702 Provide, to a display, data to present a user interface with a plurality of user interface objects, including a control user interface object at a first location on the display. The control user interface object is configured to control a respective parameter.

704 Receive a first input that corresponds to a first interaction with the control user interface object on the display

706 While receiving the first input that corresponds to the first interaction with the control user interface object on the display:

708 Provide, to the display, data to move the control user interface object, in accordance with the first input, from the first location on the display to a second location on the display, distinct from the first location on the display

710 In response to receiving the first input that corresponds to the first interaction with the control user interface object on the display: provide, to the display, data to move the control user interface object, in accordance with the first input, from the first location on the display to the second location on the display, distinct from the first location on the display, and visually distinguish the control user interface object in accordance with the first input during the movement of the control user interface object from the first location on the display to the second location on the display.

712 Provide, to an audio system, first sound information to provide a first sound output with one or more characteristics that are different from the respective parameter controlled by the control user interface object and that change in accordance with movement of the control user interface object from the first location on the display to the second location on the display (A)

Figure 7A

712 Provide, to the audio system, first sound information to provide a first sound output with one or more characteristics that are different from the respective parameter controlled by the control user interface object and that change in accordance with movement of the control user interface object from the first location on the display to the second location on the display (A)

714 In accordance with a determination that the first input meets first input criteria, the first sound output has a first set of characteristics.

In accordance with a determination that the first input meets second input criteria, the first sound output has a second set of characteristics that are different from the first set of characteristics.

716 The one or more characteristics include a pitch of the first sound output, a volume of the first sound output, and/or a distribution of the first sound output over a plurality of spatial channels 718 The audio system is coupled with a plurality of speakers that corresponds to a plurality of spatial channels.

Providing, to the audio system, the first sound information to provide the first sound output includes determining a distribution of the first sound output over the plurality of spatial channels in accordance with a direction of the movement of the control user interface object from the first location on the display to the second location on the display.

720 The audio system is coupled with a plurality of speakers that corresponds to a plurality of spatial channels.

Providing, to the audio system, the first sound information to provide the first sound output includes determining a distribution of the first sound output over the plurality of spatial channels in accordance with a location of the control user interface object on the display during the movement of the control user interface object from the second location on the display to the third location on the display.

802 Provide, to a display, data to present a first user interface with a plurality of user interface objects, where a current focus is on a first user interface object of the plurality of user interface objects

↓

804 While the display is presenting the first user interface, receive an input that corresponds to a request to change a location of the current focus in the first user interface, the input having a direction and a magnitude

↓

806 In response to receiving the input that corresponds to the request to change the location of the current focus in the first user interface: provide, to the display, data to move the current focus from the first user interface object to a second user interface object, where the second user interface object is selected for the current focus in accordance with the direction and/or the magnitude of the input; and provide, to an audio system, first sound information to provide a first sound output that corresponds to the movement of the current focus from the first user interface object to the second user interface object, where the first sound output is provided concurrently with display of the current focus moving from the first user interface object to the second user interface object, and a pitch of the first sound output is determined based at least in part on a size of the first user interface object, a type of the first user interface object, a size of the second user interface object, and/or a type of the second user interface object.

| 808 The volume of the first sound output is determined based on the magnitude of the input |

| 810 The volume of the first sound output is reduced in accordance with a determination that the magnitude of the input satisfies predefined input criteria |

| 812 A release of the first sound output is reduced in accordance with a determination that the magnitude of the input satisfies predefined input criteria |

| 814 A distribution of the first sound output over a plurality of spatial channels is adjusted in accordance with a location of the second user interface object in the first user interface |

816 The pitch of the first sound output is determined based on the size of the second user interface object and/or the type of the second user interface objects.

In response to receiving the input that corresponds to the request to change the location of the current focus in the first user interface, provide, to the audio system, second sound information to provide a second sound output that corresponds to the movement of the current focus from the first user interface object to the second user interface object, where a pitch of the second sound output is determined based at least in part on the size of the first user interface object and/or the type of the first user interface object.

818 In response to receiving one or more inputs that correspond to one or more requests to change the location of the current focus in the first user interface: provide, to the display, data to move the current focus from the second user interface object to a third user interface object; provide, to the audio system, third sound information to provide a third sound output that corresponds to the movement of the current focus from the second user interface object to the third user interface object, where the third sound output is provided concurrently with display of the current focus moving from the second user interface object to the third user interface object; provide, to the display, data to move the current focus from the third user interface object to a fourth user interface object; and provide, to the audio system, fourth sound information to provide a fourth sound output that corresponds to the movement of the current focus from the third user interface object to the fourth user interface object, wherein the fourth sound output is provided concurrently with display of the current focus moving from the third user interface object to the fourth user interface object, where: a sound output that corresponds to the movement of the current focus to a largest object of the second user interface object, the third user interface object, and the fourth user interface object has a pitch that is lower than respective sound outputs that correspond to the movement of the current focus to the remaining two of the second user interface object, the third user interface object, and the fourth user interface object; and a sound output that corresponds to the movement of the current focus to a smallest object of the second user interface object, the third user interface object, and the fourth user interface object has a pitch that is higher than respective sound outputs that correspond to the movement of the current focus to the remaining two of the second user interface object, the third user interface object, and the fourth user interface object.

Figure 8B

820 While the display is presenting the first user interface with the plurality of user interface objects, where the first user interface with the plurality of user interface objects is included in a hierarchy of user interfaces: receive an input that corresponds to a request to replace the first user interface with a second user interface in the hierarchy of user interfaces

822 In response to receiving the input that corresponds to the request to replace the first user interface with the second user interface: provide, to the display, data to replace the first user interface with the second user interface; in accordance with a determination that the first user interface is located above the second user interface in the hierarchy of user interfaces, provide, to the audio system, fifth sound information to provide a fifth sound output; and, in accordance with a determination that the first user interface is located below the second user interface in the hierarchy of user interfaces, provide, to the audio system, sixth sound information to provide a sixth sound output that is distinct from the fifth sound output 824 While the display is presenting the first user interface, receive an input that corresponds to a request to activate a user interface object with the current focus

826 In response to receiving the input that corresponds to the request to activate a user interface object with the current focus: in accordance with a determination that the first user interface object is with the current focus, provide, to the audio system, seventh sound information to provide a seventh sound output that corresponds to the activation of the first user interface object; and, in accordance with a determination that the second user interface object is with the current focus, provide, to the audio system, eighth sound information to provide an eighth sound output that corresponds to the activation of the second user interface object, wherein: the eighth sound output is distinct from the seventh sound output; and a relationship between one or more characteristics of a sound output that corresponds to a movement of the current focus to the first user interface object and the one or more characteristics of the second sound output corresponds to a relationship between the one or more characteristics of the seventh sound output and the one or more characteristics of the eighth sound output

902 Provide, to a display, data to present a first video information user interface that includes descriptive information about a first video > 904 Prior to the display presenting the first video information user interface: provide, to the display, data to present a video selection user interface that includes representations of a plurality of videos; and receive an input that corresponds to a selection of a representation of the first video in the plurality of videos, wherein the first video information user interface for the first video is presented in response to receiving the input that corresponds to the selection of the representation of the first video

906 Provide, to an audio system, sound information to provide a first sound output, which corresponds to the first video, during presentation of the first video information user interface by the display > 908 The first video information user interface includes a plurality of user interface objects.
>
> A first user interface object of the plurality of user interface objects is configured to, when selected, initiate the electronic device providing, to the audio system, sound information to provide a sound output that corresponds to at least a portion of a first soundtrack of the first video.
>
> A second user interface object of the plurality of user interface objects is configured to, when selected, initiate the electronic device providing, to the audio system, sound information to provide a sound output that corresponds to at least a portion of a second soundtrack, distinct from the first soundtrack, of the first video.

910 While the display is presenting the first video information user interface that includes descriptive information about the first video, receive an input that corresponds to a request to playback the first video (A)

Figure 9A

Subsequent to pausing the presenting of the first video at the first playback position in the timeline of the first video and while the presenting of the first video is paused:

(A)

1008 Provide, to the display, data to present a plurality of selected still images from the first video, wherein the plurality of selected still images are selected based on the first playback position at which the first video was paused (B)

1016 The plurality of selected still images of the video includes a still image that is not consecutive in the video to any other still images in the plurality of selected still images

1018 The plurality of selected still images includes representative frames

1020 Provide, to the display, data to present an animation indicating a transition to a slideshow mode

1022 The animation indicating the transition to the slideshow mode includes a count-down clock

1024 Repeat provision, to the display, of the data to present the plurality of selected still images from the first video

1026 Provide, to the display, data to present a respective still image of the plurality of selected still images with a panning effect and/or a zooming effect

1028 The device is in communication with an audio system, and the method includes providing, to the audio system, sound information to provide a first sound output that corresponds to the first video being presented on the display

1030 Provide, to the audio system, sound information to provide a sound output that is selected based on the first playback position at which the first video was paused

Figure 10B

DEVICE, METHOD, AND GRAPHICAL USER INTERFACE FOR PROVIDING AUDIOVISUAL FEEDBACK

RELATED APPLICATIONS

This application claims priority to U.S. Provisional Application Ser. No. 62/215,244, filed Sep. 8, 2015, entitled "Device, Method, and Graphical User Interface for Providing Audiovisual Feedback," which is incorporated by reference herein in its entirety.

This application is related to U.S. Provisional Application Ser. No. 62/181,698, filed Jun. 18, 2015, entitled "Device, Method, and Graphical User Interface for Navigating Media Content;" U.S. Provisional Application Ser. No. 62/215,644, filed Sep. 8, 2015, entitled "Device, Method, and Graphical User Interface for Navigating Media Content;" and U.S. Provisional Application Ser. No. 62/215,252, filed Sep. 8, 2015, entitled "Devices, Methods, and Graphical User Interfaces for Moving a Current Focus Using a Touch-Sensitive Remote Control," all of which are incorporated by reference herein in their entireties.

TECHNICAL FIELD

This relates generally to electronic devices that provide sound output, and more particularly, electronic devices that provide sound output in conjunction with graphical user interfaces.

BACKGROUND

Many electronic devices utilize audiovisual interfaces as a way of providing feedback about user's interactions with the devices. But conventional methods for providing audiovisual feedback are limited. For example, simple audiovisual feedback provides only limited information to a user. If unintended operations are performed based on the simple audiovisual feedback, the user needs to provide additional inputs to undo such operations. Thus, these methods take longer than necessary, thereby wasting energy.

SUMMARY

Accordingly, there is a need for electronic devices with more effective methods and interfaces for providing audiovisual feedback. Such methods and interfaces optionally complement or replace conventional methods for providing audiovisual feedback. Such methods and interfaces reduce the number, extent, and/or nature of the inputs from a user and produce a more efficient human-machine interface. Further, such methods reduce the processing power consumed to process touch inputs, conserve power, reduce unnecessary/extraneous/repetitive inputs, and potentially reduce memory usage.

The above deficiencies and other problems associated with user interfaces for electronic devices with touch-sensitive surfaces are reduced or eliminated by the disclosed devices. In some embodiments, the device is a digital media player, such as Apple TV® from Apple Inc. of Cupertino, Calif. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through a remote control (e.g., one or more buttons of the remote control and/or a touch-sensitive surface of the remote control). Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at an electronic device with one or more processors and memory. The device is in communication with a display and an audio system. The method includes providing, to the display, data to present a user interface generated by the device. The user interface includes a first user interface object with first visual characteristics. The user interface further includes a second user interface object with second visual characteristics that is distinct from the first user interface object. The device provides sound information to provide a sound output to the audio system. The sound output includes a first audio component that corresponds to the first user interface object. The sound output further includes a second audio component that corresponds to the second user interface object and is distinct from the first audio component. While the user interface is being presented on the display and the sound output is being provided, the device provides data to update the user interface to the display and provides sound information to update the sound output to the audio system. Updating the user interface and updating the sound output includes changing at least one visual characteristic of the first visual characteristics of the first user interface object in conjunction with changing the first audio component that corresponds to the first user interface object, and changing at least one visual characteristic of the second visual characteristics of the second user interface object in conjunction with changing the second audio component that corresponds to the second user interface object. Providing the data to update the user interface occurs independently of user input.

In accordance with some embodiments, a method is performed at an electronic device with one or more processors and memory. The device is in communication with a display and an audio system. The method includes providing, to the display, data to present a user interface with a plurality of user interface objects, including a control user interface object at a first location on the display. The control user interface object is configured to control a respective parameter. The method further includes receiving a first input that corresponds to a first interaction with the control user interface object on the display. The method further includes, while receiving the first input that corresponds to the first interaction with the control user interface object on the display: providing, to the display, data to move the control user interface object, in accordance with the first input, from the first location on the display to a second location on the display, distinct from the first location on the display; and providing, to the audio system, first sound information to provide a first sound output with one or more characteristics that are different from the respective parameter controlled by the control user interface object and that change in accordance with movement of the control user interface object from the first location on the display to the second location on the display.

In accordance with some embodiments, a method is performed at an electronic device with one or more processors and memory. The device is in communication with a display and an audio system. The method includes providing, to the display, data to present a first user interface with a plurality of user interface objects, where a current focus is on a first user interface object of the plurality of user interface objects. The method further includes, while the display is presenting the first user interface, receiving an input that corresponds to a request to change a location of the current focus in the first user interface, the input having a direction and a magnitude. The method further includes, in response to receiving the input that corresponds to the request to change the location of the current focus in the first user interface: providing, to the display, data to move the current focus from the first user interface object to a second user interface object, where the second user interface object is selected for the current focus in accordance with the direction and/or the magnitude of the input; and, providing, to the audio system, first sound information to provide a first sound output that corresponds to the movement of the current focus from the first user interface object to the second user interface object, where the first sound output is provided concurrently with display of the current focus moving from the first user interface object to the second user interface object, and a pitch of the first sound output is determined based at least in part on a size of the first user interface object, a type of the first user interface object, a size of the second user interface object, and/or a type of the second user interface object.

In accordance with some embodiments, a method is performed at an electronic device with one or more processors and memory. The device is in communication with a display and an audio system. The method includes providing, to the display, data to present a first video information user interface that includes descriptive information about a first video. The method further includes providing, to the audio system, sound information to provide a first sound output, which corresponds to the first video, during presentation of the first video information user interface by the display. The method further includes, while the display is presenting the first video information user interface that includes descriptive information about the first video, receiving an input that corresponds to a request to playback the first video. The method further includes, in response to receiving the input that corresponds to the request to playback the first video, providing, to the display, data to replace presentation of the first video information user interface with playback of the first video. The method further includes, during the playback of the first video, receiving an input that corresponds to a request to display a second video information user interface about the first video. The method further includes, in response to receiving the input that corresponds to the request to display the second video information user interface about the first video: providing, to the display, data to replace the playback of the first video with the second video information user interface about the first video, and providing, to the audio system, sound information to provide a second sound output, distinct from the first sound output, that corresponds to the first video, during presentation of the second video information user interface by the display.

In accordance with some embodiments, a method is performed at an electronic device with one or more processors and memory. The device is in communication with a display. The method includes providing, to the display, data to present a first video. The method also includes, while the display is presenting the first video, receiving an input that corresponds to a user request to pause the first video; and, in response to receiving the input that corresponds to the user request to pause the first video, pausing the presenting of the first video at a first playback position in a timeline of the first video. The method further includes, subsequent to pausing the presenting of the first video at the first playback position in the timeline of the first video and while the presenting of the first video is paused, providing, to the display, data to present a plurality of selected still images from the first video. The plurality of selected still images is selected based on the first playback position at which the first video was paused.

In accordance with some embodiments, an electronic device is in communication with a display unit configured to display a user interface and an audio unit configured to provide sound outputs. The device includes a processing unit configured to provide, to the display unit, data to present a user interface generated by the device. The user interface includes a first user interface object with first visual characteristics. The user interface further includes a second user interface object with second visual characteristics that is distinct from the first user interface object. The device is configured to provide, to the audio unit, sound information to provide a sound output. The sound output includes a first audio component that corresponds to the first user interface object. The sound output further includes a second audio component that corresponds to the second user interface object and is distinct from the first audio component. While the user interface is being presented on the display unit and the sound output is being provided by the audio unit, the device provides data to update the user interface to the display unit and provides sound information to update the sound output to the audio unit. Updating the user interface and updating the sound output includes changing at least one visual characteristic of the first visual characteristics of the first user interface object in conjunction with changing the first audio component that corresponds to the first user interface object, and changing at least one visual characteristic of the second visual characteristics of the second user interface object in conjunction with changing the second audio component that corresponds to the second user interface object. Providing the data to update the user interface occurs independently of user input.

In accordance with some embodiments, an electronic device is in communication with a display unit configured to display a user interface, an audio unit configured to provide sound outputs, and optionally, a remote control unit (which optionally includes a touch-sensitive surface unit) configured to detect user inputs and send them to the electronic device. The device includes a processing unit configured to provide, to the display unit, data to present a user interface with a plurality of user interface objects, including a control user interface object at a first location on the display unit. The control user interface object is configured to control a respective parameter. The processing unit is further configured to receive a first input that corresponds to a first interaction with the control user interface object on the display unit. The processing unit is further configured to, while receiving the first input that corresponds to the first interaction with the control user interface object on the display unit: provide, to the display unit, data to move the control user interface object, in accordance with the first input, from the first location on the display unit to a second location on the display unit, distinct from the first location on the display unit; and provide, to the audio unit, first sound information to provide a first sound output with one or more characteristics that are different from the respective parameter controlled by the control user interface object and that change in accordance with movement of the control user interface object from the first location on the display unit to the second location on the display unit.

In accordance with some embodiments, an electronic device is in communication with a display unit configured to display a user interface, an audio unit configured to provide sound outputs, and optionally, a remote control unit (which optionally includes a touch-sensitive surface unit) configured to detect user inputs and send them to the electronic device. The device includes a processing unit configured to provide, to the display unit, data to present a first user interface with a plurality of user interface objects, where a current focus is on a first user interface object of the plurality of user interface objects. The processing unit is further configured to, while the display unit is presenting the first user interface, receive an input that corresponds to a request to change a location of the current focus in the first user interface, the input having a direction and a magnitude. The processing unit is further configured to, in response to receiving the input that corresponds to the request to change the location of the current focus in the first user interface: provide, to the display unit, data to move the current focus from the first user interface object to a second user interface object, where the second user interface object is selected for the current focus in accordance with the direction and/or the magnitude of the input; and, provide, to the audio unit, first sound information to provide a first sound output that corresponds to the movement of the current focus from the first user interface object to the second user interface object, where the first sound output is provided concurrently with display of the current focus moving from the first user interface object to the second user interface object, and a pitch of the first sound output is determined based at least in part on a size of the first user interface object, a type of the first user interface object, a size of the second user interface object, and/or a type of the second user interface object.

In accordance with some embodiments, an electronic device is in communication with a display unit configured to display a user interface, an audio unit configured to provide sound outputs, and optionally, a remote control unit (which optionally includes a touch-sensitive surface unit) configured to detect user inputs and send them to the electronic device. The device includes a processing unit configured to provide, to the display unit, data to present a first video information user interface that includes descriptive information about a first video. The processing unit is also configured to provide, to the audio unit, sound information to provide a first sound output, which corresponds to the first video, during presentation of the first video information user interface by the display unit. The processing unit is further configured to, while the display unit is presenting the first video information user interface that includes descriptive information about the first video, receive an input that corresponds to a request to playback the first video. The processing unit is further configured to, in response to receiving the input that corresponds to the request to playback the first video, provide, to the display unit, data to replace presentation of the first video information user interface with playback of the first video. The processing unit is further configured to, during the playback of the first video, receive an input that corresponds to a request to display a second video information user interface about the first video. The processing unit is further configured to, in response to receiving the input that corresponds to the request to display the second video information user interface about the first video: provide, to the display unit, data to replace the playback of the first video with the second video information user interface about the first video, and provide, to the audio unit, sound information to provide a second sound output, distinct from the first sound output, that corresponds to the first video, during presentation of the second video information user interface by the display unit.

In accordance with some embodiments, an electronic device includes a processing unit. The electronic device is in communication with a display unit. The display unit is configured to display video playback information. The processing unit is configured to provide, to the display unit, data to present a first video; while the display unit is presenting the first video, receive an input that corresponds to a user request to pause the first video; in response to receiving the input that corresponds to the user request to pause the first video, pause the presenting of the first video at a first playback position in a timeline of the first video; and, subsequent to pausing the presenting of the first video at the first playback position in the timeline of the first video and while the presenting of the first video is paused, provide, to the display unit, data to present a plurality of selected still images from the first video, wherein the plurality of selected still images are selected based on the first playback position at which the first video was paused.

In accordance with some embodiments, an electronic device is in communication with a display, an audio system, and optionally a remote control (which optionally includes a touch-sensitive surface). The electronic device includes one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium (e.g., a non-transitory computer readable storage medium, or alternatively, a transitory computer readable storage medium) has stored therein instructions, which, when executed by an electronic device that is in communication with a display and an audio system, cause the device to perform or cause performance of the operations of any of the methods described herein. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device is in communication with a display and an audio system. The electronic device includes means for performing or causing performance of the operations of any of the methods described herein. In accordance with some embodiments, an information processing apparatus, for use in an electronic device that is in communication with a display and an audio system, includes means for performing or causing performance of the operations of any of the methods described herein.

Thus, electronic devices in communication with displays and audio systems are provided with improved methods and interfaces for providing audiovisual feedback, thereby increasing the effectiveness, efficiency, and user satisfaction with such devices. Such methods and interfaces may complement or replace conventional methods for providing audiovisual feedback.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams illustrating a method of changing visual characteristics of a user interface object in conjunction with changing audio components corresponding to the user interface object, in accordance with some embodiments.

FIGS. 7A-7D are flow diagrams illustrating a method of providing sound information corresponding to a user's interaction with a user interface object, in accordance with some embodiments.

FIGS. 8A-8C are flow diagrams illustrating a method of providing sound information corresponding to a user's interaction with a user interface object, in accordance with some embodiments.

FIGS. 9A-9C are flow diagrams illustrating a method of providing sound information for a video information user interface, in accordance with some embodiments.

FIGS. 10A-10B illustrate a flow diagram of a method of providing audiovisual information while a video is in a paused state, in accordance with some embodiments.

DESCRIPTION OF EMBODIMENTS

Figure 1A:
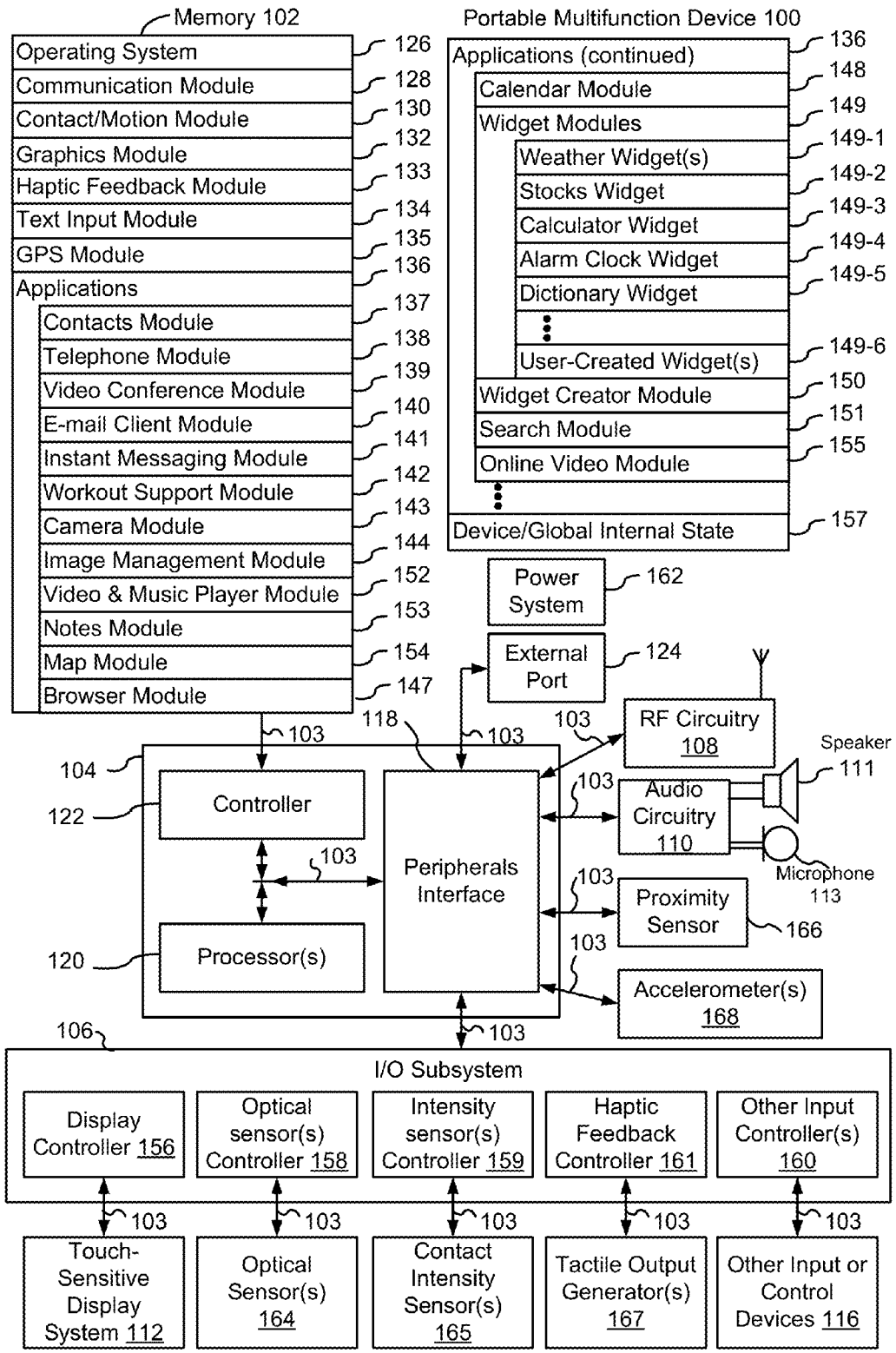
FIG. 1A is a block diagram illustrating a portable multifunction device with a touch-sensitive display in accordance with some embodiments.

Many electronic devices update graphical user interfaces and provide audio feedback in response to user inputs. Conventional methods include providing simple audio feedback in response to a same user input. For example, in response to each user input that corresponds to a request to move a current focus, a same audio feedback is provided. Such simple audio feedback does not provide context of the devices' response. If the user does not fully understand the context of the interactions, the user may perform unintended operations. The unintended operations can be frustrating for the user. In addition, such unintended operations require undoing such unintended operations and providing again user inputs until desired operations are performed, which can be cumbersome and inefficient.

In some embodiments described below, an improved method for providing audio feedback includes providing data to present a user interface with a control user interface object (e.g., a thumb of a slider). While receiving an input, data is provided to move the control user interface object and sound information is provided for a sound output with characteristics that change with the movement of the control user interface object. Thus, the characteristics of the sound output indicate the movement of the control user interface object.

In addition, in some other embodiments described below, an improved method for providing audio feedback includes providing data to present a user interface with a plurality of icons, where a current focus is on a first icon. In response to receiving an input, data is provided to move the current focus to a second icon and sound information is provided for a sound output, where a pitch of the sound output is determined based on a size or a type of the first icon and/or a size or a type of the second icon.

In addition, conventional methods for pausing a video include presenting a single image of the video at a position where the video is paused while the playback of the video is paused. A user who pauses the playback of the video and returns at a later time to resume the playback of the video has limited information about where the video was playing. Thus, it may take some time for the user to understand the context of the video after the playback of the video is resumed.

In some embodiments described below, an improved method for pausing a playback of a video includes providing data to present a plurality of still images from the video while the playback of the video is paused. The plurality of still images from the video facilitates the user to understand the context of the video around where the playback of the video was paused, even before the playback of the video is resumed. Thus, the user can understand the context of the video soon after the playback of the video is resumed.

Furthermore, conventional methods for presenting a video information user interface include providing a single sound output, regardless of whether the playback of the video has been initiated or not (e.g., whether the user has returned to the video information user interface after watching at least a portion of the video). Thus, the sound output provides only limited, fixed information about the video.

In some embodiments described below, an improved method for presenting a video information user interface includes, after the playback of the video has been initiated, providing a sound output that is distinct from the stock sound output so that the sound output can be used to convey additional information, such as the mood of where the playback of the video has been interrupted.

Moreover, conventional methods for presenting a screen saver include presenting a video. However, screen savers do not include sound outputs or include limited sound outputs.

In some embodiments described below, an improved method for presenting a screen saver includes providing a sound output that includes audio components corresponding to user interface objects displayed in the screen saver. Thus, the sound output can be used to audibly indicate additional information, such as the changes to the visual characteristics of the displayed user interface objects and a state of the screen saver.

Figure 9B:
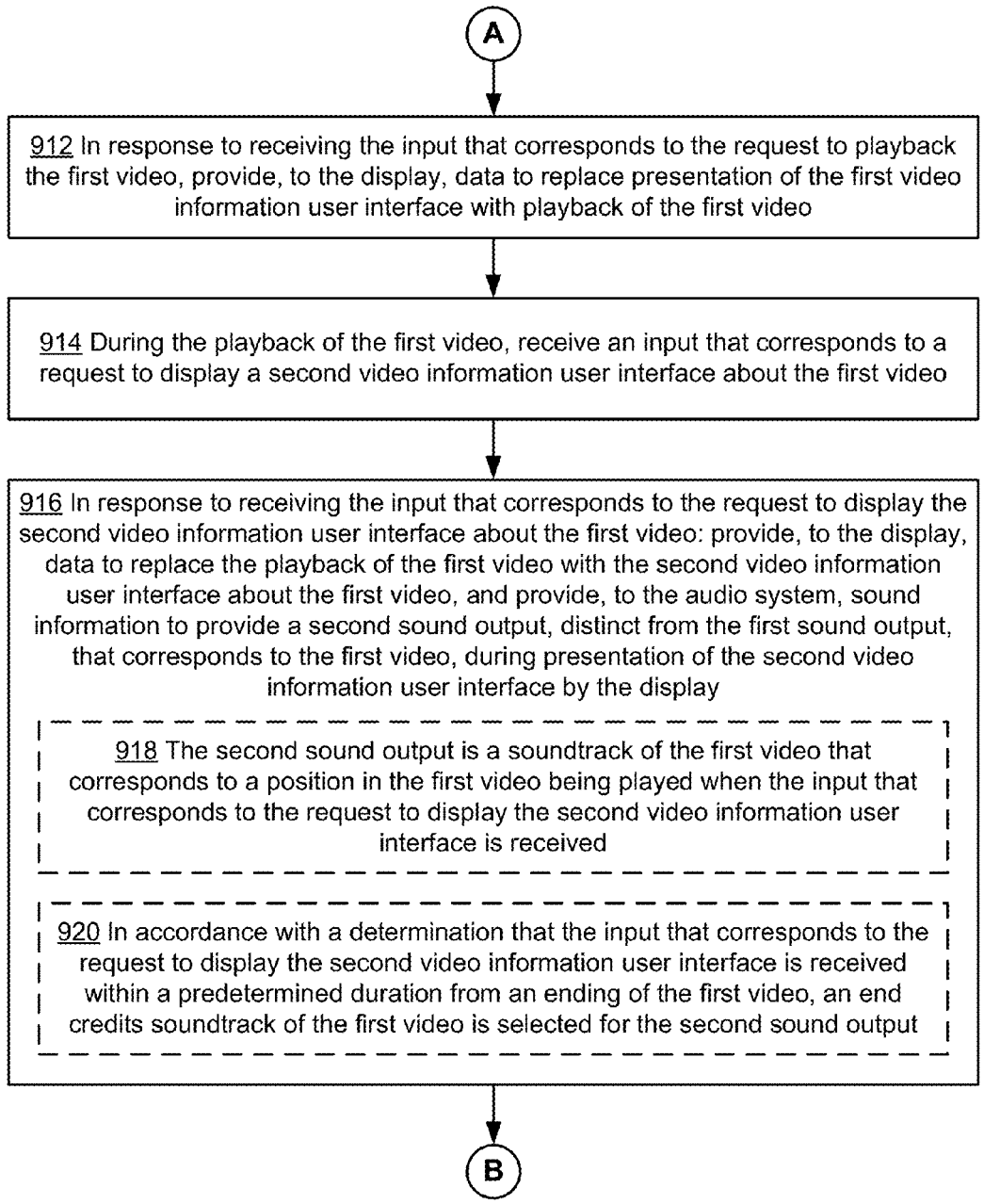
Figure 9C:
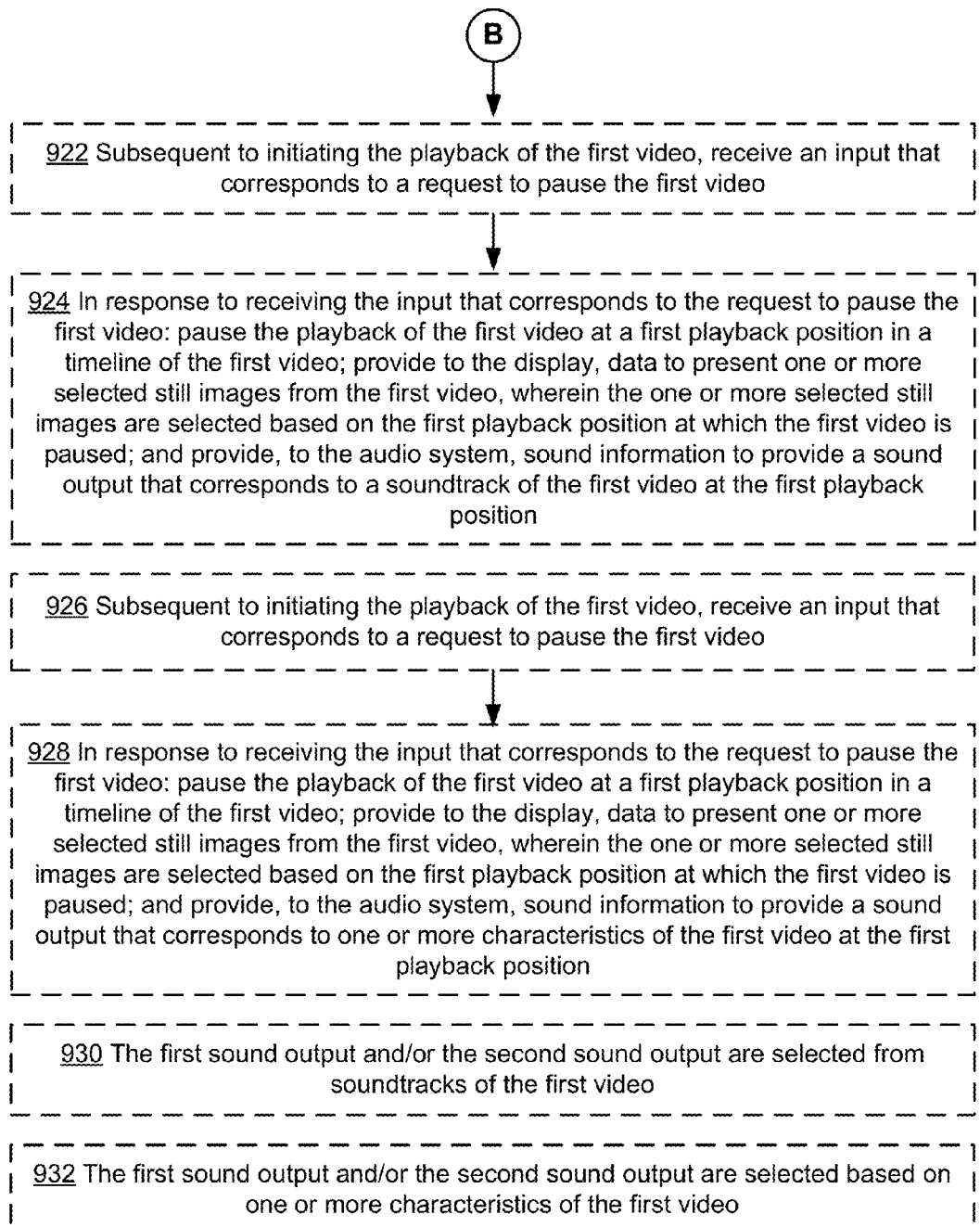
Figure 10A:
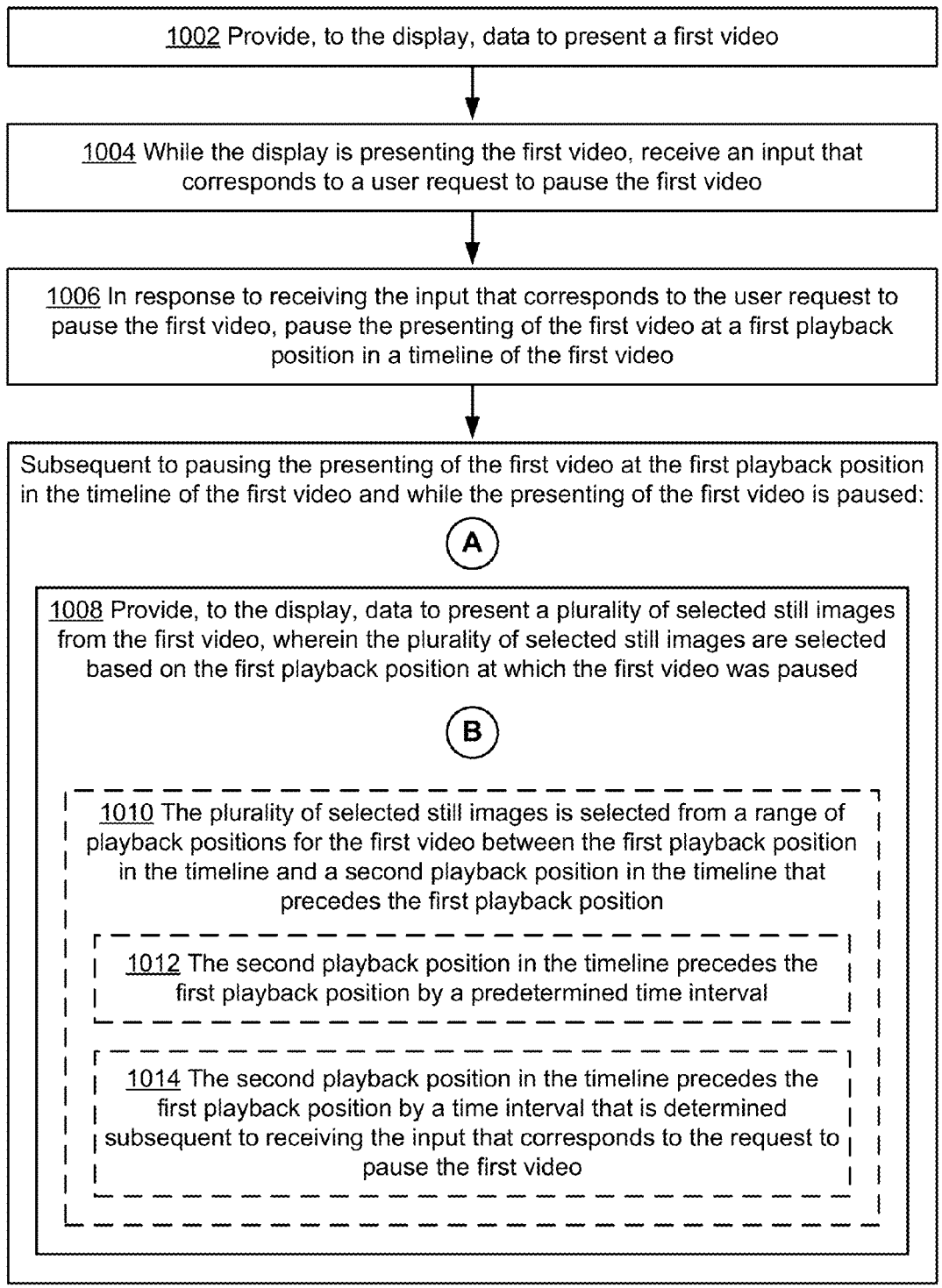

Below, FIGS. 1A-1B, 2, and 3 provide a description of exemplary devices. FIGS. 4A-4C and 5A-5SS illustrate exemplary user interfaces for providing audio feedback. FIGS. 6A-6C illustrate a flow diagram of a method of changing visual characteristics of a user interface in conjunction with changing audio components corresponding to user interface objects, in accordance with some embodiments. FIGS. 7A-7D illustrate a flow diagram of a method of providing sound output information corresponding to a user's interaction with user interface objects, in accordance with some embodiments. FIGS. 8A-8C illustrate a flow diagram of a method of providing sound output information corresponding to a user's interaction with user interface objects, in accordance with some embodiments. FIGS. 9A-9C illustrate a flow diagram of a method of providing sound output for a video information user interface. FIGS. 10A-10B illustrate a flow diagram of a method of providing audiovisual information while a video is in a paused state. The user interfaces in FIGS. 5A-5SS are used to illustrate the processes in FIGS. 6A-6C, 7A-7D, 8A-8C, 9A-9C, and 10A-10B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first user interface object could be termed a second user interface object, and, similarly, a second user interface object could be termed a first user interface object, without departing from the scope of the various described embodiments. The first user interface object and the second user interface object are both user interface objects, but they are not the same user interface object, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a digital media player, such as Apple TV® from Apple Inc. of Cupertino, Calif. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer. In some embodiments, the desktop computer has a touch-sensitive surface (e.g., a touch-screen display and/or a touchpad).

In the discussion that follows, an electronic device that communicates with and/or includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more non-transitory computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
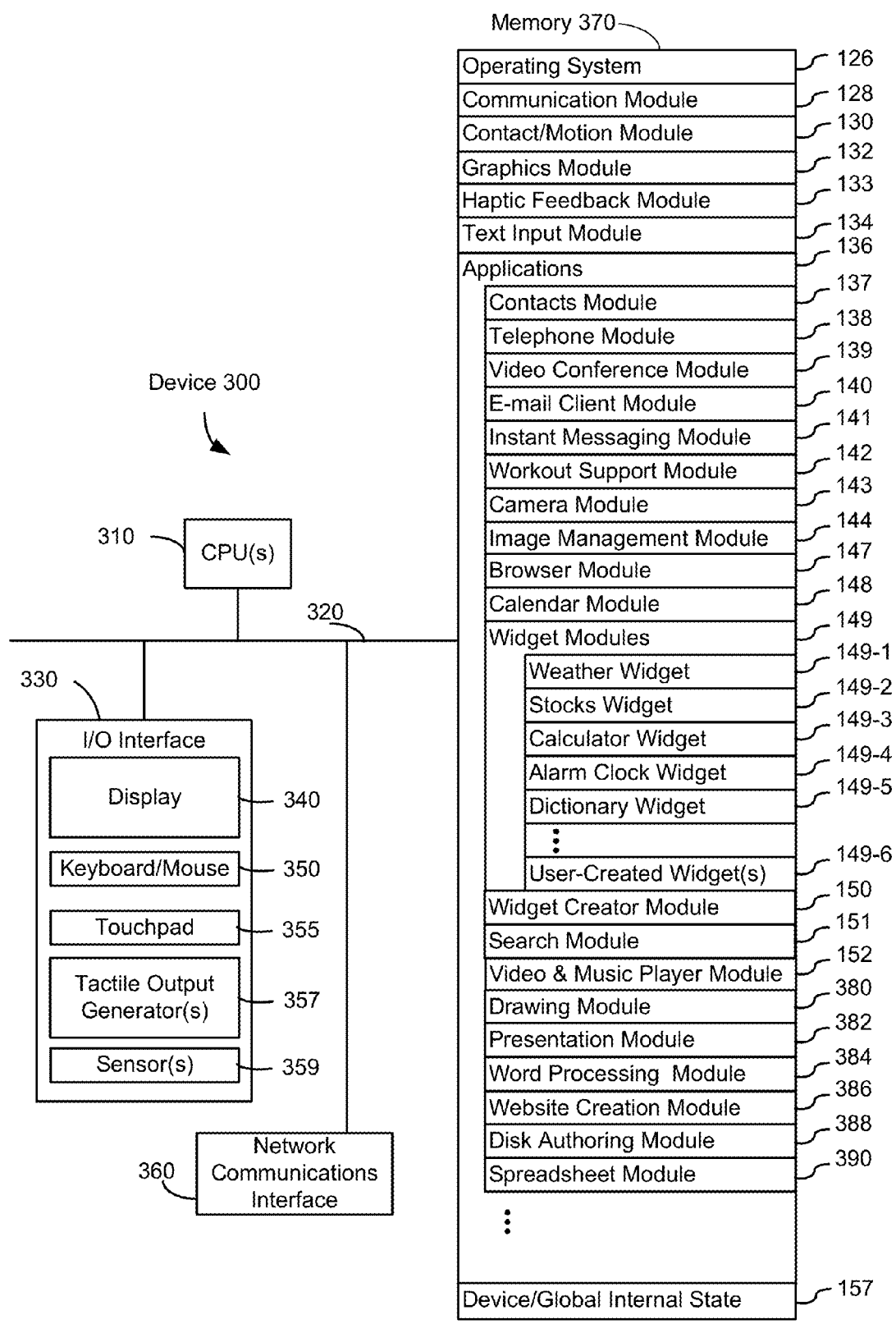
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
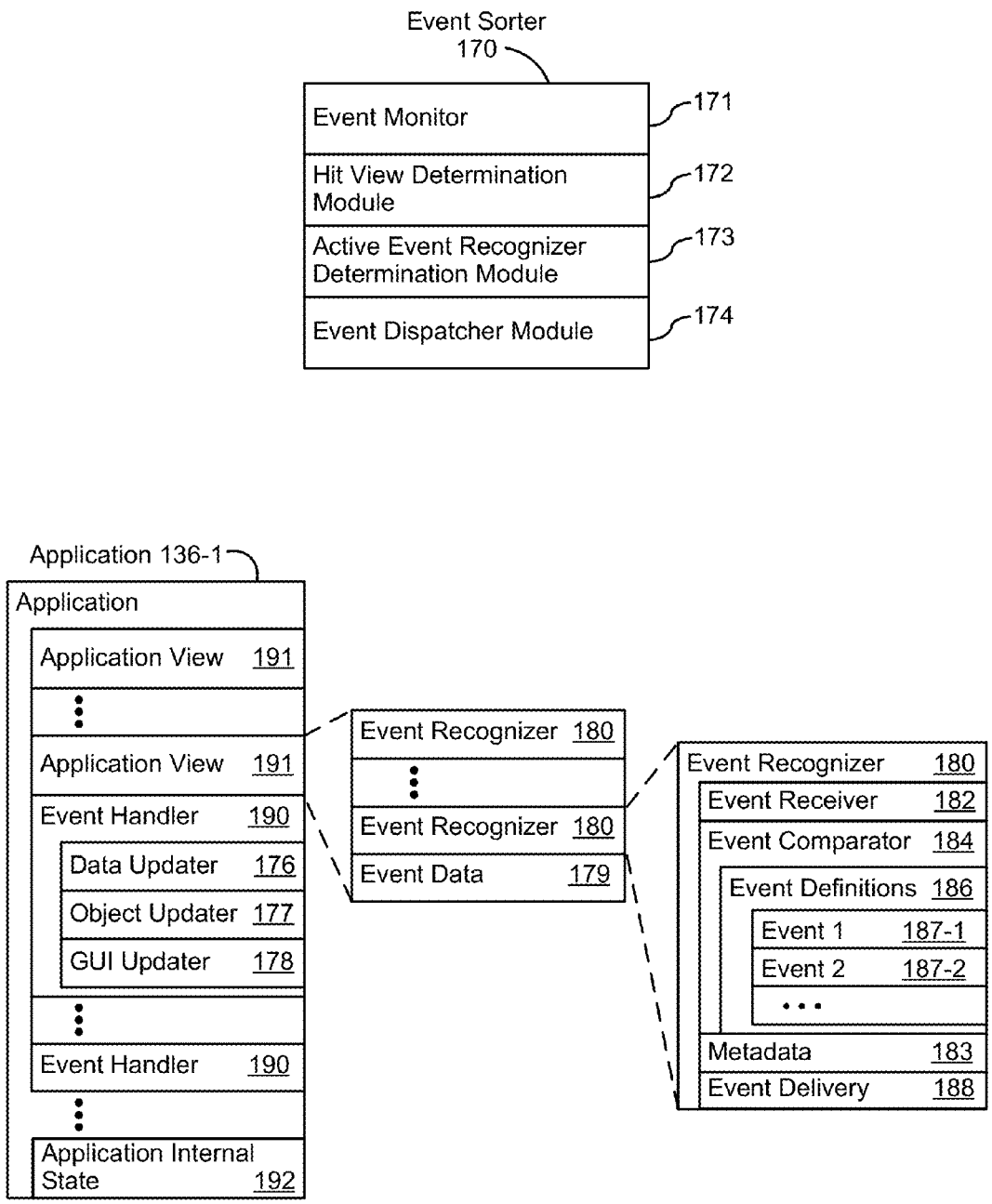
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
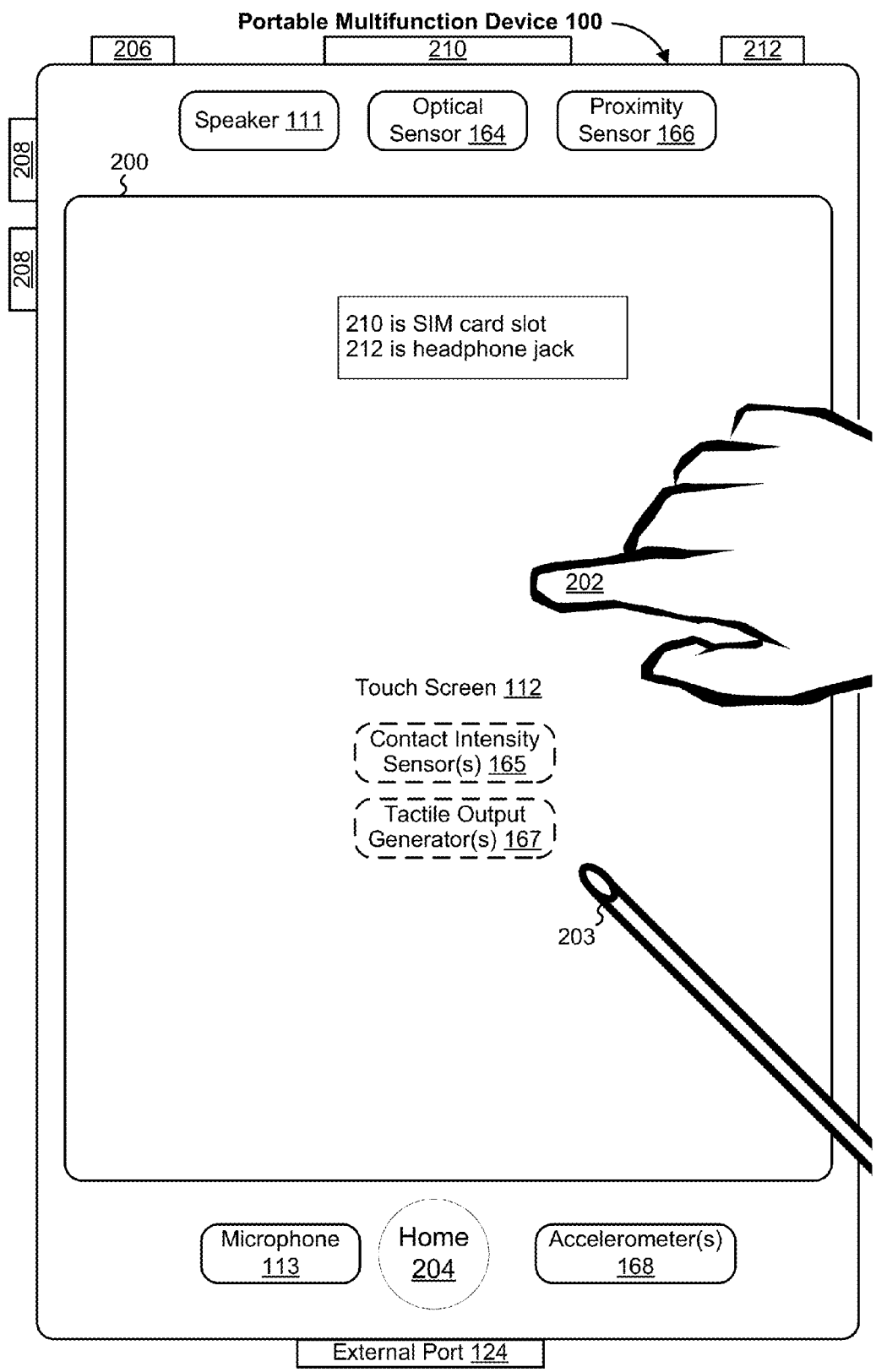
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
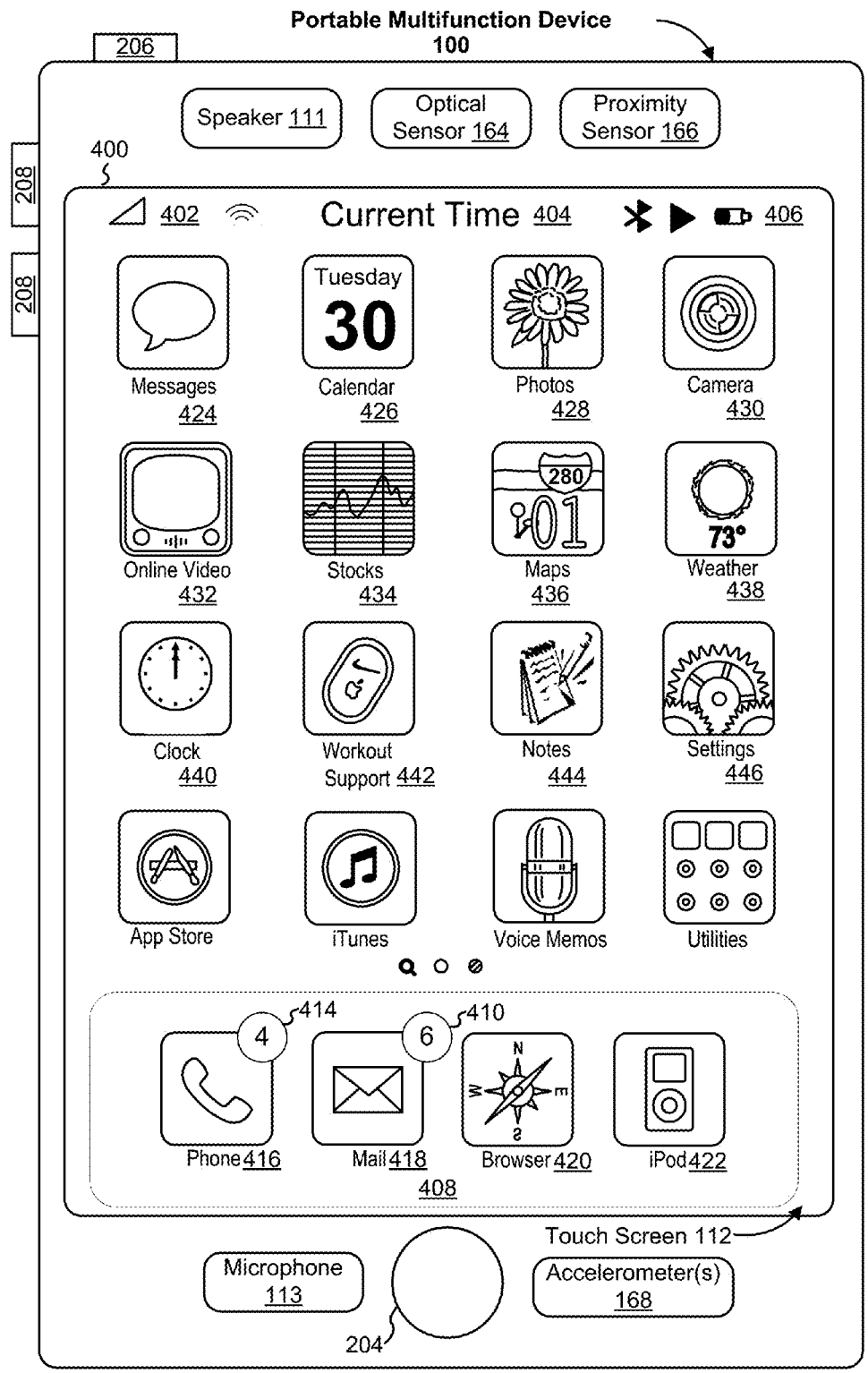
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- a Bluetooth indicator;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
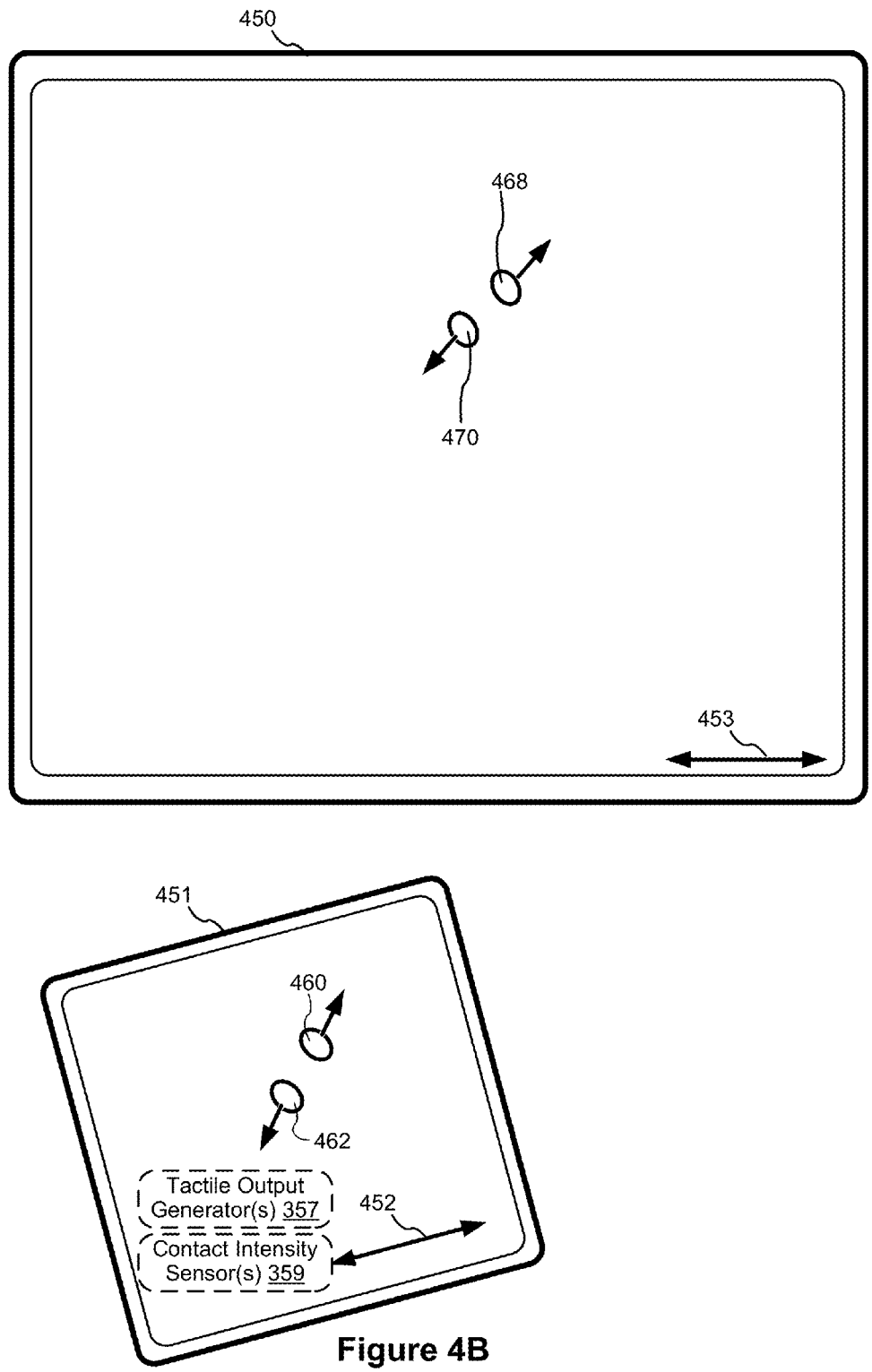
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input), or input of another type, on the same device (e.g., a button press). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 4C:
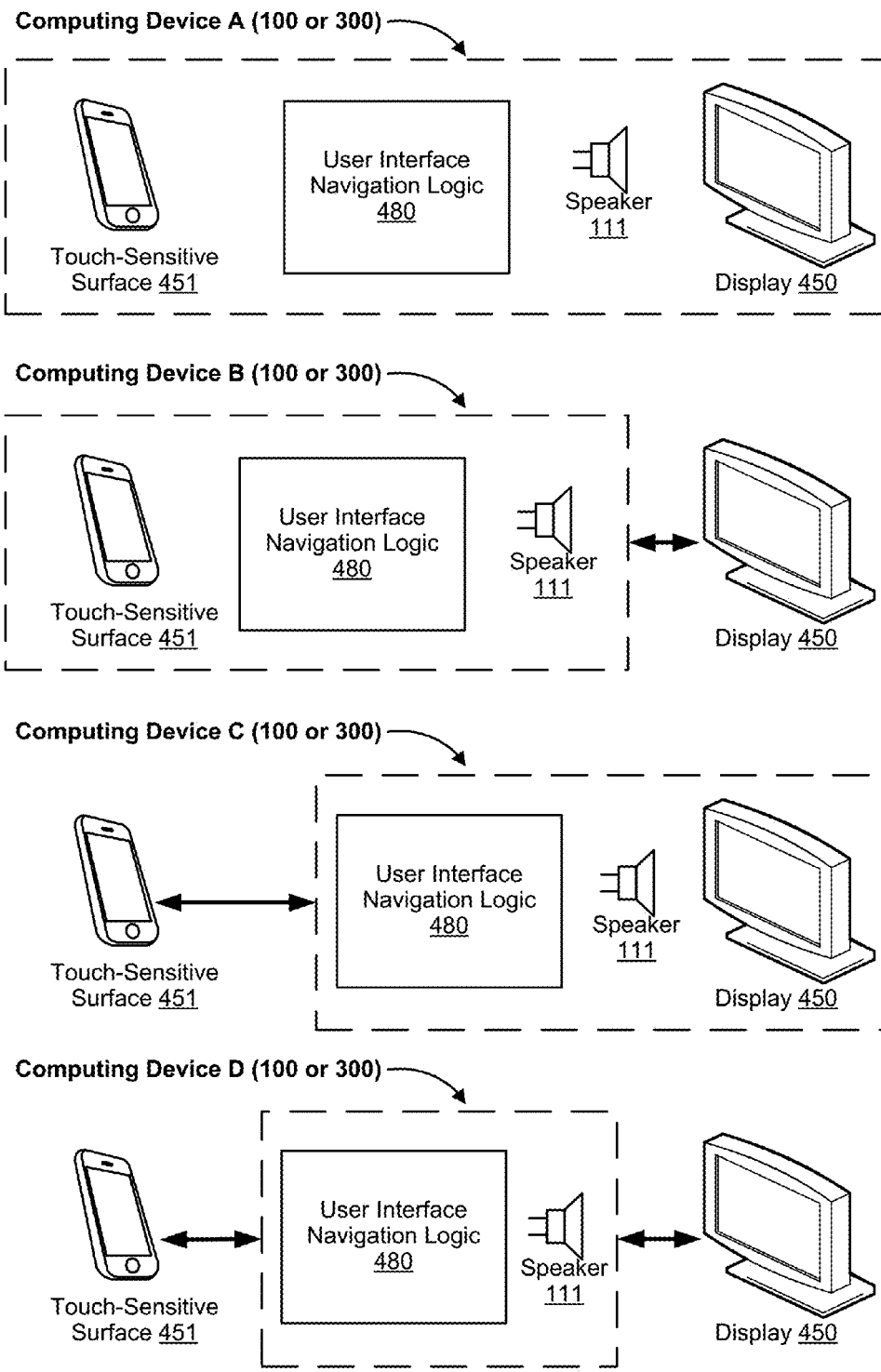
FIG. 4C illustrates exemplary electronic devices that are in communication with a display and touch-sensitive surface where, for at least a subset of the electronic devices the display and/or touch-sensitive surface is integrated into the electronic device in accordance with some embodiments.

FIG. 4C illustrates exemplary electronic devices that are in communication with display 450 and touch-sensitive surface 451. For at least a subset of the electronic devices, display 450 and/or touch-sensitive surface 451 is integrated into the electronic device in accordance with some embodiments. While the examples described in greater detail below are described with reference to a touch-sensitive surface 451 and a display 450 that are in communication with an electronic device (e.g., portable multifunction device 100 in FIGS. 1A-1B or device 300 in FIG. 3), it should be understood that in accordance with some embodiments, the touch-sensitive surface and/or the display are integrated with the electronic device, while in other embodiments one or more of the touch-sensitive surface and the display are separate from the electronic device. Additionally, in some embodiments the electronic device has an integrated display and/or an integrated touch-sensitive surface and is in communication with one or more additional displays and/or touch-sensitive surfaces that are separate from the electronic device.

In some embodiments, all of the operations described below with reference to FIGS. 5A-5SS, 6A-6C, 7A-7D, 8A-8C, 9A-9C, and 10A-10B are performed on a single electronic device with user interface navigation logic 480 (e.g., Computing Device A described below with reference to FIG. 4C). However, it should be understood that frequently multiple different electronic devices are linked together to perform the operations described below with reference to FIGS. 5A-5SS, 6A-6C, 7A-7D, 8A-8C, 9A-9C, and 10A-10B (e.g., an electronic device with user interface navigation logic 480 communicates with a separate electronic device with a display 450 and/or a separate electronic device with a touch-sensitive surface 451). In any of these embodiments, the electronic device that is described below with reference to FIGS. 5A-5SS, 6A-6C, 7A-7D, 8A-8C, 9A-9C, and 10A-10B is the electronic device (or devices) that contain(s) the user interface navigation logic 480. Additionally, it should be understood that the user interface navigation logic 480 could be divided between a plurality of distinct modules or electronic devices in various embodiments; however, for the purposes of the description herein, the user interface navigation logic 480 will be primarily referred to as residing in a single electronic device so as not to unnecessarily obscure other aspects of the embodiments.

In some embodiments, the user interface navigation logic 480 includes one or more modules (e.g., one or more event handlers 190, including one or more object updaters 177 and one or more GUI updaters 178 as described in greater detail above with reference to FIG. 1C) that receive interpreted inputs and, in response to these interpreted inputs, generate instructions for updating a graphical user interface in accordance with the interpreted inputs which are subsequently used to update the graphical user interface on a display. In some embodiments, an interpreted input is an input that has been detected (e.g., by a contact motion 130 in FIGS. 1A-1B and 3), recognized (e.g., by an event recognizer 180 in FIG. 1C) and/or prioritized (e.g., by event sorter 170 in FIG. 1C). In some embodiments, the interpreted inputs are generated by modules at the electronic device (e.g., the electronic device receives raw contact input data so as to identify gestures from the raw contact input data). In some embodiments, some or all of the interpreted inputs are received by the electronic device as interpreted inputs (e.g., an electronic device that includes the touch-sensitive surface 451 processes raw contact input data so as to identify gestures from the raw contact input data and sends information indicative of the gestures to the electronic device that includes the user interface navigation logic 480).

In some embodiments, both the display 450 and the touch-sensitive surface 451 are integrated with the electronic device (e.g., Computing Device A in FIG. 4C) that contains the user interface navigation logic 480. For example, the electronic device may be a desktop computer or laptop computer with an integrated display (e.g., 340 in FIG. 3) and touchpad (e.g., 355 in FIG. 3). As another example, the electronic device may be a portable multifunction device 100 (e.g., a smartphone, PDA, tablet computer, etc.) with a touch screen (e.g., 112 in FIG. 2).

In some embodiments, the touch-sensitive surface 451 is integrated with the electronic device while the display 450 is not integrated with the electronic device (e.g., Computing Device B in FIG. 4C) that contains the user interface navigation logic 480. For example, the electronic device may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 450 is integrated with the electronic device while the touch-sensitive surface 451 is not integrated with the electronic device (e.g., Computing Device C in FIG. 4C) that contains the user interface navigation logic 480. For example, the electronic device may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither the display 450 nor the touch-sensitive surface 451 is integrated with the electronic device (e.g., Computing Device D in FIG. 4C) that contains the user interface navigation logic 480. For example, the electronic device may be a stand-alone electronic device 300 (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, the computing device has an integrated audio system. In some embodiments, the computing device is in communication with an audio system that is separate from the computing device. In some embodiments, the audio system (e.g., an audio system integrated in a television unit) is integrated with a separate display 450. In some embodiments, the audio system (e.g., a stereo system) is a stand-alone system that is separate from the computing device and the display 450.

User Interfaces and Associated Processes

Attention is now directed towards embodiments of user interfaces ("UI") and associated processes that may be implemented with an electronic device that communicates with and/or includes a display and a touch-sensitive surface, such as one of Computing Devices A-D in FIG. 4C.

Figure 5A:
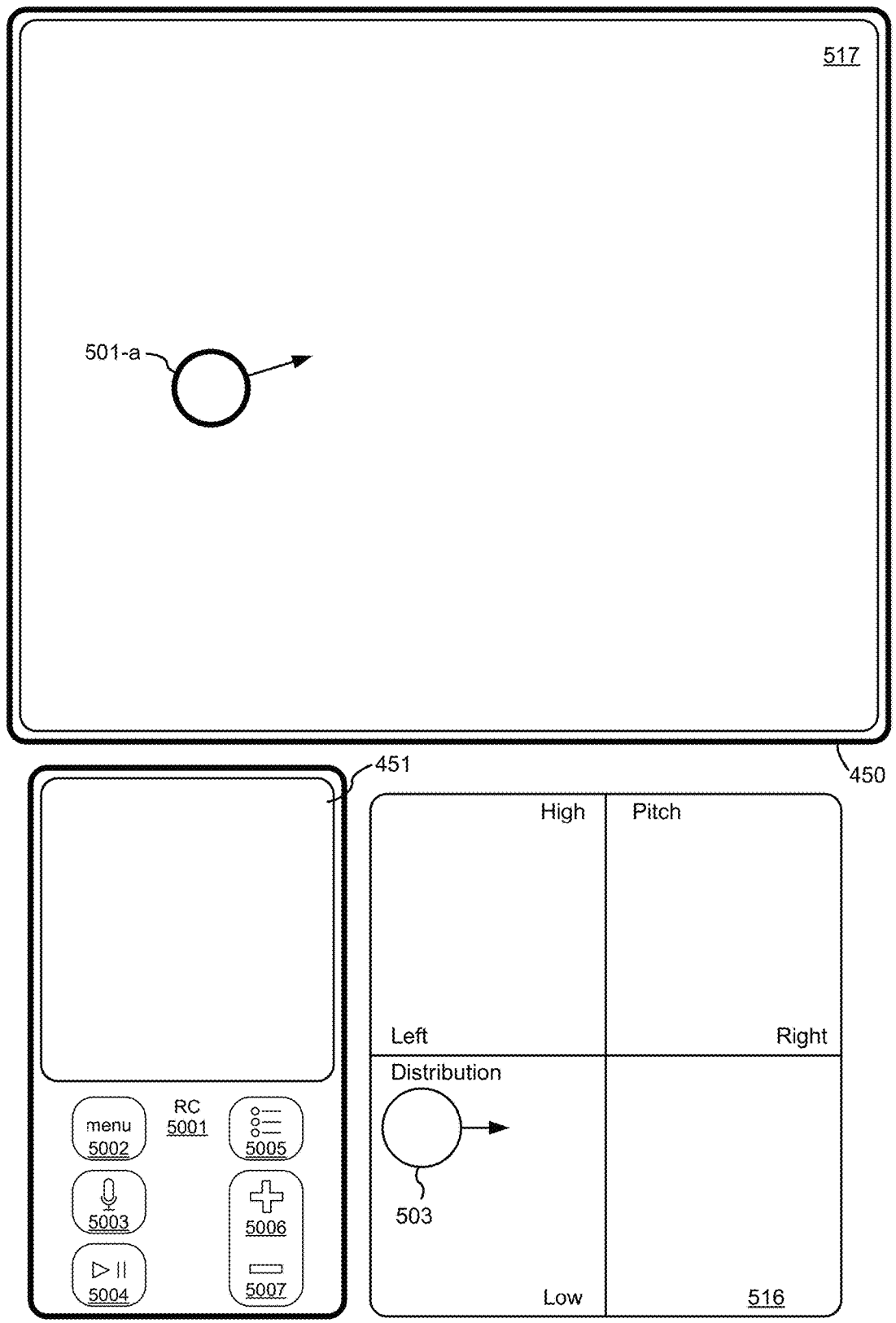
FIGS. 5A-5SS illustrate exemplary user interfaces for providing audiovisual feedback, in accordance with some embodiments.
Figure 5B:
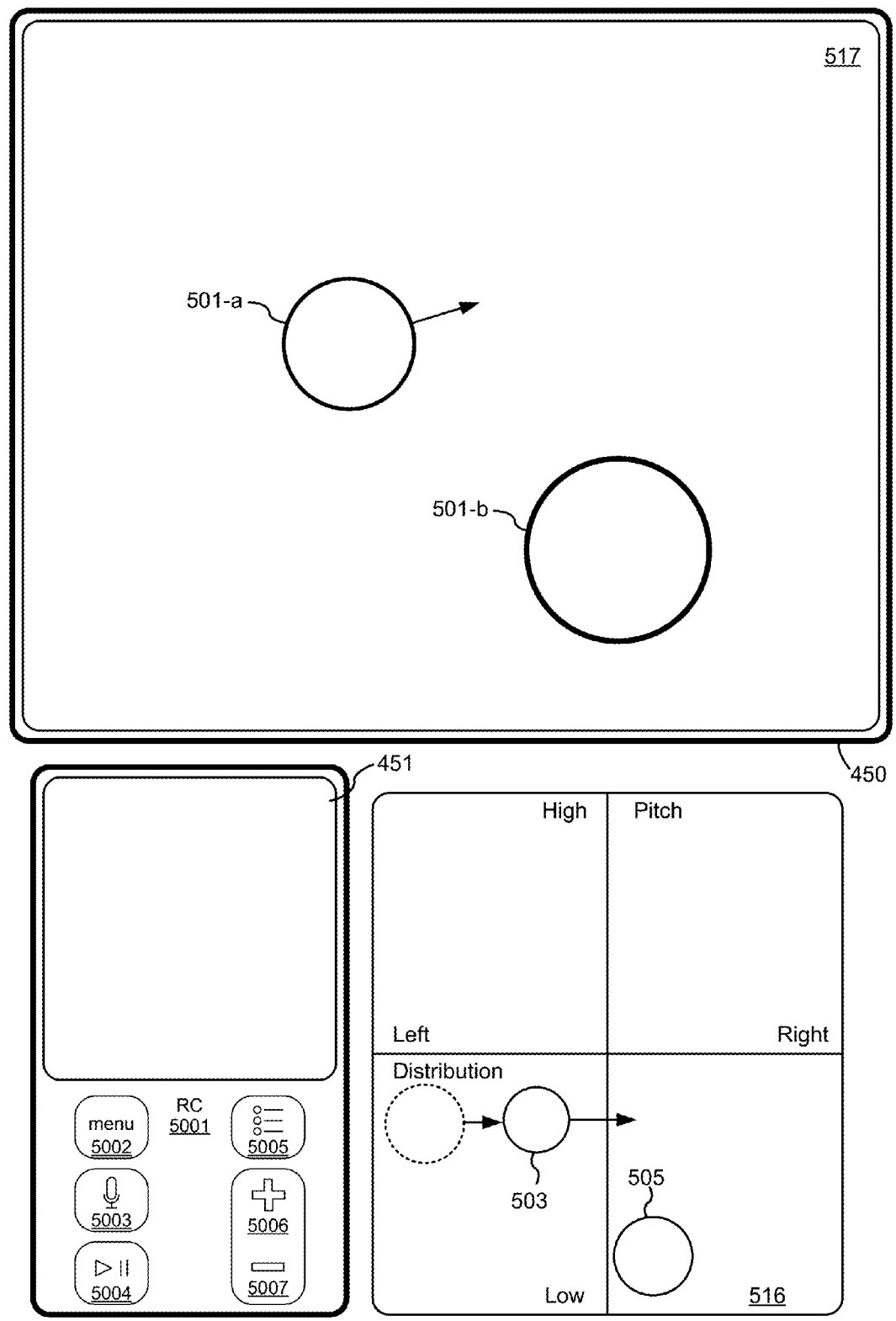
Figure 5C:
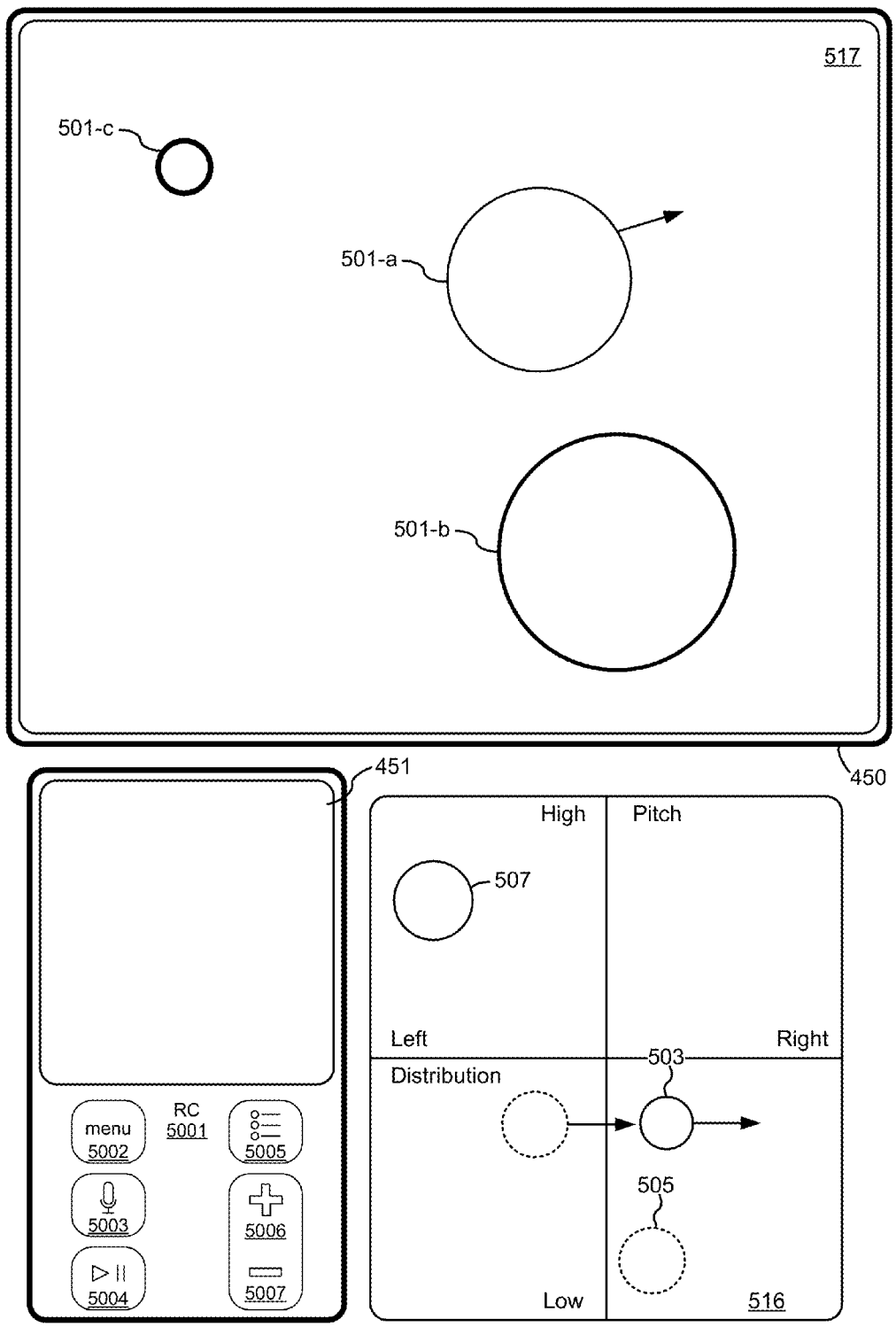
Figure 5D:
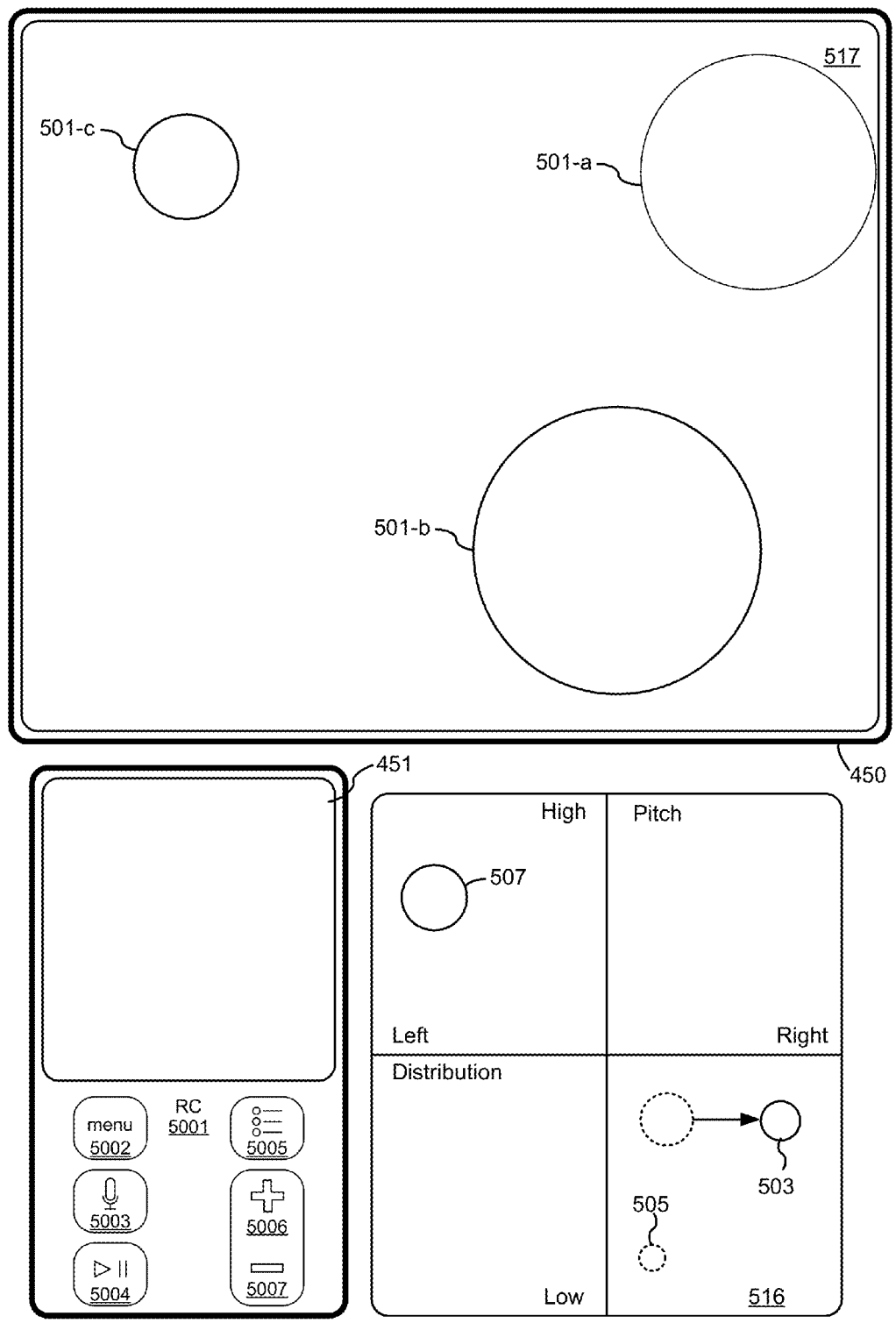
Figure 5E:
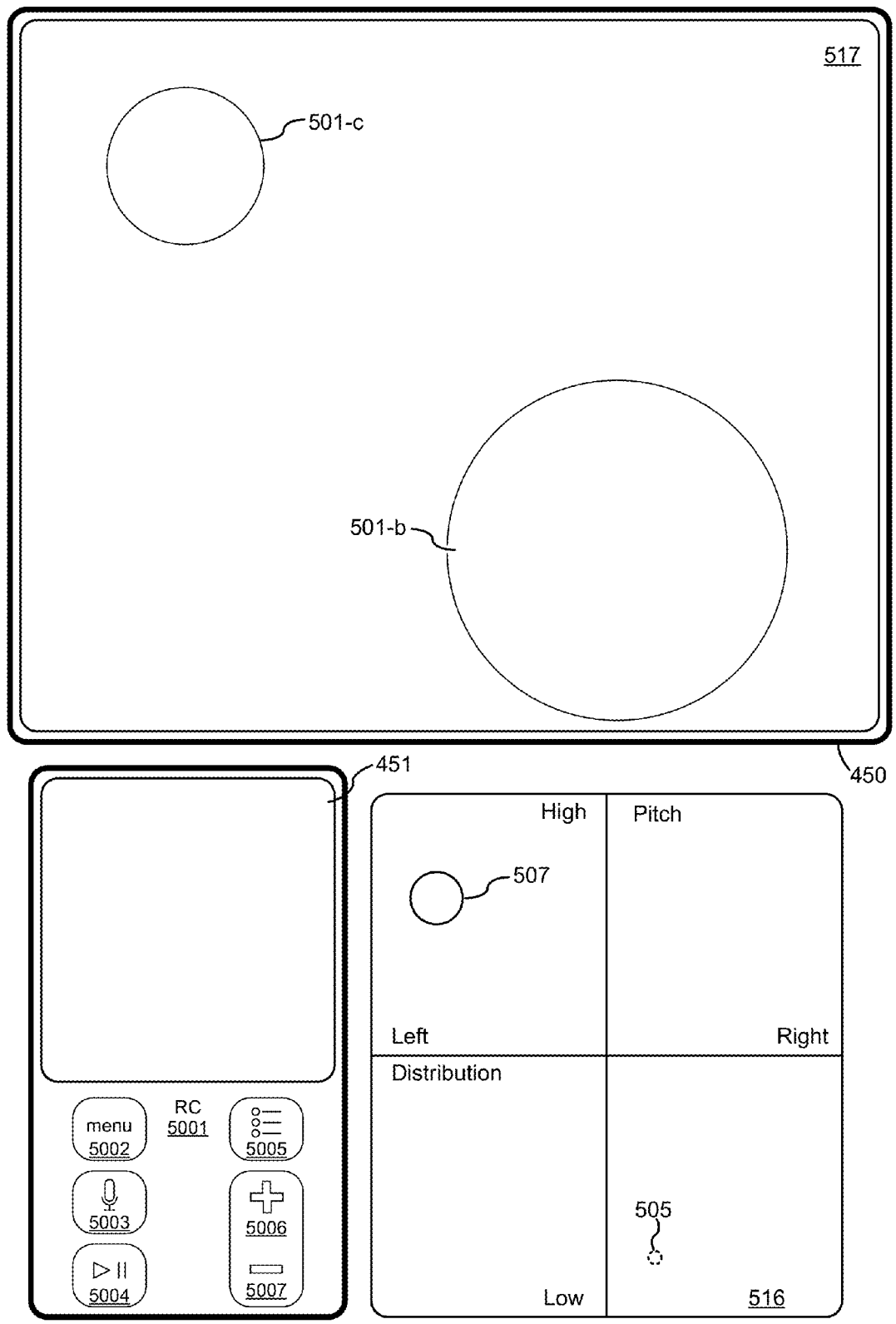
Figure 5F:
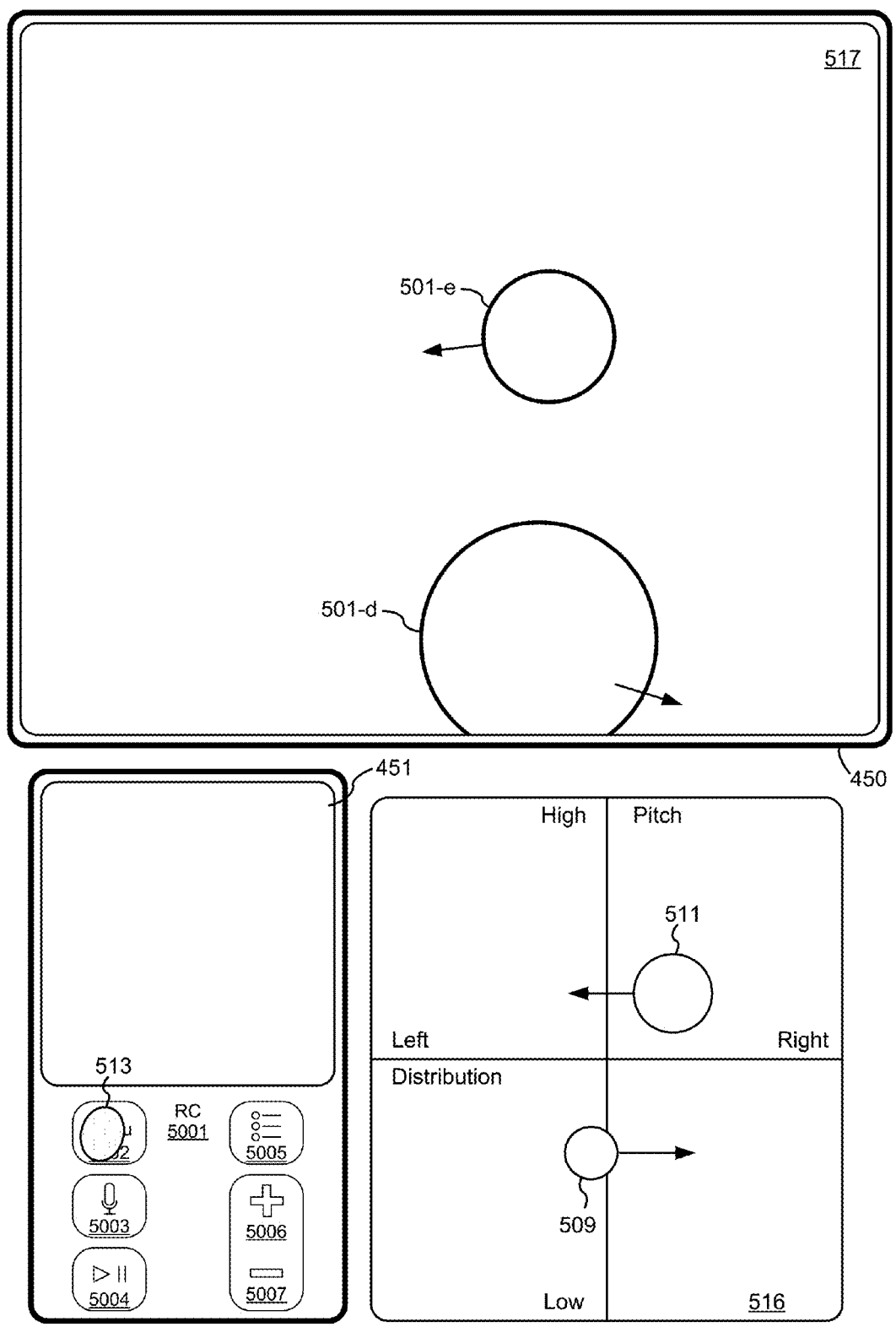
Figure 5G:
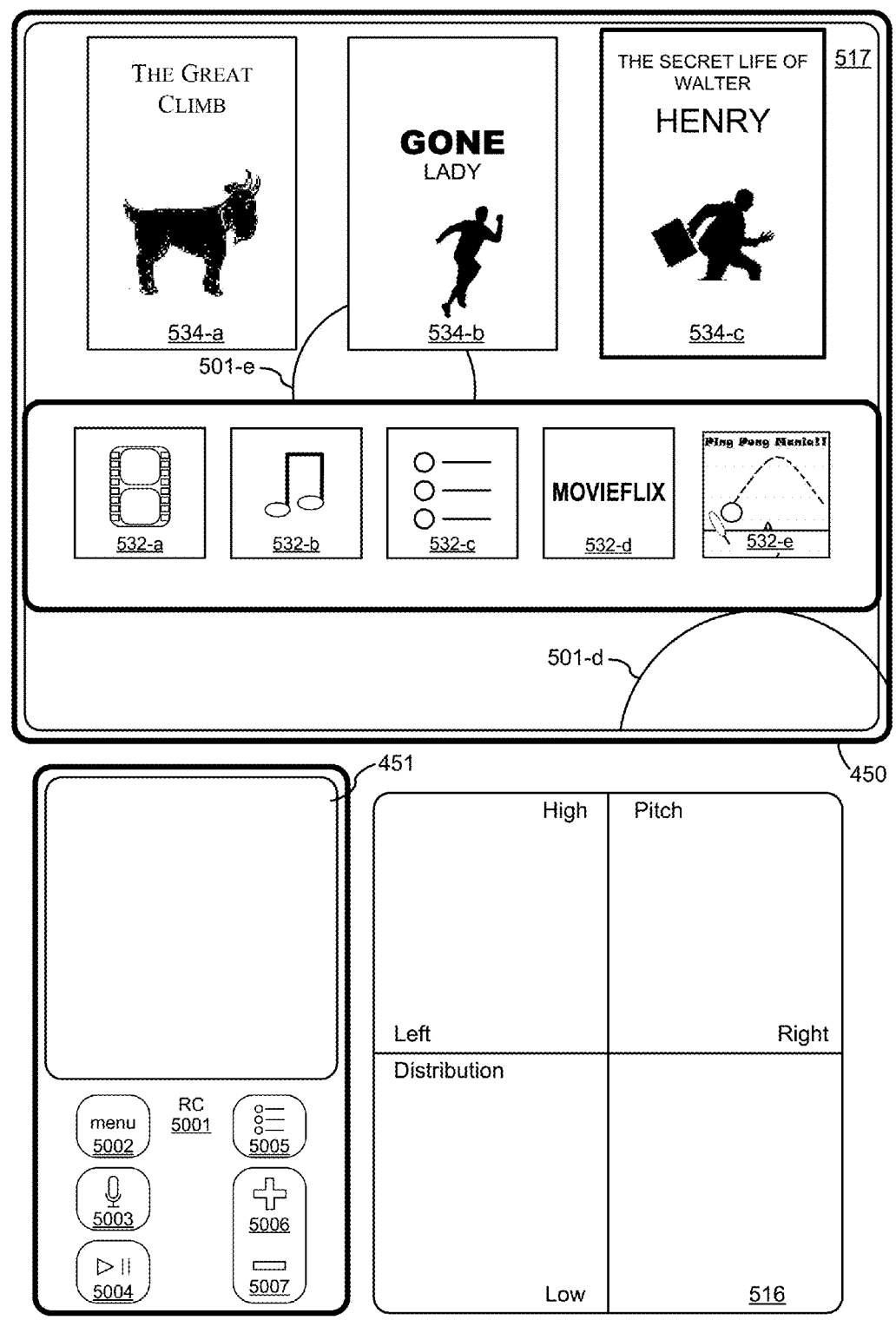
Figure 5H:
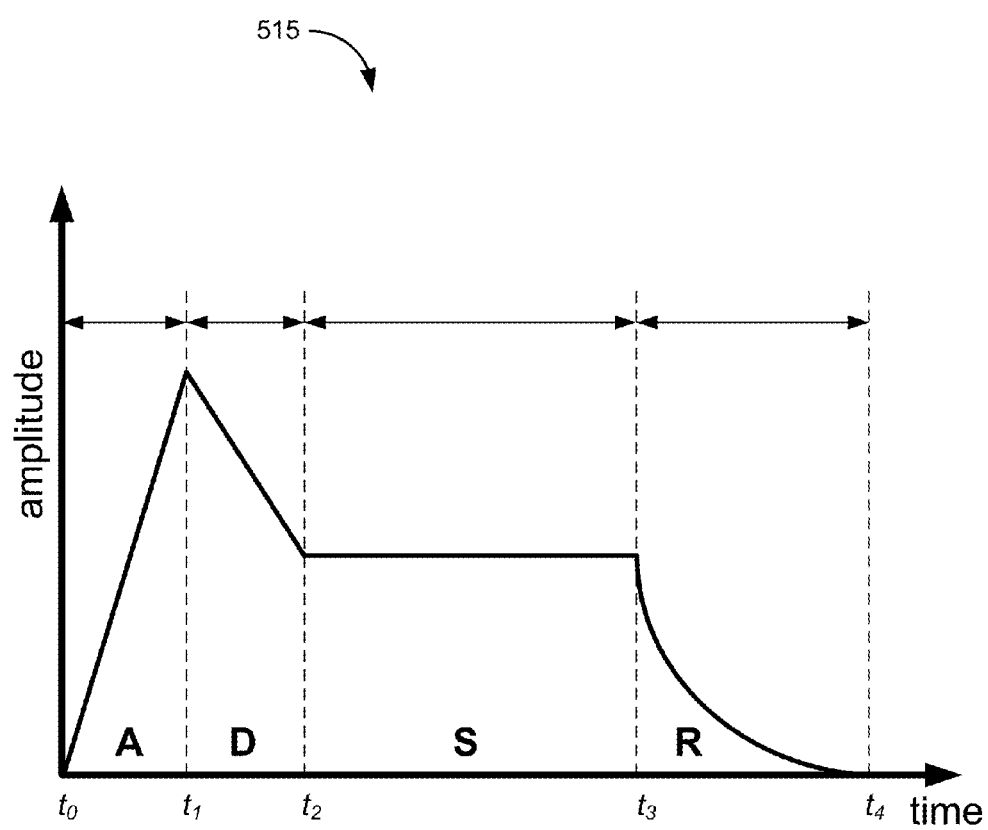
Figure 5I:
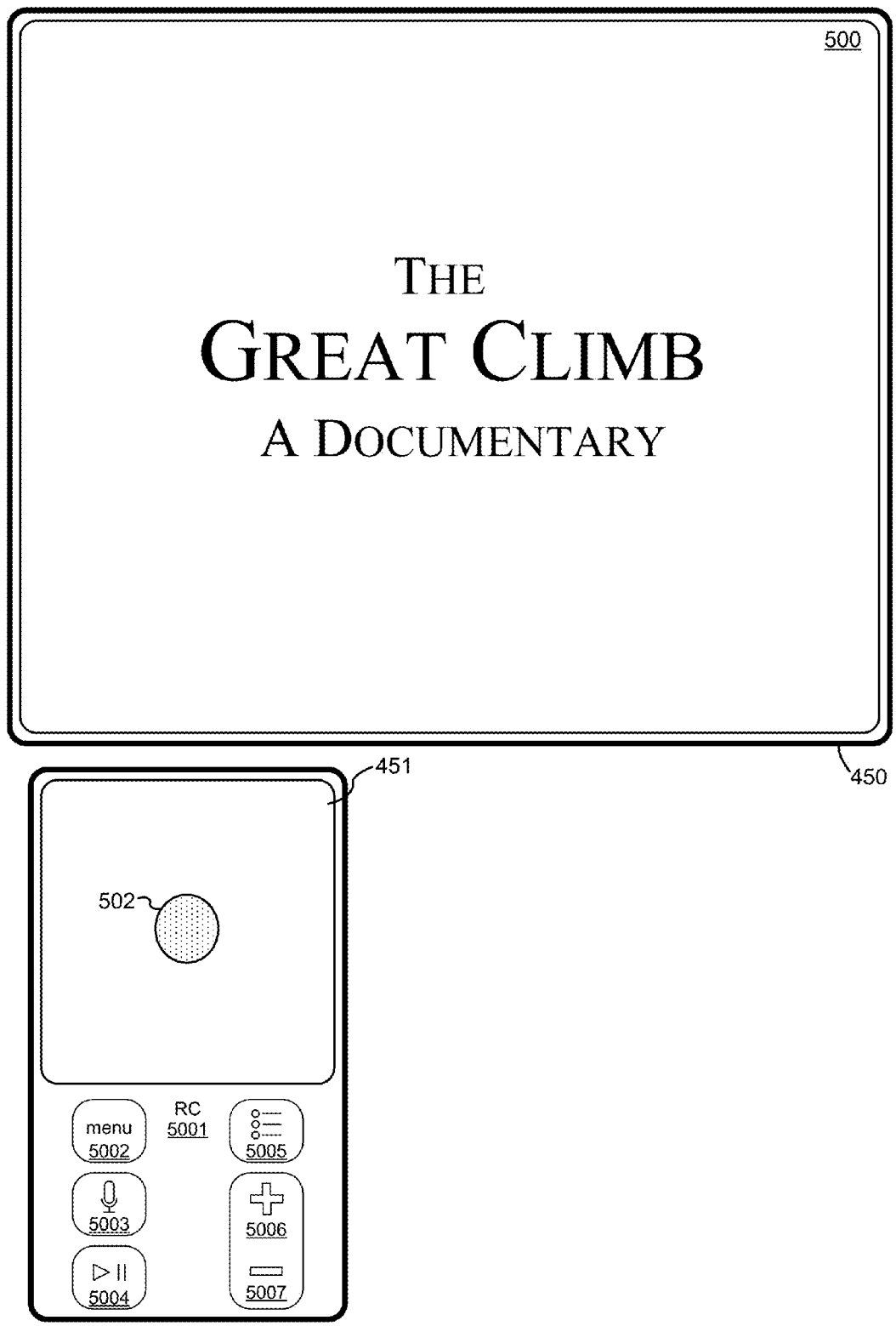
Figure 5J:
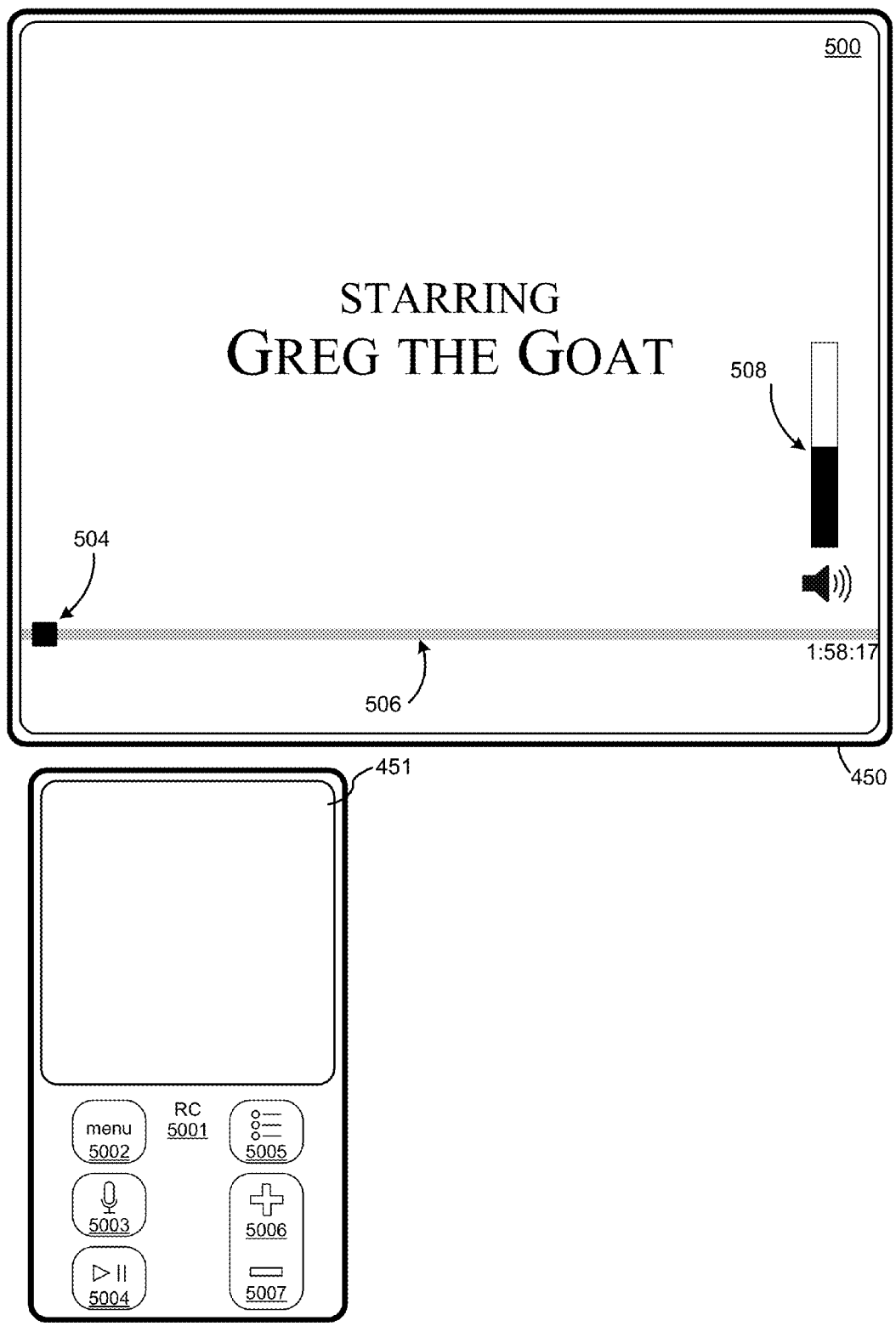
Figure 5K:
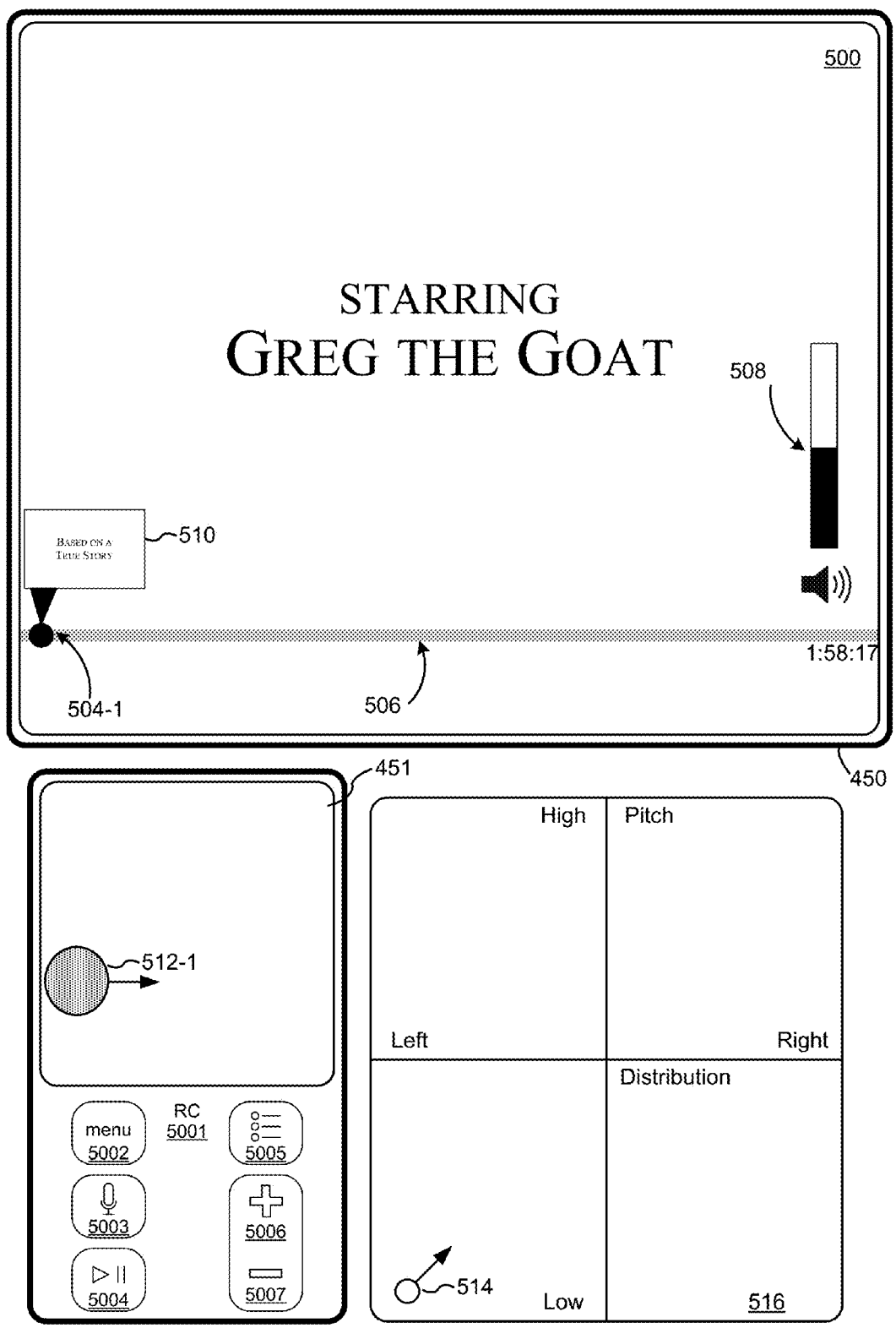
Figure 5L:
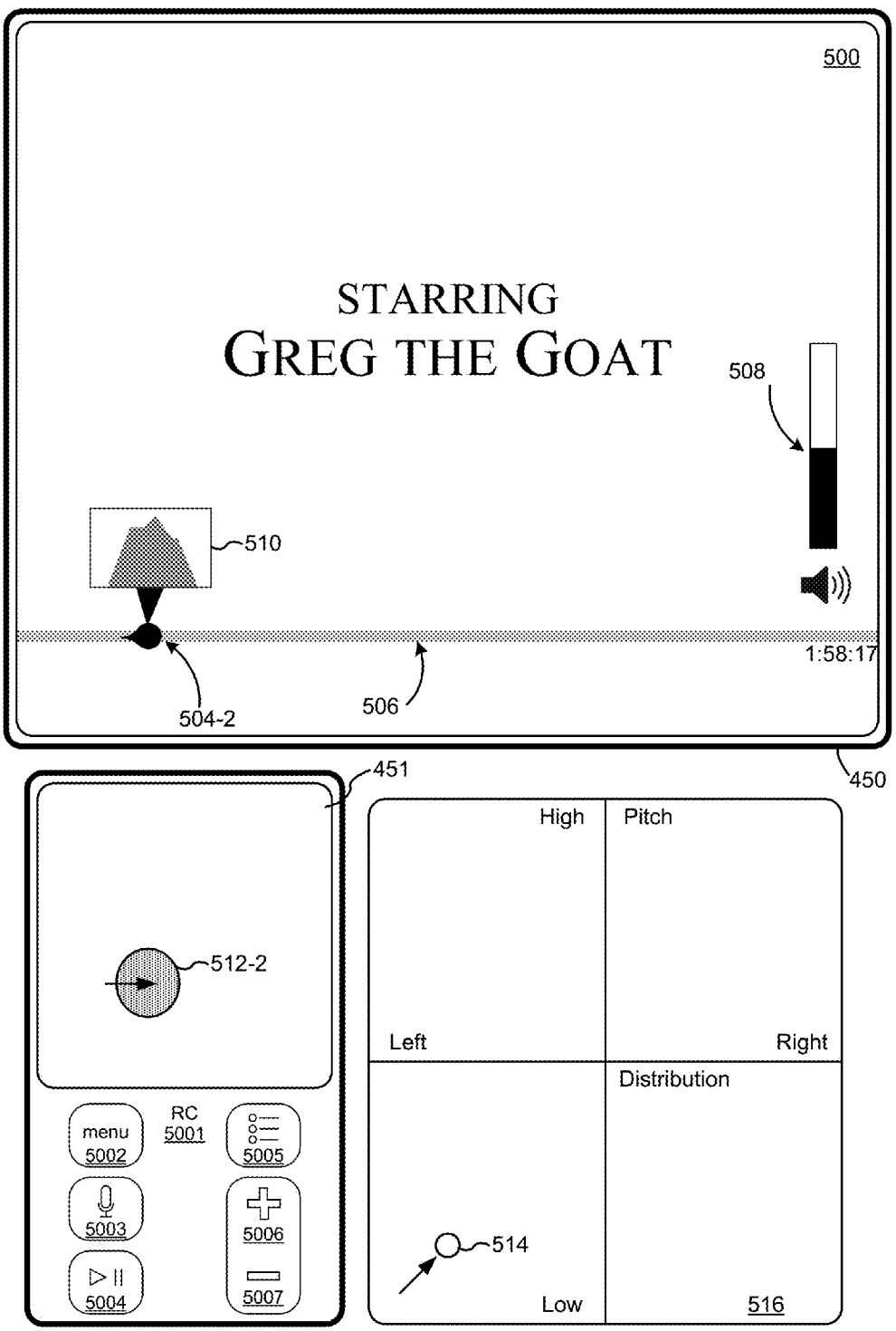
Figure 5M:
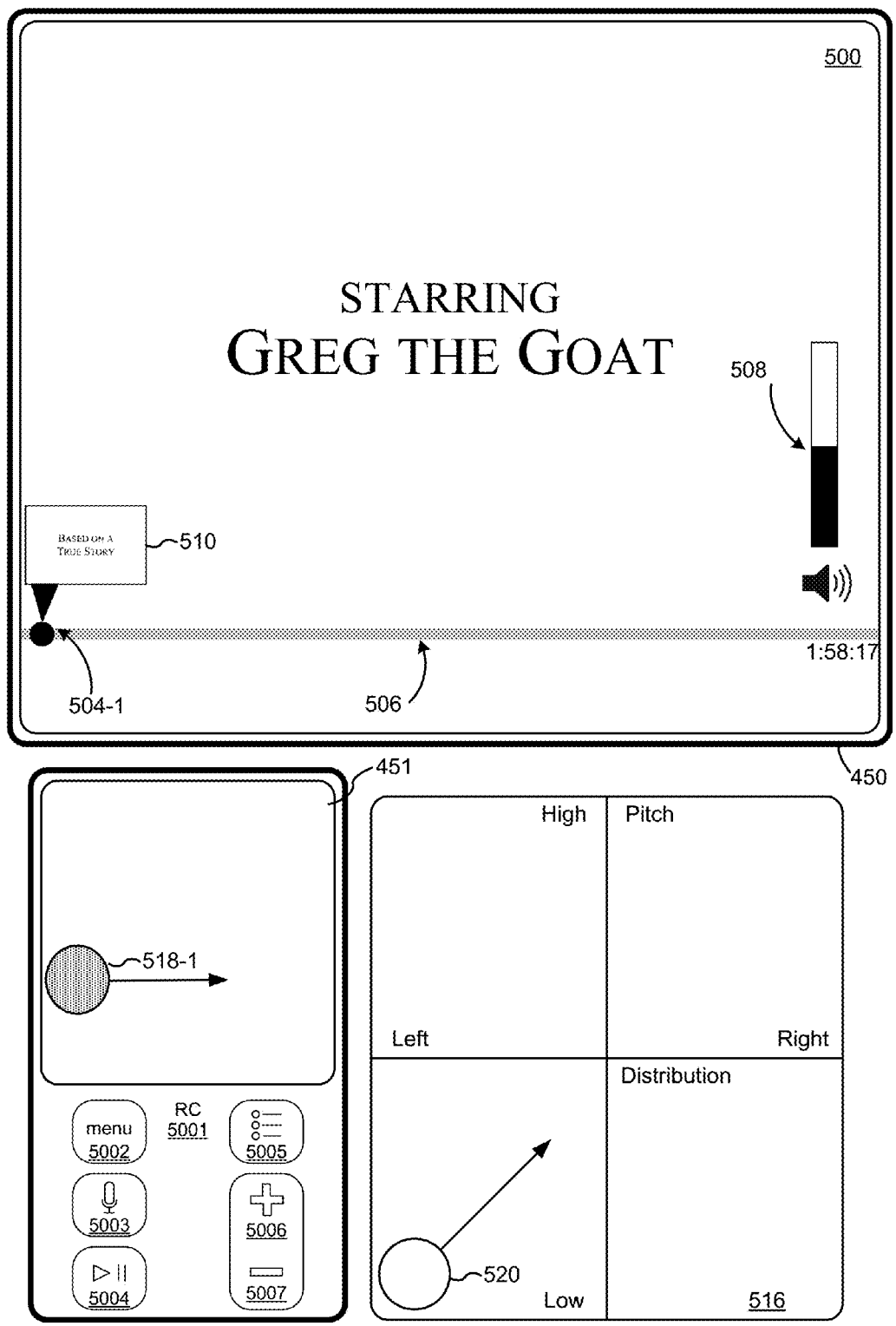
Figure 5N:
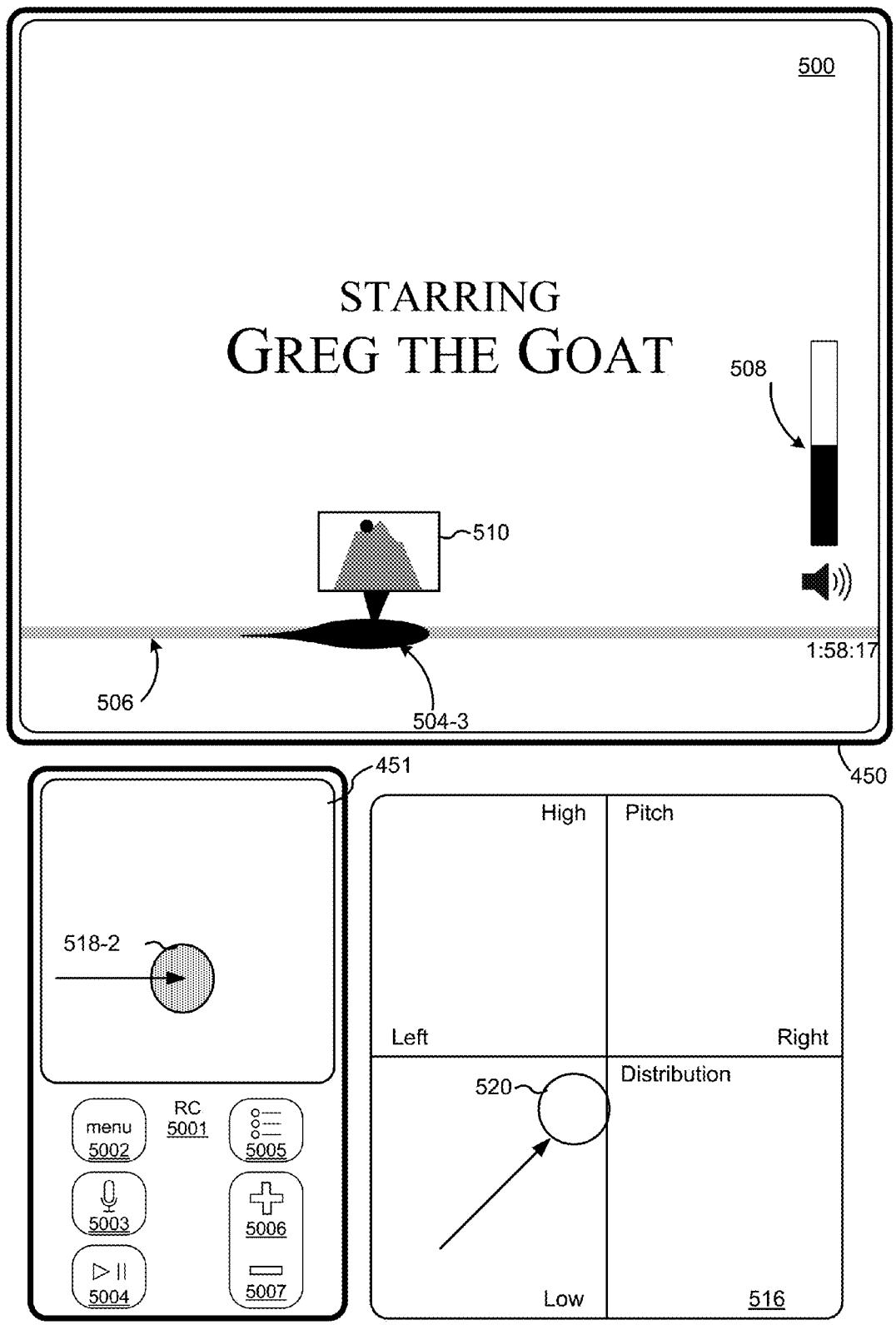
Figure 5O:
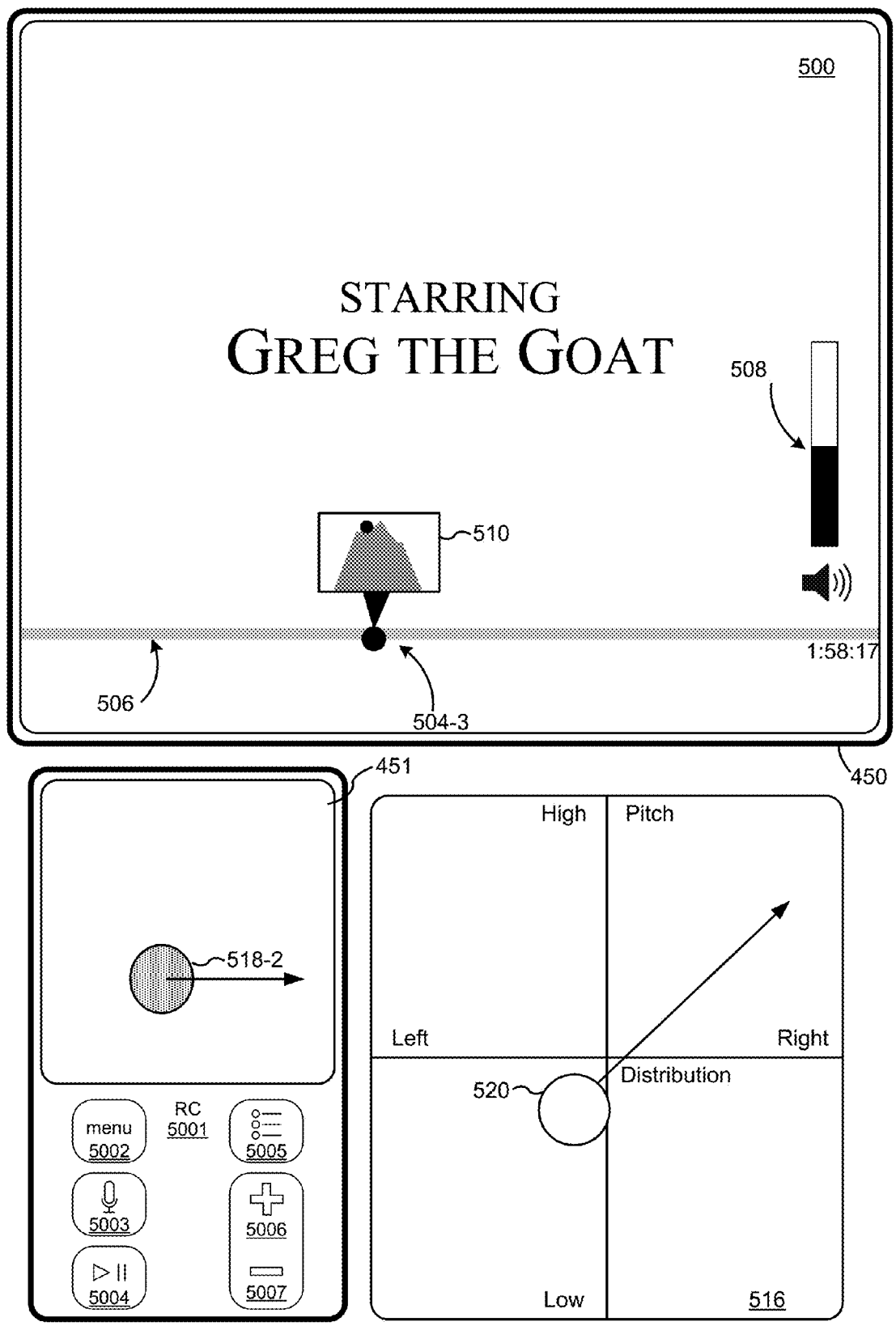
Figure 5P:
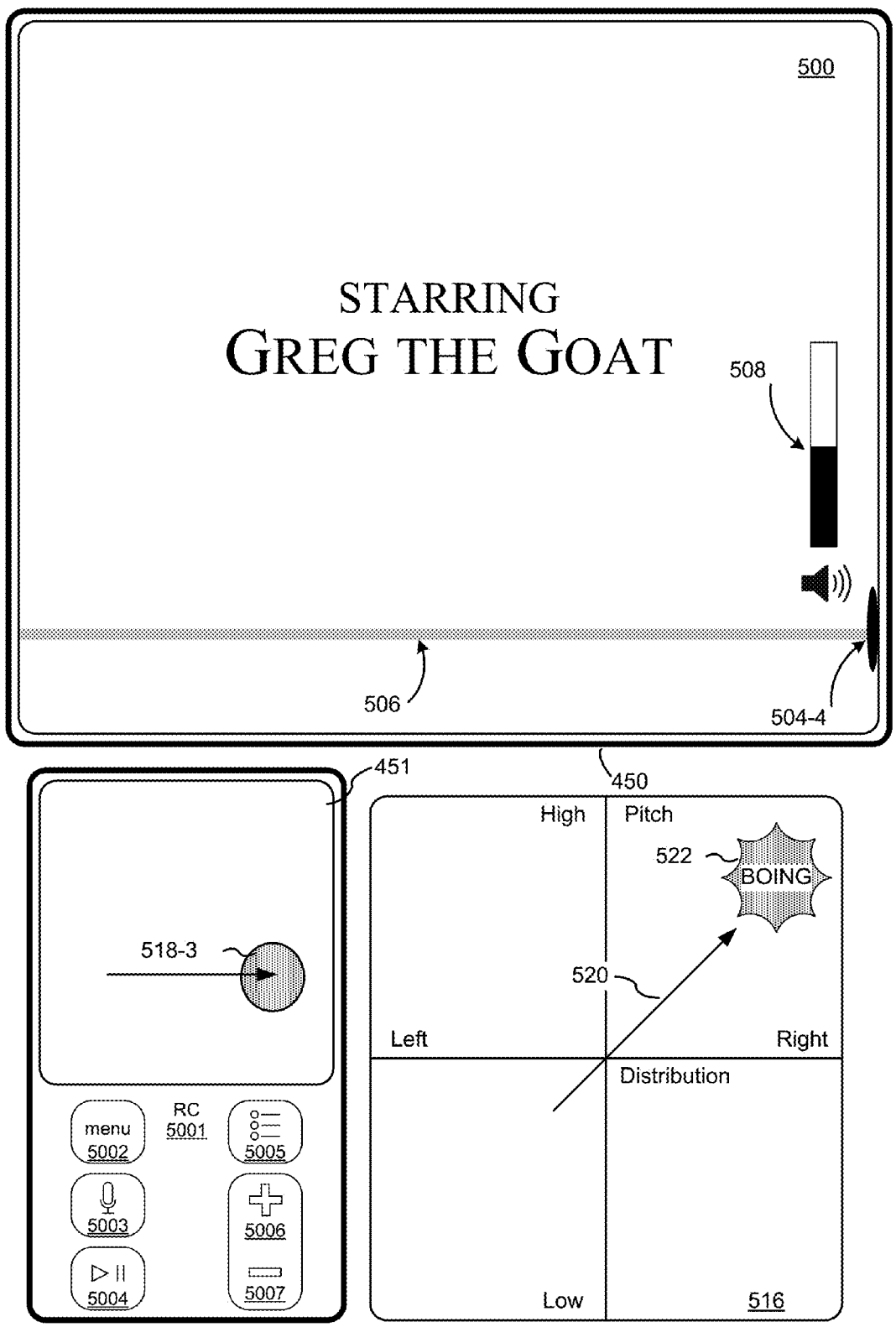
Figure 5Q:
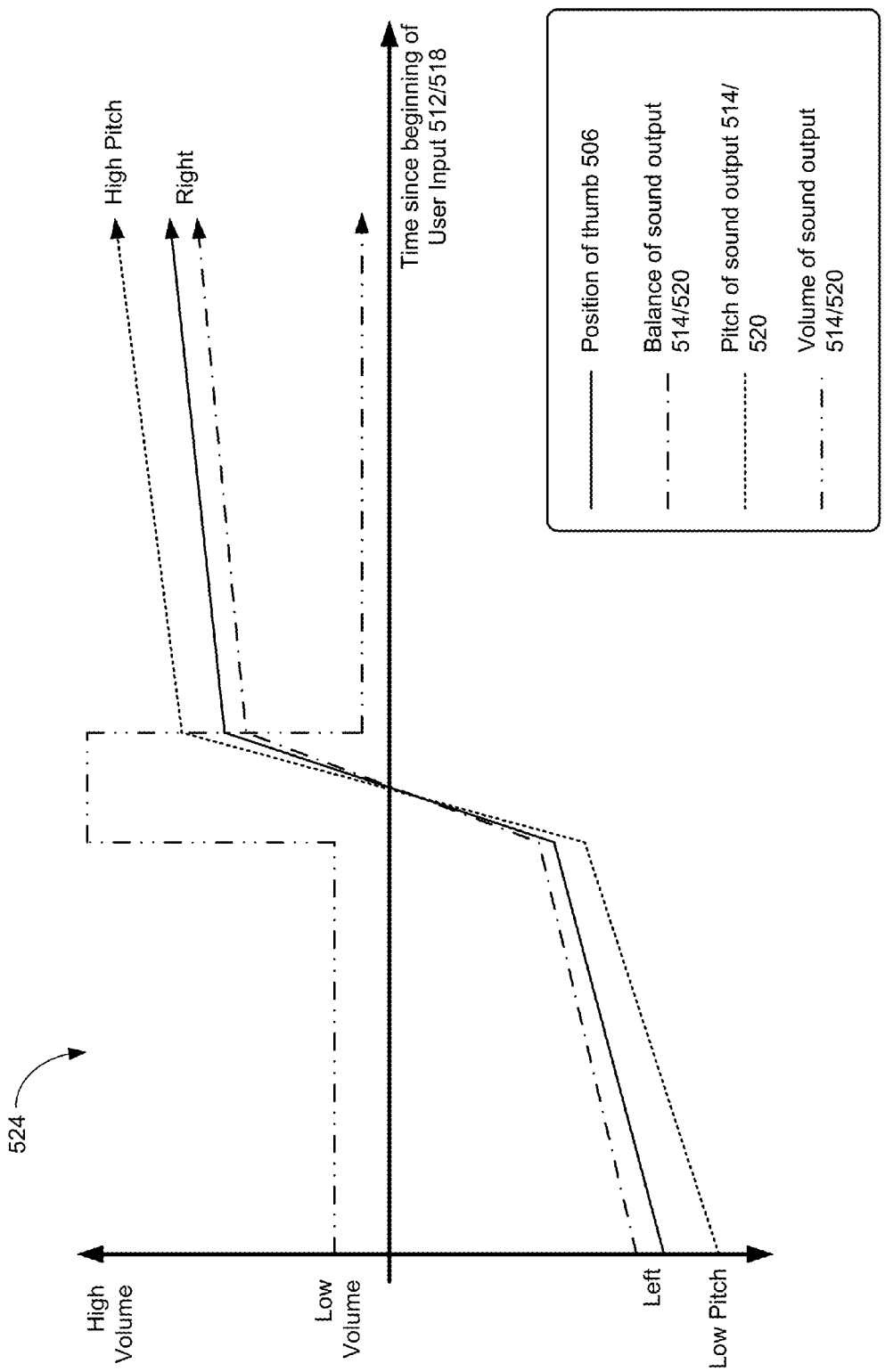
Figure 5R:
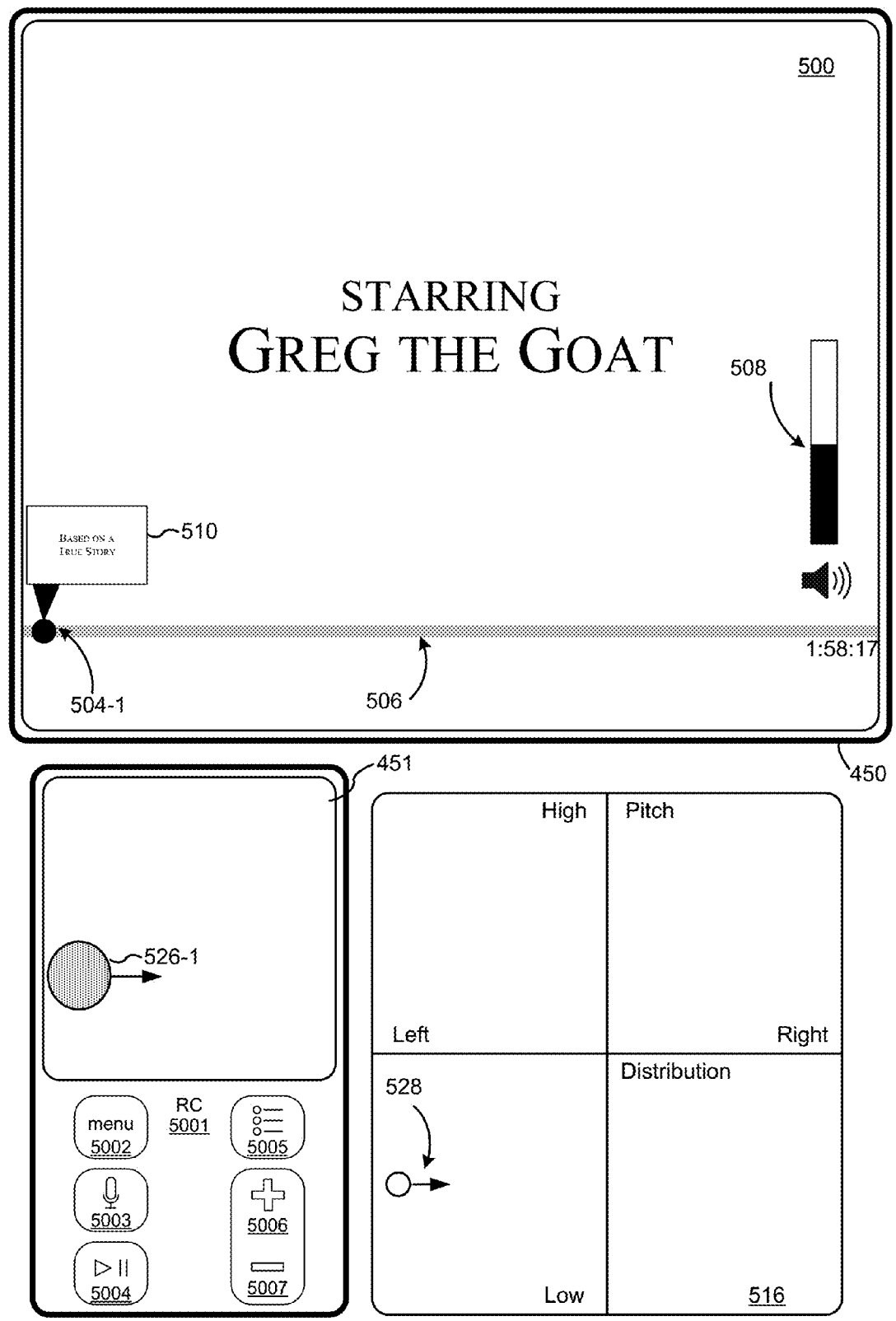
Figure 5S:
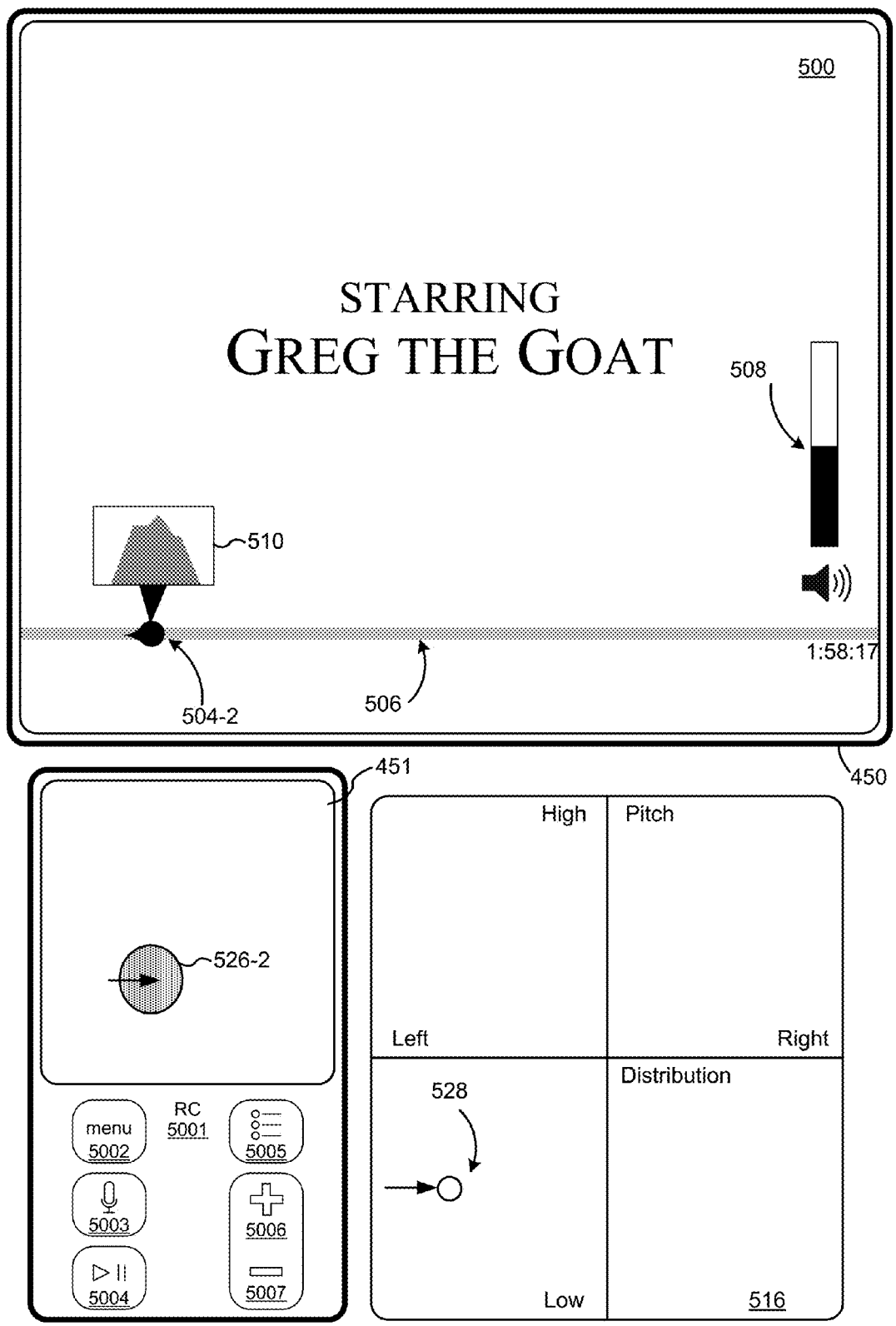

FIGS. 5A-5SS illustrate exemplary user interfaces for providing audio feedback in accordance with some embodiments. The user interfaces in these figures are used to illustrate the processes described below, including the processes in FIGS. 6A-6C, 7A-7D, 8A-8C, 9A-9C, and 10A-10B. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A.

Attention is now directed toward embodiments of user interfaces ("UI") and associated processes that may be implemented on an electronic device that is in communication with a display and an audio system, such as portable multifunction device 100 or device 300, as shown in FIG. 4C. In some embodiments, the electronic device includes the display. In some embodiments, the electronic device includes the audio system. In some embodiments, the electronic device includes neither the display nor the audio system. In some embodiments, the display includes the audio system (e.g., the display and the audio system are components of a television). In some embodiments, certain components of the audio system and the display are separate (e.g., the display is a component of a television and the audio system includes a sound bar that is separate from the television). In some embodiments, the electronic device is in communication with a separate remote control through which it receives user inputs (e.g., the remote control includes a touch-sensitive surface or a touch screen through which the user interacts with the electronic device). In some embodiments, the remote control includes a motion sensor (e.g., an accelerometer and/or a gyroscope) to detect a motion of the remote control (e.g., a user picking up the remote control).

FIGS. 5A-5G illustrate exemplary user interfaces for changing visual characteristics of a user interface in conjunction with changing audio components corresponding to user interface objects, in accordance with some embodiments. The user interfaces in these figures are used to illustrate the processes described below, including the processes in FIGS. 6A-6C.

FIG. 5A illustrates that user interface 517 generated by the device is displayed on display 450. In some embodiments, the visual characteristics of various user interface objects described with reference to FIGS. 5A-5G are determined independently of a user input (e.g., the visual characteristics of the user interface objects are determined in the absence of a user input). In some embodiments, user interface 517 is a screen saver user interface.

User interface 517 includes a first user interface object 501-*a* (e.g., a first bubble). First user interface object 501-*a* has various visual characteristics, including a shape (e.g., a circle), a size, and a position on display 450. The device also provides (e.g., concurrently with providing data to display 450), to an audio system (e.g., a speaker system on display 450 or a stand-alone audio system), a first audio component 503 of a sound output that corresponds to first user interface object 501-*a*.

In some embodiments, one or more characteristics of first audio component 503 associated with first user interface object 501-*a* correspond to visual characteristics of first user interface object 501-*a*. For example, as shown in audio diagram 516, the pitch of first audio component 503 corresponds to the initial size of first user interface object 501-*a* (the pitch of the first audio component 503 is represented by a vertical position of the circle representing first audio component 503 in audio diagram 516). As another example, the stereo balance (e.g., left/right distribution in audio diagram 516) of first audio component 503 corresponds to a horizontal position of first user interface object 501-*a* on display 450. In some embodiments, one or more characteristics of first audio component 503 corresponding to first user interface object 501-*a* are determined in accordance with one or more visual characteristics of first user interface object 501-*a*. Alternatively, in some embodiments, one or more visual characteristics of first user interface object 501-*a* are determined in accordance with one or more characteristics of first audio component 503.

While user interface 517 is being presented on display 450 and the sound output is being provided by the audio system, the device provides, to display 450, data to update user interface 517 (e.g., first user interface object 501-*a* moves across display 450 and the size of first user interface object 501-*a* increases as shown in FIG. 5B). Providing the data to update user interface 517 occurs independently of user input (e.g., no user input is detected on remote control 5001 in FIG. 5A). The device also provides, to the audio system, sound information to update the sound output, as illustrated in audio diagram 516 in FIG. 5B (e.g., the stereo balance of audio component 503 shifts toward the right as represented by a movement of the graphical representation of audio component 503 toward the right in audio diagram 516 in FIG. 5B, and the volume of audio component 503 decreases as represented by a reduced size of the graphical representation of audio component 503 in audio diagram 516 in FIG. 5B).

FIG. 5B shows user interface 517 at a time shortly after FIG. 5A. In FIG. 5B, user interface 517 includes second user interface object 501-*b* (e.g., a second bubble) with visual characteristics that optionally differ from the visual characteristics of first user interface object 501-*a* (e.g., the position and the size of second user interface object 501-*b* are different from the position and the size of first user interface object 501-*a*). The device also provides (e.g., concurrently with providing data to display 450), to the audio system, second audio component 505 of the sound output that corresponds to second user interface object 501-*b*. For example, because the initial size of second user interface object 501-*b* (FIG. 5B) is larger than the initial size of first user interface object 501-*a* (FIG. 5A), the pitch of audio component 505 is lower (represented by a lower position of second audio component 505 in audio diagram 516 in FIG. 5B) than that of first audio component 503. In some embodiments, second audio component 505 is selected based at least in part on first audio component 503. For example, in some embodiments, first audio component 503 and second audio component 505 have respective pitches that make up two pitches (e.g., notes) of a chord (e.g., an A-minor chord).

As shown in FIG. 5B, updating user interface 517 and updating the sound output includes changing at least one of the visual characteristics of first user interface object 501-*a* in conjunction with changing first audio component 503 in a way that corresponds to the changing visual characteristics of first user interface object 501-*a*. For example, first user interface object 501-*a* in FIG. 5B has enlarged as compared to first user interface object 501-*a* in FIG. 5A, and, correspondingly, the volume of first audio component 503 has decreased in FIG. 5B.

FIG. 5C shows user interface 517 at a time shortly after FIG. 5B. In FIG. 5C, user interface 517 includes third user interface object 501-*c* (e.g., a third bubble) with visual characteristics that optionally differ from the visual characteristics of first user interface object 501-*a* and second user interface object 501-*b* (e.g., the position and the size of third user interface object 501-*c* are different from the position and the size of first user interface object 501-*a* and the position and the size of first user interface object 501-*b*). The device also provides (e.g., concurrently with providing data to display 450), to the audio system, third audio component 507 of the sound output that corresponds to third user interface object 501-*c*. In some embodiments, because the initial size of third user interface object 501-*c* (FIG. 5C) is smaller than the initial size of second user interface object 501-*b* (shown in FIG. 5B) or first user interface object 501-*a* (shown in FIG. 5A), the pitch of third audio component 507 is higher (represented by a higher vertical position of audio component 507 in audio diagram 516 in FIG. 5C) than that of first audio component 503 or second audio component 505, as depicted in FIG. 5C. In some embodiments, third audio component 507 is selected based at least in part on the first audio component 503. For example, in some embodiments, first audio component 503, second audio component 505, and third audio component 507 have respective pitches that make up three pitches (e.g., notes) of a chord (e.g., an A-minor chord).

As shown in FIG. 5C, updating user interface 517 and updating the sound output includes changing at least one of the visual characteristics of second user interface object 501-*b* in conjunction with changing second audio component 505 in a way that corresponds to the changing visual characteristics of second user interface object 501-*b*. For example, FIG. 5C shows that second user interface object 501-*b* has enlarged as compared to FIG. 5B, and, correspondingly, the volume of second audio component 505 has decreased in FIG. 5C (e.g., as represented by a reduced size of the graphical representation of audio component 505 in audio diagram 516 in FIG. 5C). In addition, the visual characteristics of first user interface object 501-*a*, and the corresponding first audio component 503, are similarly updated between FIG. 5B and FIG. 5C.

FIG. 5D illustrates another update to the sound output and user interface 517. In this example, second user interface object 501-*b* grows larger and the volume of corresponding second audio component 505 decreases, and third user interface object 501-*c* grows larger and the volume of corresponding third audio component 507 decreases. In addition, first user interface object 501-*a* grows larger and moves to the right, thus the volume of corresponding first audio component 503 decreases and the balance of first audio component 503 shifts toward the right.

FIG. 5E illustrates another update to the sound output and user interface 517. In this example, second user interface object 501-*b* grows larger and the volume of corresponding second audio component 505 decreases, and third user interface object 501-*c* grows larger and the volume of corresponding third audio component 507 decreases. However, the device has provided data to display 450 to update user interface 517 including ceasing to display first user interface object 501-*a* (e.g., by having first user interface object 501-*a* move/slide off display 450 and/or fade out). In conjunction, the device has provided data to the audio system to update the sound output including ceasing to provide first audio component 503 that corresponds to first user interface object 501-*a*.

FIG. 5F illustrates user interface 517 at a later time. In FIG. 5F, fourth user interface object 501-*d* and fifth user interface object 501-*e* are moving. In conjunction, audio component 509 and audio component 511 are shifting in their respective directions in accordance with the movement of fourth user interface object 501-*d* and fifth user interface object 501-*e*. In FIG. 5F, the device also detects user input 513 on a respective button of remote control 5001 (e.g., on menu button 5002). In response to detecting user input 513, the device provides, to the audio system, sound information to change audio component 509 and audio component 511 (e.g., by discontinuing audio components 509 and 511), as shown in FIG. 5G. The device also provides, to display 450, data to update user interface 517 and display one or more control user interface objects (e.g., application icons 532-*a* through 532-*e* and movie icons 534-*a* through 534-*c*). In some embodiments, fourth user interface object 501-*d* and fifth user interface object 501-*e* continue to be displayed with the control user interface objects. For example, fourth user interface object 501-*d* and fifth user interface object 501-*e* are displayed lower in a z-direction as compared to the control user interface objects so that fourth user interface object 501-*d* and fifth user interface object 501-*e* are overlaid by the control user interface objects, as shown in FIG. 5G.

FIG. 5H illustrates an audio envelope 515 in accordance with some embodiments. The vertical axis of audio envelope 515 represents amplitude (volume) and the horizontal axis represents time, starting a time of a user input $t_o$. Audio envelope 515 includes an attack period A between $t_0$ and $t_1$ (in which the amplitude increases over time), a decay period D between $t_1$ and $t_2$ (in which the amplitude decreases over time), a sustain period S between $t_2$ and $t_3$ in which the amplitude remains constant over time, and a release period R between $t_3$ and $t_4$ in which the amplitude decreases exponentially/asymptotically over time. After time $t_4$, the sound output corresponding to the user input is discontinued. In some embodiments, an audio envelope 515 does not include the decay period D and/or the sustain period S.

In some embodiments, a respective audio component provided by the audio system has an audio envelope analogous to audio envelope 515 shown in FIG. 5H. In response to detecting a user input (e.g., user input 513 in FIG. 5F), the electronic device provides to the audio system sound information to change the respective audio component. In some embodiments, one or more aspects of the audio envelope are modified in response to detecting the user input (e.g., an attack of the respective audio component is increased).

FIGS. 5I-5S illustrate user interfaces that provide audio feedback when a user manipulates a control object (e.g., a thumb on a slider or a knob) in a user interface, in accordance with some embodiments. The user interfaces in these figures are used to illustrate the processes described below, including the processes in FIGS. 7A-7D.

FIG. 5I illustrates display 450 and remote control 5001, both of which are in communication with an electronic device that performs certain operations described below. In some embodiments, remote control 5001 has touch-sensitive surface 451. In some embodiments, remote control 5001 also has one or more buttons or affordances, such as menu button 5002, microphone button 5003, play/pause button 5004, watch list button 5005, volume increase button 5006, and/or volume decrease button 5007. In some embodiments, menu button 5002, or an analogous affordance, allows a home screen user interface to be displayed on display 450. In some embodiments, microphone button 5003, or an analogous affordance, allows a user to provide verbal commands or voice entry to the electronic device. In some embodiments, play/pause button 5004 is used to play or pause audio or visual media portrayed on display 450. In some embodiments, watch list button 5005 allows a watch list user interface to be displayed on display 450. In some embodiments, a watch list user interface provides a user with a plurality of audio/visual media items to play using the electronic device.

FIG. 5I illustrates video playback view 500, displayed on display 450. Video playback view 500 is a user interface providing display of a media item (e.g., a movie or television show). In some cases, the display of the media item is in a paused or playing state. In some embodiments, video playback view 500 provides display of video information associated with navigation of the media item. FIG. 5I illustrates opening credits of a movie being displayed during normal playback. In some embodiments, while a media item is in a paused or playing state, user input 502 (e.g., a light touch contact) is detected on touch-sensitive surface 451.

FIG. 5J illustrates that, in some embodiments, in response to receiving user input 502, the electronic device provides to display 450 data to provide a plurality of user interface objects on video playback view 500 (e.g., a video playback view user interface). The plurality of user interface objects includes thumb 504 (also sometimes referred to as a playhead) on navigation slider 506 (also sometimes referred to as a scrubber bar). Thumb 504 is an example of a control user interface object that is configured to control a parameter (e.g., a current position/time within navigation slider 506, which represents a timeline of the total duration of the displayed media item). The plurality of user interface objects also includes volume control user interface object 508 (e.g., an audio control user interface object that indicates the volume of sound output by the audio system).

In FIG. 5J, thumb 504 is represented as a square, which provides a visual indication that a current focus of the user's interaction with video playback view 500 is not over thumb 504. For comparison, in FIG. 5K, thumb 504 is represented as a circle with a video preview 510, which provides a visual indication that the current focus of the user's interaction with video playback view 500 is over thumb 504. In some embodiments, video preview 510 displays a preview image of a location within the media item that corresponds to the position of thumb 504 within slider 506. As shown in subsequent figures (e.g., FIG. 5L), in some embodiments, thumb 504 (having the shape of a circle) distorts as the user interacts with thumb 504.

FIG. 5K illustrates remote control 5001 detecting user input 512, beginning at location 512-1 and ending at location 512-2 (FIG. 5L), that is an interaction to drag the position of thumb 504 within slider 506.

In some embodiments, remote control 5001 detects the user inputs described herein and conveys information about user inputs to the electronic device. When the information about a user input is conveyed to the electronic device, the electronic device receives the user input. In some embodiments, the electronic device directly receives a user input (e.g., detects a user input on a touch-sensitive surface integrated with the electronic device).

In some embodiments, the electronic device determines that user input 512 is an interaction to adjust the position of thumb 504 within slider 506 when user input 512 meets predefined criteria, such as remote control 5001 detecting an increase in contact intensity of the user input while the current focus is over thumb 504. For example, in FIG. 5K, user input 512 is a drag gesture with an intensity above a light press threshold $IT_L$ that is detected while the current focus is over thumb 504.

User input 512 drags thumb 504 from location 504-1 (FIG. 5K) to location 504-2 (FIG. 5L) on display 450. Accordingly, while electronic device receives user input 512 (e.g., concurrently with, continuously with, and/or in response to, user input 512), the electronic device provides data to display 450 to move thumb 504 so that the user appears to be dragging thumb 504 in real time.

The electronic device also provides, while receiving user input 512 (e.g., concurrently with, continuously with, and/or in response to, user input 512), sound information to provide sound output 514 (represented in audio diagrams 516, FIGS. 5K-5L). In some embodiments, sound output 514 is audio feedback that corresponds to the dragging of thumb 504 (e.g., sound output 514 has one or more characteristics that change in accordance with the dragging of thumb 504 from location 504-1 to location 504-2). For example, the arrow drawn from sound output 514 in audio diagram 516 corresponds to the dragging of thumb 504 from location 504-1 to location 504-2 and indicates that sound output 514 is provided concurrently and/or continuously with user input 512. In addition, the arrow drawn from sound output 514 indicates the manner in which sound output 514 changes in accordance with movement of thumb 504 (e.g., the stereo balance of sound output 514 shifts toward the right), as described below.

In this example, the audio system includes two or more speakers including a left speaker and a right speaker. The one or more characteristics of sound output 514 include a balance (e.g., a ratio of sound output intensity) between the left speaker and the right speaker (represented on the horizontal axis of audio diagram 516). In some embodiments, the one or more characteristics also include a pitch of sound output 514 (represented on the vertical position of sound output 514 in audio diagram 516). In some embodiments, sound output 514 has only a single characteristic that is based on the position or movement of user input 512 (e.g., such as pitch or balance). The direction and magnitude of the arrow drawn from sound output 514 in audio diagram 516 indicate how, in this example, the pitch and balance change in accordance with the dragging of thumb 504 from location 504-1 to location 504-2. Thus, as thumb 504 moves rightward from location 504-1 to location 504-2, the balance of sound output 514 shifts rightward, giving the user an audio impression of moving rightward. The pitch of sound output 514 also shifts higher during the rightward movement of thumb 504, intuitively giving the user the impression of moving "higher" in the time represented by slider 506. Alternatively, in some embodiments, the pitch shifts lower during the rightward movement of thumb 504.

FIGS. 5M-5N are analogous to FIGS. 5K-5L. However, in FIGS. 5M-5N, remote control 5001 detects a user input 518 that is otherwise analogous to user input 512 but has a greater speed. Like user input 512, user input 518 starts dragging thumb 504 at the location 504-1. But because user input 518 has a greater speed, user input drags thumb 504 farther than does user input 512, to a location 504-3. The electronic device provides, while receiving user input 518 (e.g., concurrently with, continuously with, and/or in response to user input 518), sound information to provide a sound output 520 (represented in audio diagrams 516, FIGS. 5M-5N).

In some embodiments, the electronic device provides, to the user, various audio and visual indicia indicating the speed of a respective user input. For example, the volume of sound output 514 is based on the speed of the movement of thumb 504 from location 504-1 to location 504-2 (or the speed of user input 512 from location 512-1 to 512-2) as shown in FIGS. 5K-5L; and the volume of sound output 520 is based on the speed of the movement of thumb 504 from location 504-1 to location 504-3 (or the speed of the user input 518 from location 518-1 to 518-2). In audio diagrams 516 (FIGS. 5K-5N), the volume of each respective sound output is depicted by the size of the circle representing the respective sound output. As can be seen from a comparison of sound output 514 (FIGS. 5K-5L) and sound output 520 (FIGS. 5M-5N), the faster user input 518 (FIGS. 5M-5N) results in a louder sound output 520 compared with the slower user input 512 (FIGS. 5K-5L) and the softer sound output 514.

In some embodiments, the electronic device visually distinguishes thumb 504 based on the movement (e.g., speed or location) of thumb 504 or based on the movement (e.g., speed and/or location) of user input 512/518. For example, as shown in FIGS. 5L and 5N, thumb 504 is displayed with a tail (e.g., thumb 504 is lengthened/stretched) based on the speed and/or direction of the user input. Since both user input 512 and user input 518 drag thumb 504 to the right, thumb 504 is stretched to the left in both examples (e.g., to resemble a comet moving toward the right). But since user input 518 is faster than user input 512, thumb 504 is stretched more as a result of user input 518 (FIG. 5N) than as a result of user input 512 (FIG. 5L).

FIGS. 5O-5P illustrate a continuation of user input 518 from location 518-2 (FIG. 5O) to location 518-3 (FIG. 5P) which drags thumb 504 from location 504-3 (FIG. 5O) near the middle of slider 506 to location 504-4 which corresponds to a terminus of slider 506 (FIG. 5P). As described above, the electronic device provides, while receiving the continuation of user input 518 (e.g., concurrently with, continuously with, and/or in response to, user input 518), sound information to provide a continuation of sound output 520 (represented in audio diagrams 516 in FIGS. 5O-5P) until thumb 504 reaches location 504-4 (or until a short time before thumb 504 reaches location 504-4). In some embodiments, the electronic device provides, to the audio system, sound information to provide sound output 522 to indicate that thumb 504 is located at a terminus of slider 506 (e.g., sound output 522 is a reverberating "BOING" sound that indicates that thumb 504 has "collided" with the terminus of slider 506). Sound output 522 is distinct (e.g., temporally or aurally) from sound outputs 514 and 520. In some embodiments, sound output 522 does not have one or more characteristics that are based on user input 518 (e.g., whenever thumb 504 collides with a terminus of slider 506, the audio system provides the same sound regardless of the characteristics, such as the speed, of the user input that caused thumb 504 to collide with the terminus of slider 506). Alternatively, in some embodiments, the volume of sound output 522 is based on the speed of user input 518 when it reaches the terminus of slider 506 (e.g., a faster collision with the terminus of slider 506 results in a louder reverberating "BOING" sound). In some embodiments, upon reaching the terminus of slider 506, an animation is displayed of thumb 504 being squished against the terminus of slider 506. Thus, in some embodiments, the electronic device provides discrete (e.g., rather than continuous) audio and visual feedback about certain user interface navigation events (e.g., a control user interface object, such as a thumb, reaching the end of its control range, such as the end of a slider).

FIG. 5Q shows graph 524 illustrating how the electronic device dynamically and fluidly provides audio feedback to the user to aid in manipulation of a control user interface object (e.g., a thumb on a slider). In some embodiments, the one or more characteristics (e.g., balance, pitch, and/or volume) of sound output 514/520 are updated multiple times per second (e.g., 10, 20, 30, or 60 times per second). For example, in some embodiments, the speed of a user input is calculated 60 times per second based on the difference between a current location of the user input and a previous location of the user input (e.g., measured 1/60th of a second prior) and the volume of a corresponding sound output is determined 60 times per second based on the speed. Thus, graph 524 illustrates that sound output 514/520 are provided continuously and concurrently with user input 512/518. The pitch and balance of sound output 514/520 are determined perceptibly instantaneously based on the position of user input 512/518 (or the position of thumb 504, as described above). The volume of sound output 514/520 is determined perceptibly instantaneously with a change in the position (e.g., a speed) of the user input 512/518.

In some embodiments, the pitch and balance of sound output 514/520 are determined based on a change in the position (e.g., a speed) of the user input 512/518. In some embodiments, the volume of sound output 514/520 is based on the position of user input 512/518 (or the position of thumb 504, as described above).

Similarly, in some embodiments, the visual characteristics (e.g., the lengthening/stretching) of thumb 504 (FIG. 5L and FIG. 5N) are updated multiple times per second (e.g., 10, 20, 30, or 60 times per second). So, for example, the length of the tail of thumb 504 is updated 60 times per second based on the speed of the user input as described above.

FIGS. 5R-5S are largely analogous to FIGS. 5K-5L, but illustrate embodiments in which a pitch of a continuously provided sound output is proportional to a change or movement of a user input. FIGS. 5R-5S illustrate remote control 5001 detecting user input 526, beginning at location 526-1 and ending at location 526-2 (FIG. 5S), that is an interaction to drag the position of thumb 504 from location 504-1 to location 504-2 within slider 506. Accordingly, while remote control 5001 detects user input 526 (e.g., concurrently with, continuously with, and/or in response to, user input 526), the electronic device provides, to display 450, data to move thumb 504 so that the user appears to be dragging thumb 504 in real time. The electronic device also provides to the audio system, while receiving user input 526 (e.g., concurrently with, continuously with, and/or in response to, user input 526), sound information to provide sound output 528 (depicted in audio diagrams 516 in FIGS. 5R-5S). The difference between sound output 528 (FIGS. 5R-5S) and sound output 514 (FIGS. 5K-5L) is that the pitch of sound output 528 is independent of the movement (e.g., speed, or change in position) of user input 526, while the pitch of sound output 514 varies with the position of user input 512. In some embodiments, a respective sound output has a balance that is based on a direction of the movement of the user input (or the direction of the movement of thumb 504) (e.g., a leftward movement has a left balance and a rightward movement has a right balance, regardless of the position of thumb 504).

Figure 5T:
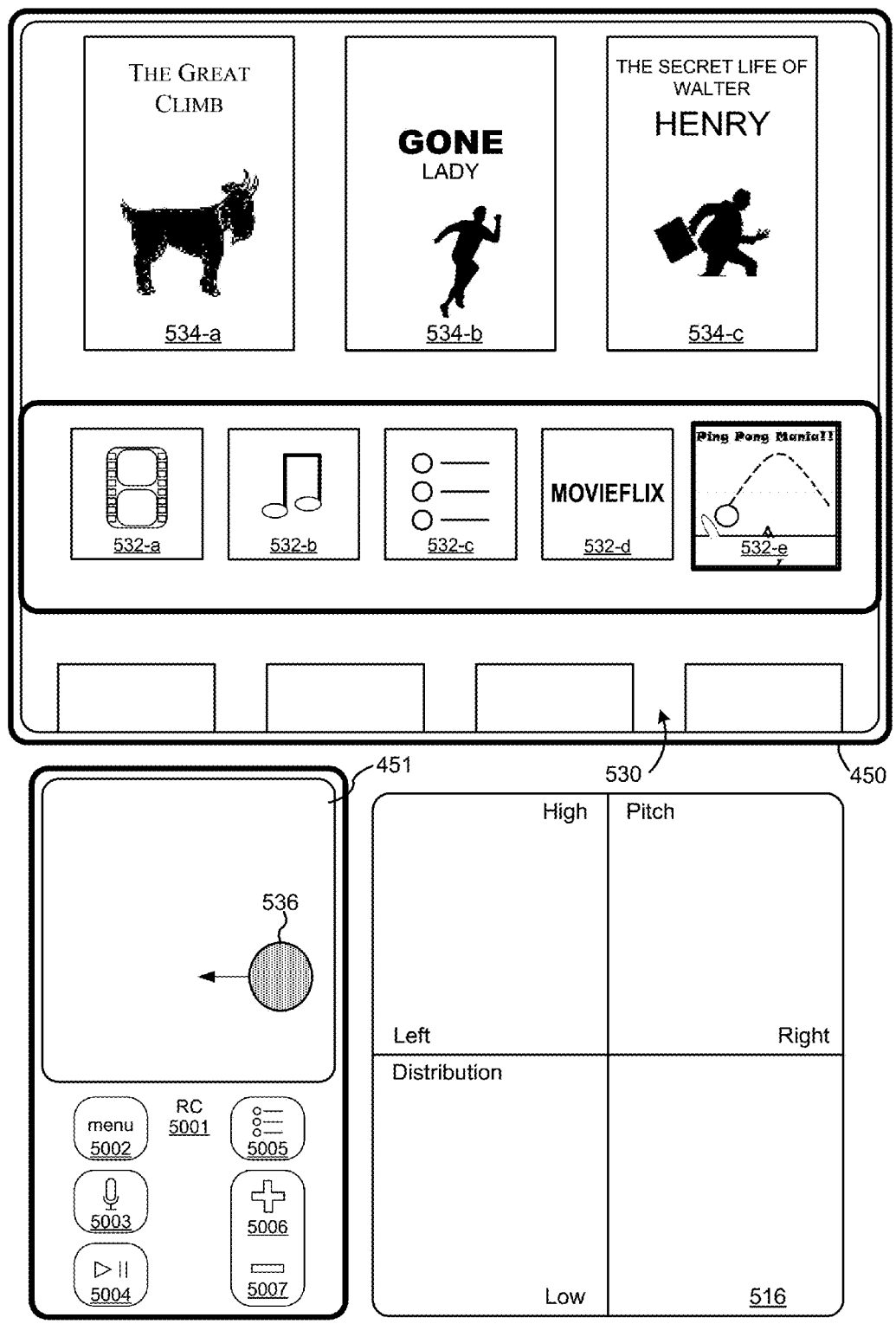

FIGS. 5T-5HH illustrate user interfaces that provide audio feedback when a user navigates over discrete user interface objects (e.g., icons) in a user interface, in accordance with some embodiments. The user interfaces in these figures are used to illustrate the processes described below, including the processes in FIGS. 8A-8C.

FIG. 5T illustrates home screen user interface 530 displayed on display 450. Home screen user interface 530 includes a plurality of user interface objects, which in this example includes application icons 532 (e.g., application icons 532-*a* through 532-*e*, each of which is a first type of user interface object) and movie icons 534 (e.g., movie icons 534-*a* through 534-*c*, each of which is a second type of user interface object). Further, in FIG. 5T, a current focus of home screen user interface 530 is over application icon 532-*e*, and application icon 532-*e* is visually distinguished from the other user interface objects in the plurality of user interface objects (e.g., application icon 532-*e* is slightly larger than other application icons 532 and has a highlighted border) to indicate that the current focus is over application 532-*e*.

In FIG. 5T, the electronic device receives user input 536 on remote control 5001 while home screen user interface 530 is displayed. User input 536 (e.g., a swipe gesture input) has a magnitude (e.g., a speed and/or distance represented by the length of the arrow coming off user input 536, FIG. 5T) and a direction (e.g., a direction in which a user drags her finger on touch-sensitive surface 451 represented by the direction of the arrow coming off of user input 536, FIG. 5T). User input 536 is a request to move the current focus of home screen user interface 530 from application icon 532-*e* to application icon 532-*d*.

Figure 5U:
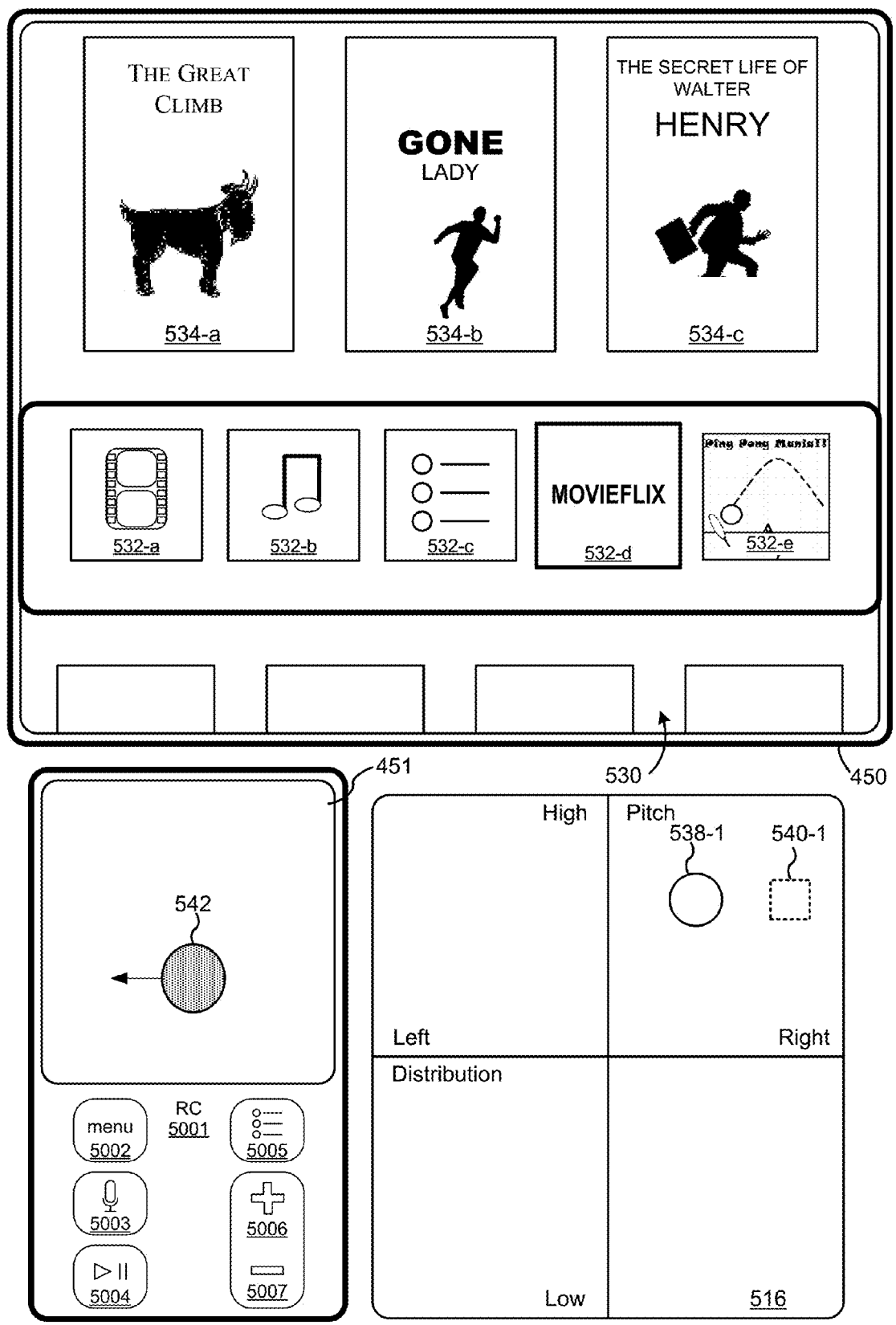

FIG. 5U shows that the current focus has moved from application icon 532-*e* to application icon 532-*d* in response to user input 536 (FIG. 5T). In FIG. 5U, application icon 532-*d* is visually distinguished from the other user interface objects in the plurality of user interface objects to indicate that the current focus is over application icon 532-*d*.

FIG. 5U also illustrates audio diagram 516 showing representations of sound outputs (e.g., sound output 538-1 and optionally, sound output 540-1), provided by the audio system, that corresponds to the movement of the current focus from application icon 532-*e* to application icon 532-*d*. The horizontal axis on audio diagrams 516 represents the stereo balance (e.g., left/right distribution in audio diagram 516) of an audio component. Sound output 538-1 indicates that the current focus has moved to application icon 532-*d*. Optionally, the audio system provides sound output 540-1, which indicates that the current focus has moved from application icon 532-*e*. In some embodiments, the audio system provides sound output 540-1 prior to providing sound output 538-1. In some embodiments, the audio system provides sound output 538-1 without providing sound output 540-1.

The vertical axis of audio diagrams 516 represents the pitch of sound outputs 538 and 540. In some embodiments, the pitch of a respective sound output (e.g., sound output 538-1 and/or sound output 540-1) is based on the size of the user interface object associated with the respective sound output (e.g., the user interface object over which the current focus is located). For example, sound output 538-1 has a pitch that is based on the size of application icon 532-*d*. As discussed below, in some embodiments, a sound output associated with a large user interface object (e.g., movie icon 534) has a lower pitch than a sound output associated with a small user interface object (e.g., application icon 532).

In some embodiments, the pitch of a respective sound output is based on the type of the user interface object that the current focus is over. For example, a sound output associated with a movie icon 534 has a low pitch and a sound output associated with an application icon 532 has a high pitch, regardless of the respective sizes of the application icon 532 and the movie icon 534.

In FIG. 5U, the electronic device receives user input 542 on remote control 5001.

Figure 5V:
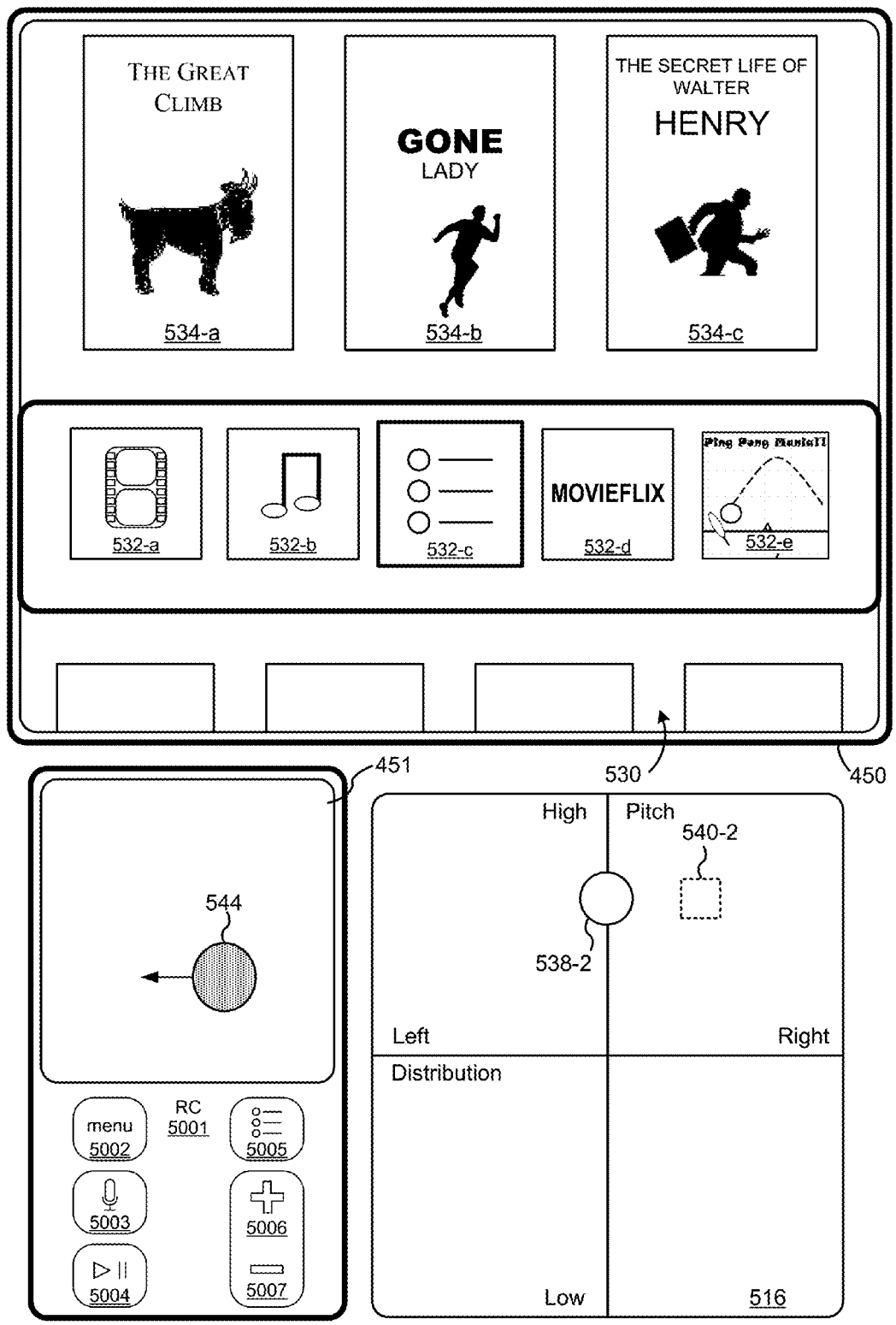

FIG. 5V shows that the current focus has moved from application icon 532-*d* to application icon 532-*c* in response to user input 542 (FIG. 5U). In FIG. 5V, application icon 532-*c* is visually distinguished from the other user interface objects in the plurality of user interface objects to indicate that the current focus is over application icon 532-*c*.

Audio diagram 516 in FIG. 5V includes representations of sound outputs (e.g., sound output 538-2 and optionally, sound output 540-2), provided by the audio system, that corresponds to the movement of the current focus from application icon 532-*d* to application icon 532-*c*. In some embodiments, the audio system provides sound output 540-2, which indicates that the current focus has moved from application icon 532-*d*, in addition to sound output 538-2. In some embodiments, the audio system provides sound output 540-2 prior to providing sound output 538-2. In some embodiments, the audio system provides sound output 538-2 without providing sound output 540-2.

In FIG. 5V, the electronic device receives user input 544 on remote control 5001.

Figure 5W:
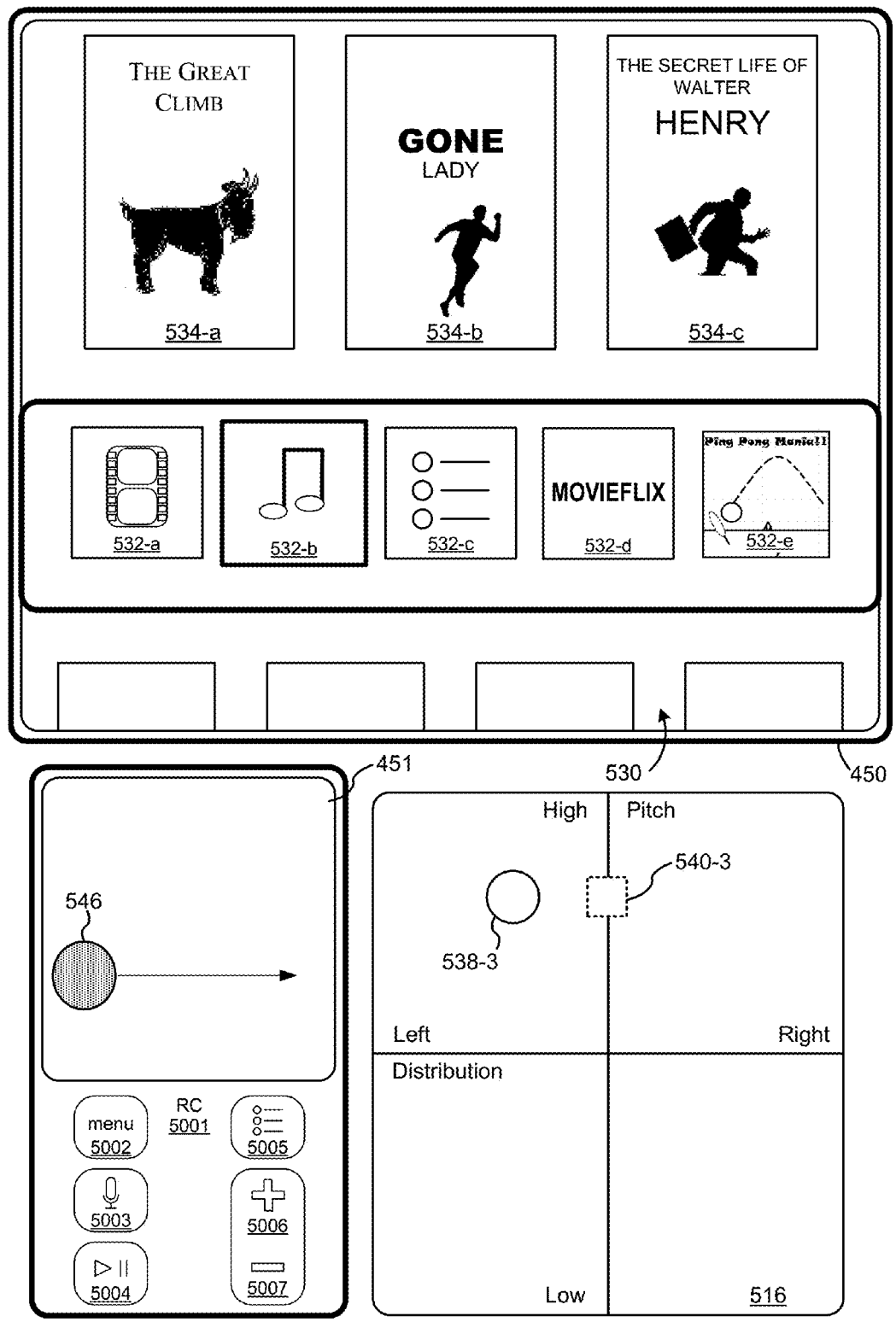

FIG. 5W shows that the current focus has moved from application icon 532-*c* to application icon 532-*b* in response to user input 544 (FIG. 5V). In FIG. 5W, application icon 532-*b* is visually distinguished from the other user interface objects in the plurality of user interface objects to indicate that the current focus is over application icon 532-*b*.

Audio diagram 516 in FIG. 5W includes representations of sound outputs (e.g., sound output 538-3 and optionally, sound output 540-3), provided by the audio system, that corresponds to the movement of the current focus from application icon 532-*c* to application icon 532-*b*.

In FIG. 5W, the electronic device receives user input 546 on remote control 5001. User input 546 has a higher magnitude (e.g., speed and/or distance) than user inputs 536 (FIG. 5T), 542 (FIG. 5U), and 544 (FIG. 5V).

Figure 5X:
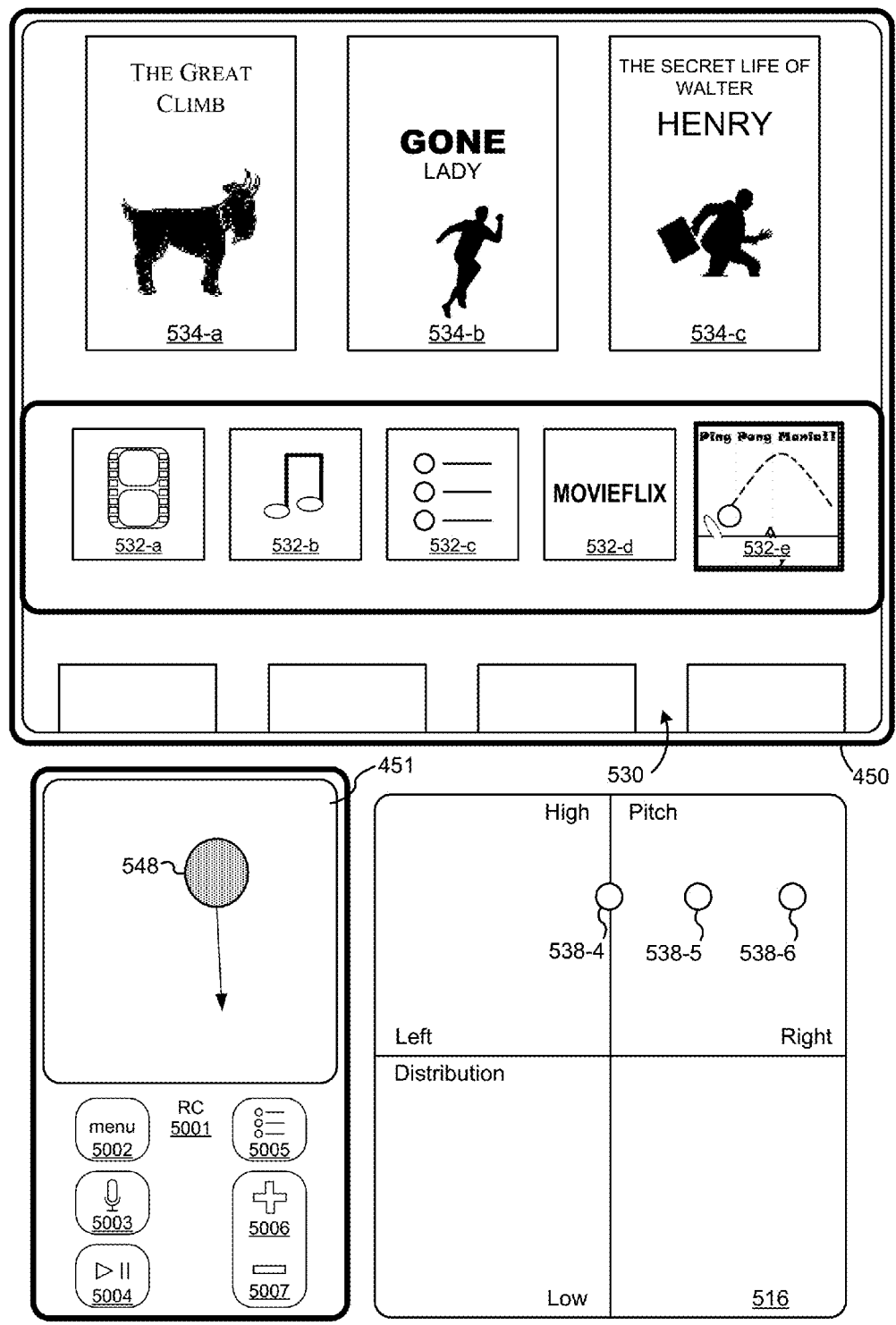

FIG. 5X illustrates that the current focus has moved from application icon 532-*b* to application icon 532-*e* (through application icons 532-*c* and 532-*d*) in response to user input 546 (FIG. 5W).

Audio diagram 516 in FIG. 5X includes representations of sound outputs 538-4, 538-5, and 538-6, provided by the audio system, that correspond to the movement of the current focus from application icon 532-*b* to application icon 532-*e* through application icons 532-*c* and 532-*d* (e.g., sound output 538-4 corresponds to application icon 532-*c*, sound output 538-5 corresponds to application icon 532-*d*, and sound output 538-6 corresponds to application icon 532-*e*). Although sound outputs 538-4, 538-5, and 538-6 are shown together in audio diagram 516, sound outputs 538-4, 538-5, and 538-6 are provided sequentially (e.g., sound out 538-4 is followed by sound output 538-5, which is followed by sound output 538-6).

Sound outputs 538-4, 538-5, and 538-6 have a reduced volume (as represented by a smaller size of representations in audio diagram 516 than the representation of sound output 538-3 in FIG. 5W) to avoid repeating sounds of a large volume, which reduces user experience.

In FIG. 5X, the electronic device receives user input 548 on remote control 5001. User input 548 corresponds to a request to move the current focus from application icon 532-*e* to an icon in a next row (e.g., a row of icons below application icon 532-*e*).

Figure 5Y:
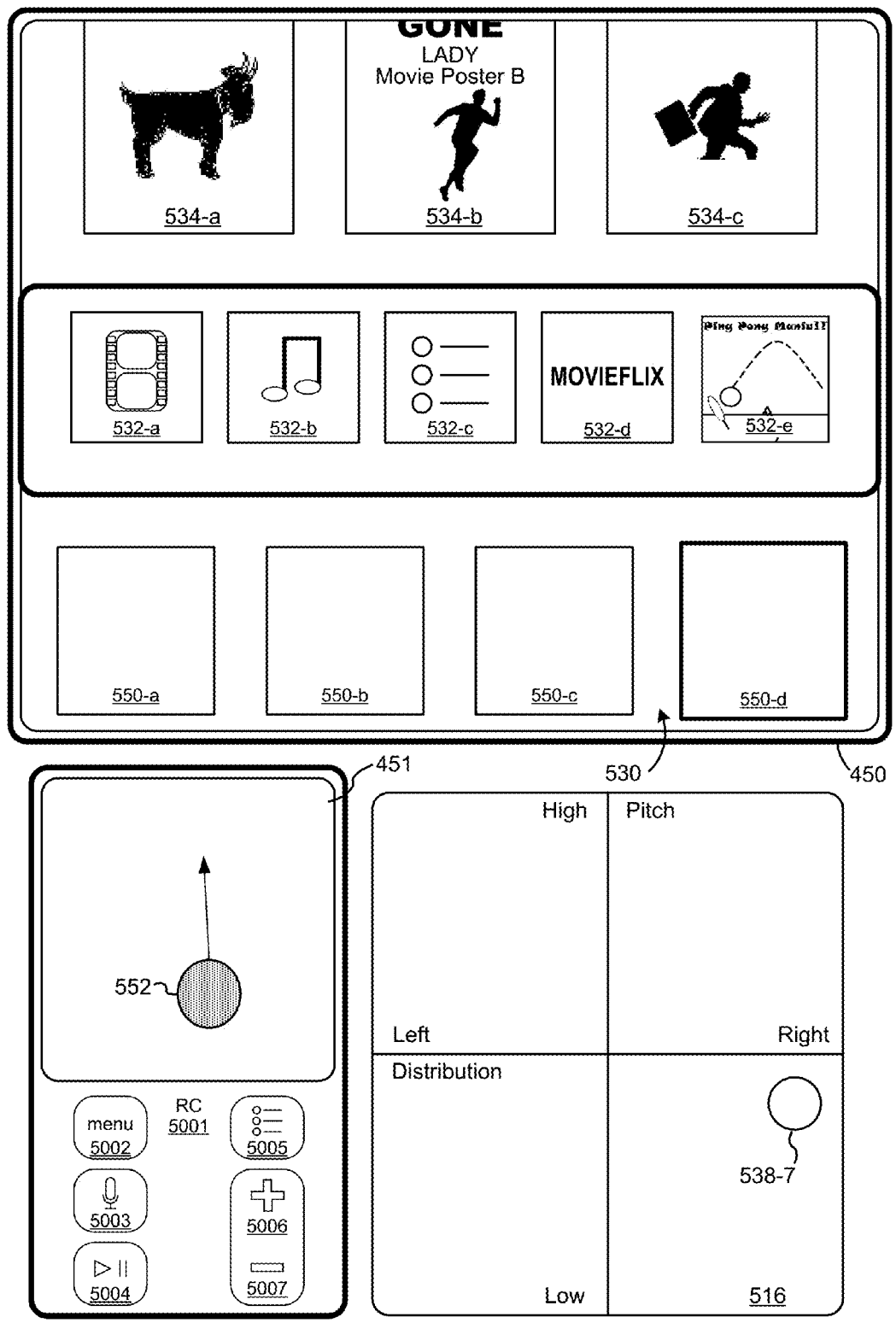

FIG. 5Y illustrates that home screen user interface 530 has scrolled in response to user input 548, revealing icons 550-*a* through 550-*d*. In addition, the current focus has moved from application icon 532-*e* to icon 550-*d* in response to user input 548.

Audio diagram 516 in FIG. 5Y includes a representation of sound output 538-7, provided by the audio system, that corresponds to the movement of the current focus from application icon 532-*e* to icon 550-*d*. Sound output 538-7 has a lower pitch than sound outputs associated with application icons 532 (e.g., sound outputs 538-1 through 538-6).

In FIG. 5Y, the electronic device receives user input 552 on remote control 5001. User input 552 corresponds to a request to move the current focus from icon 550-*d* to an icon in a row of icons above icon 550-*d* (e.g., a row of application icons 532).

Figure 5Z:
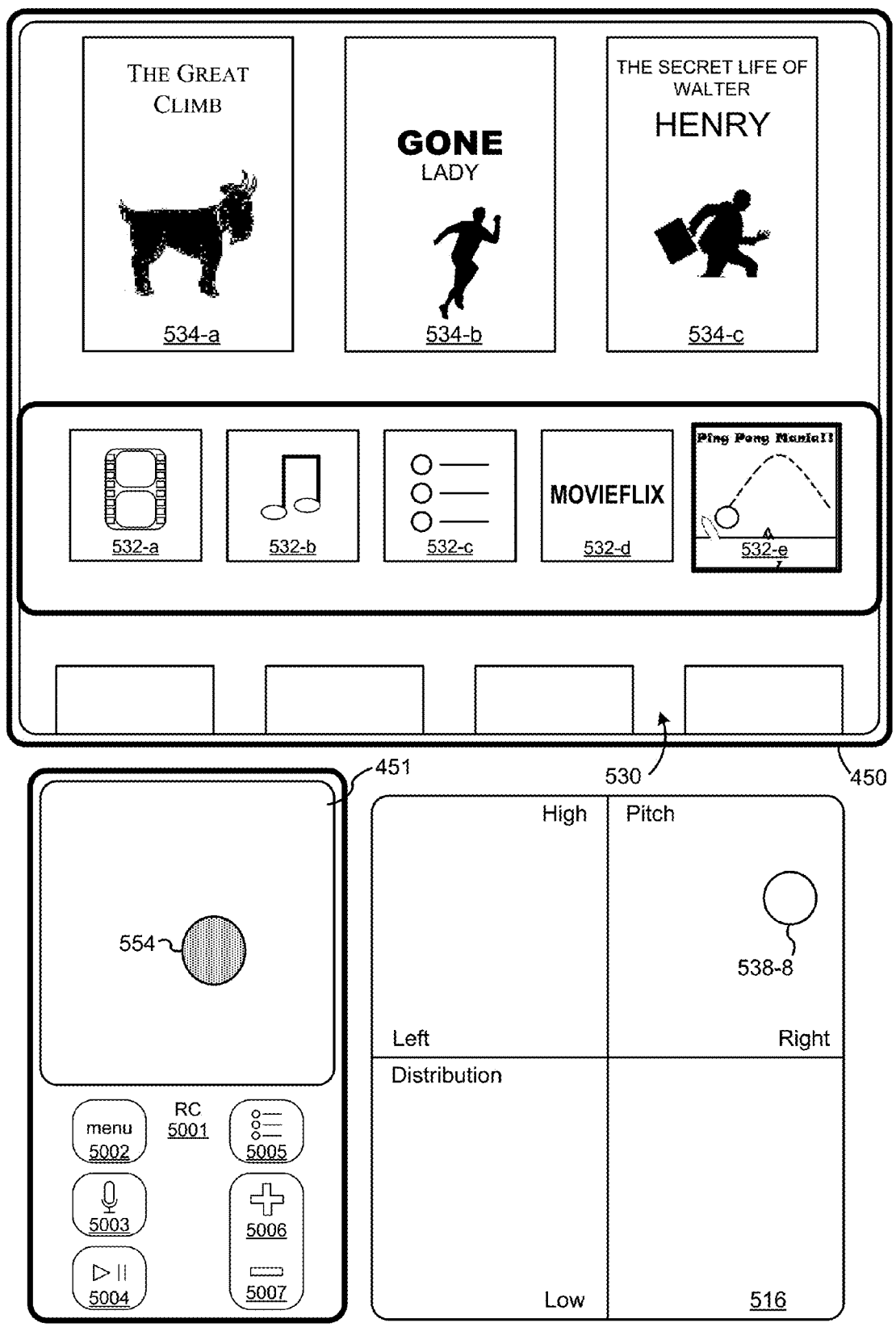
Figure 5A:
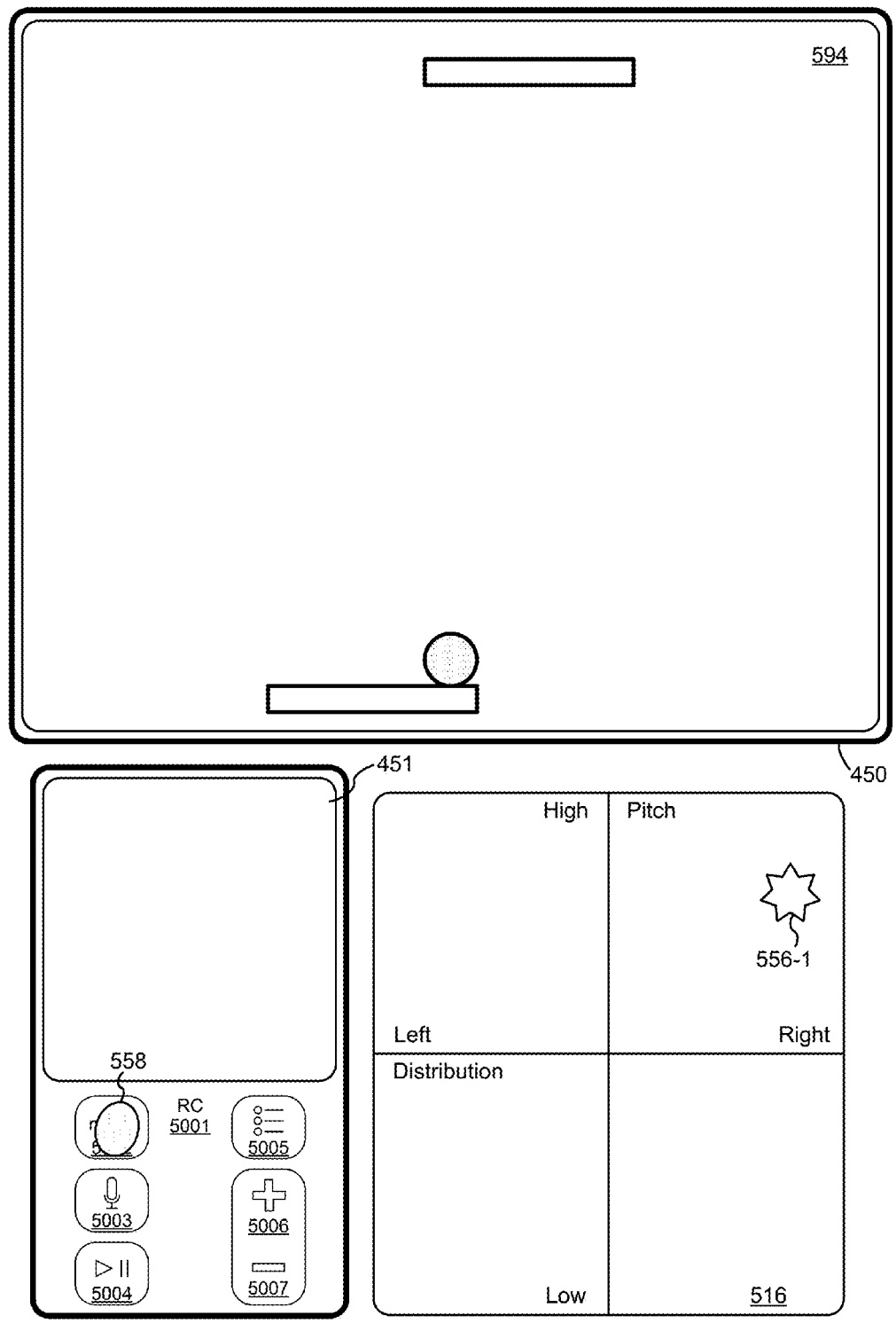
Figure 5B:
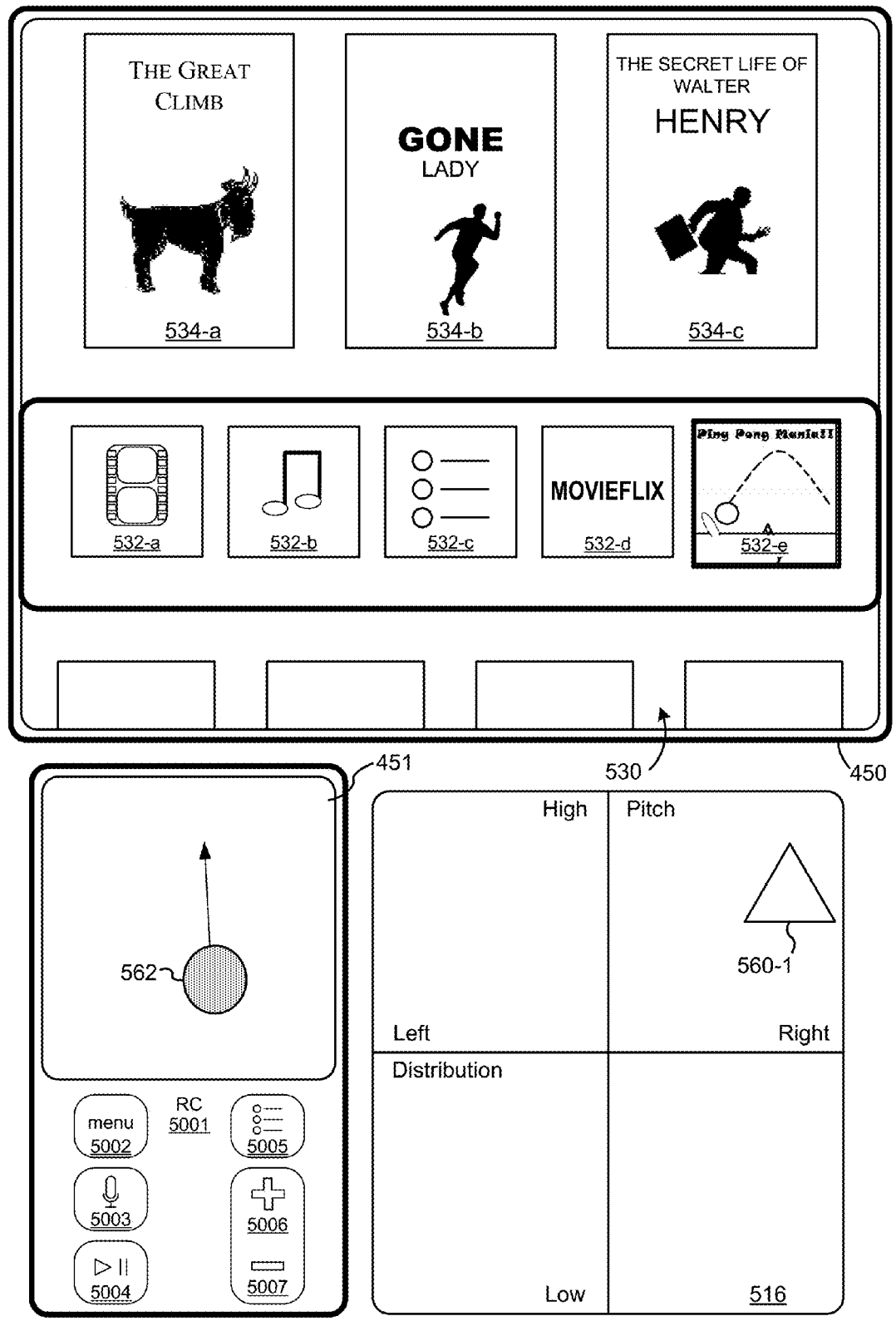
Figure 5C:
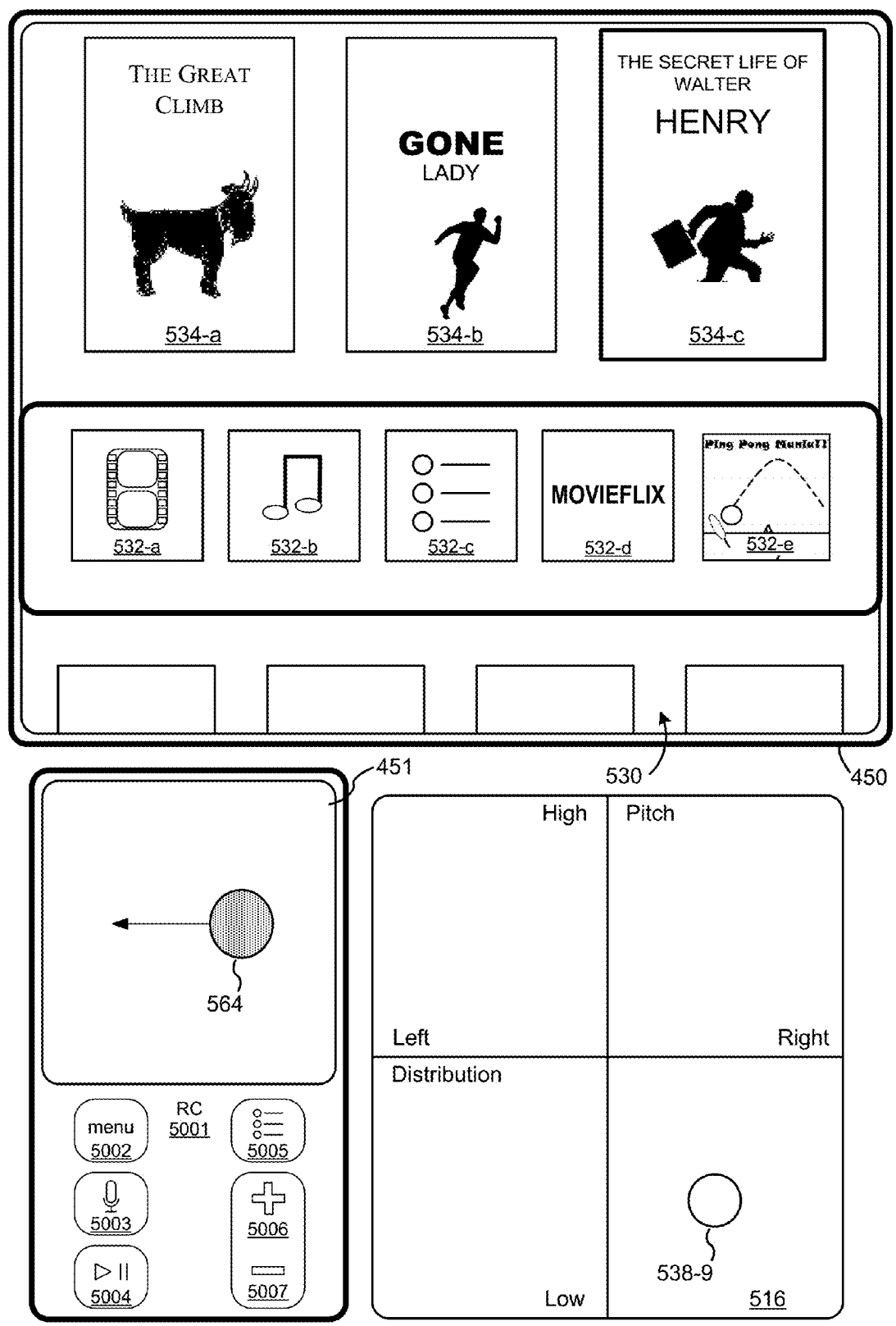
Figure 5D:
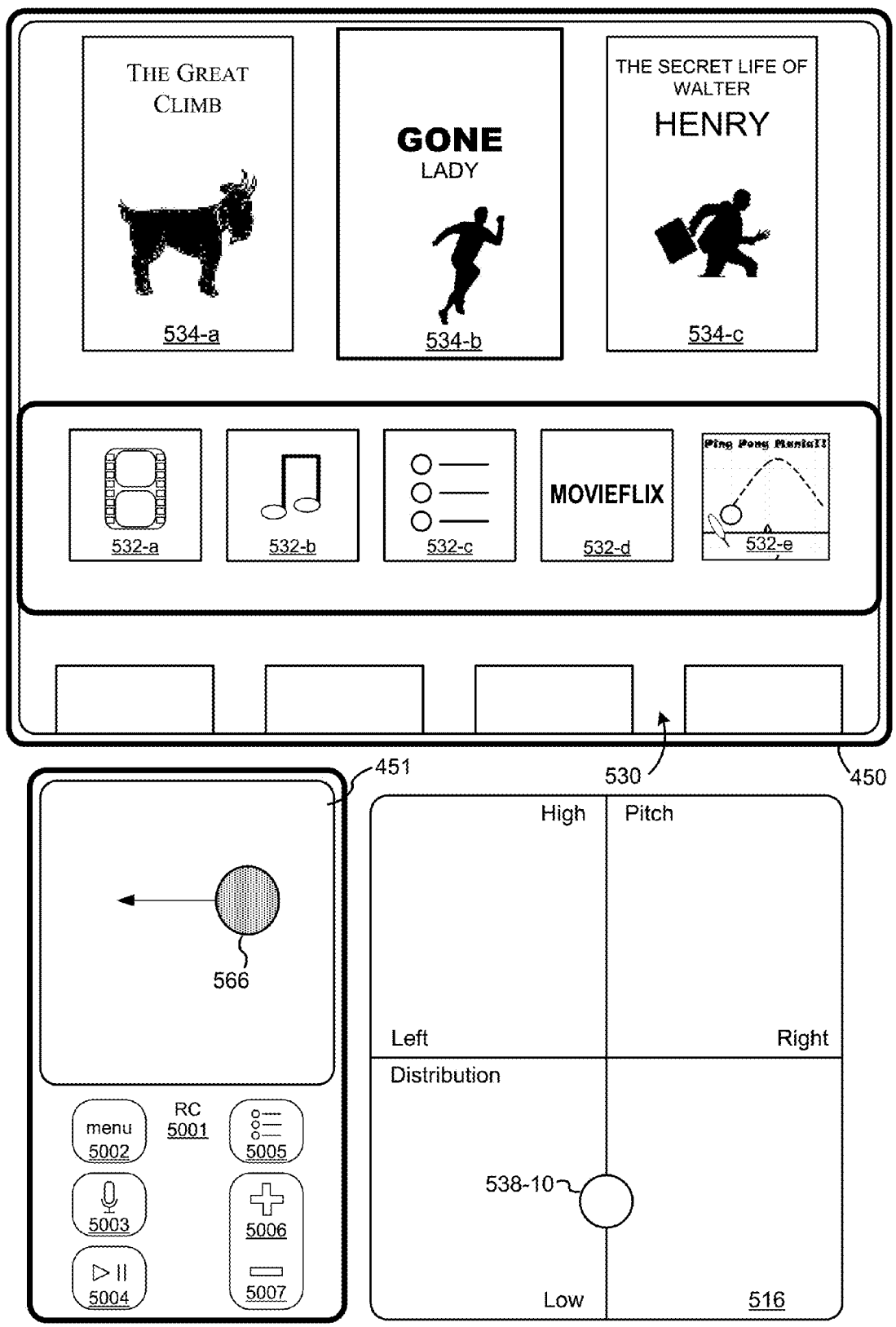
Figure 5E:
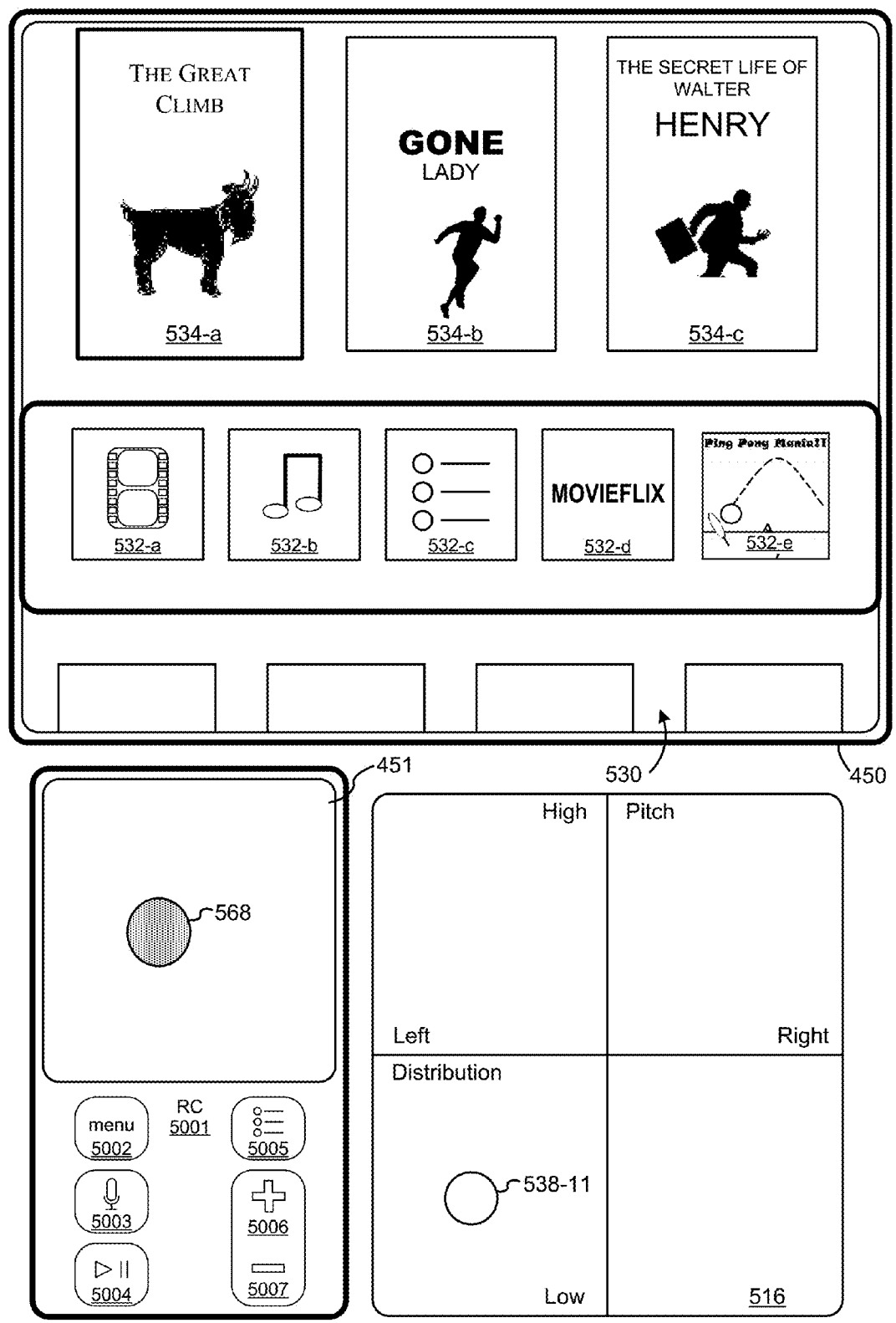
Figure 5G:
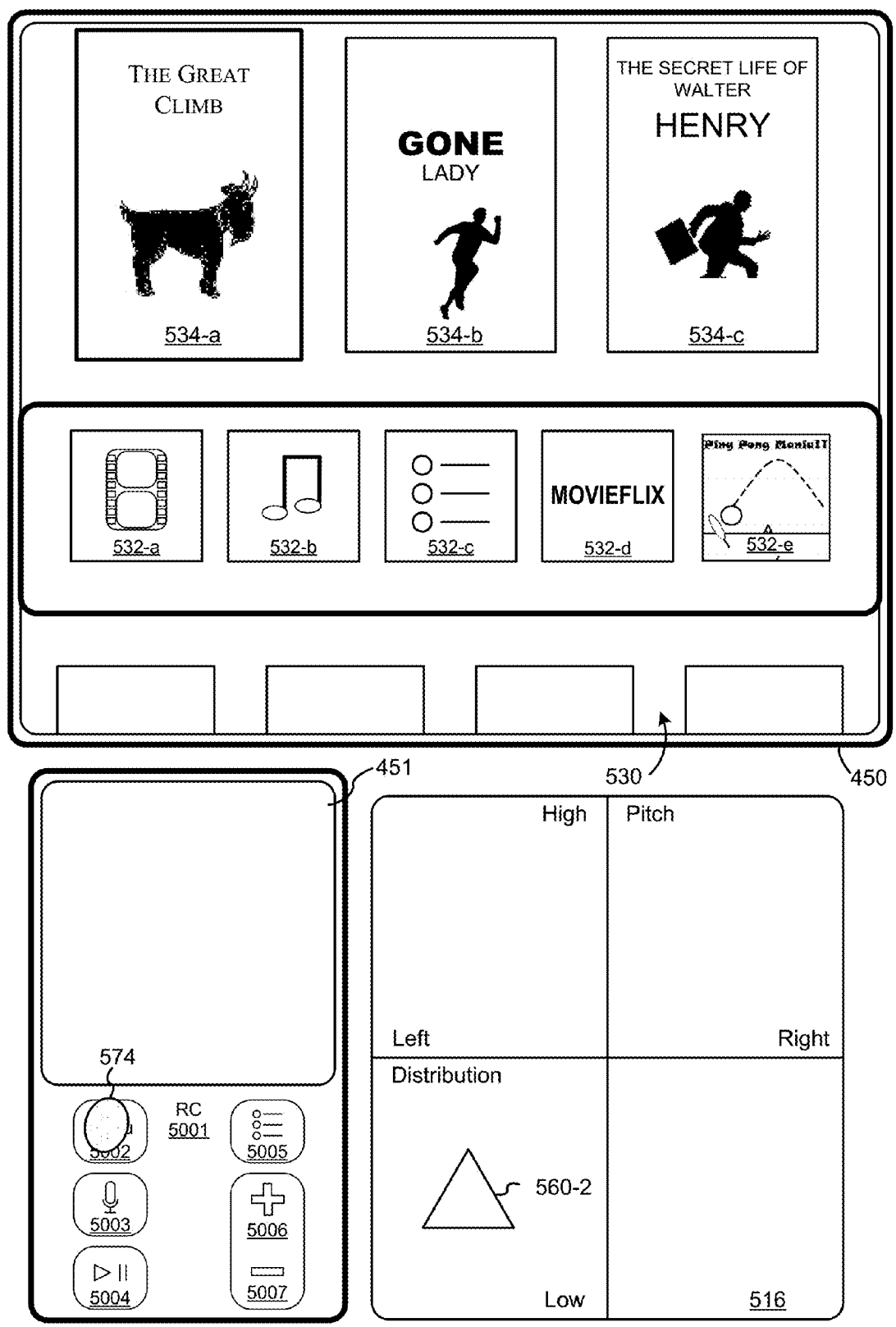
Figure 5H:
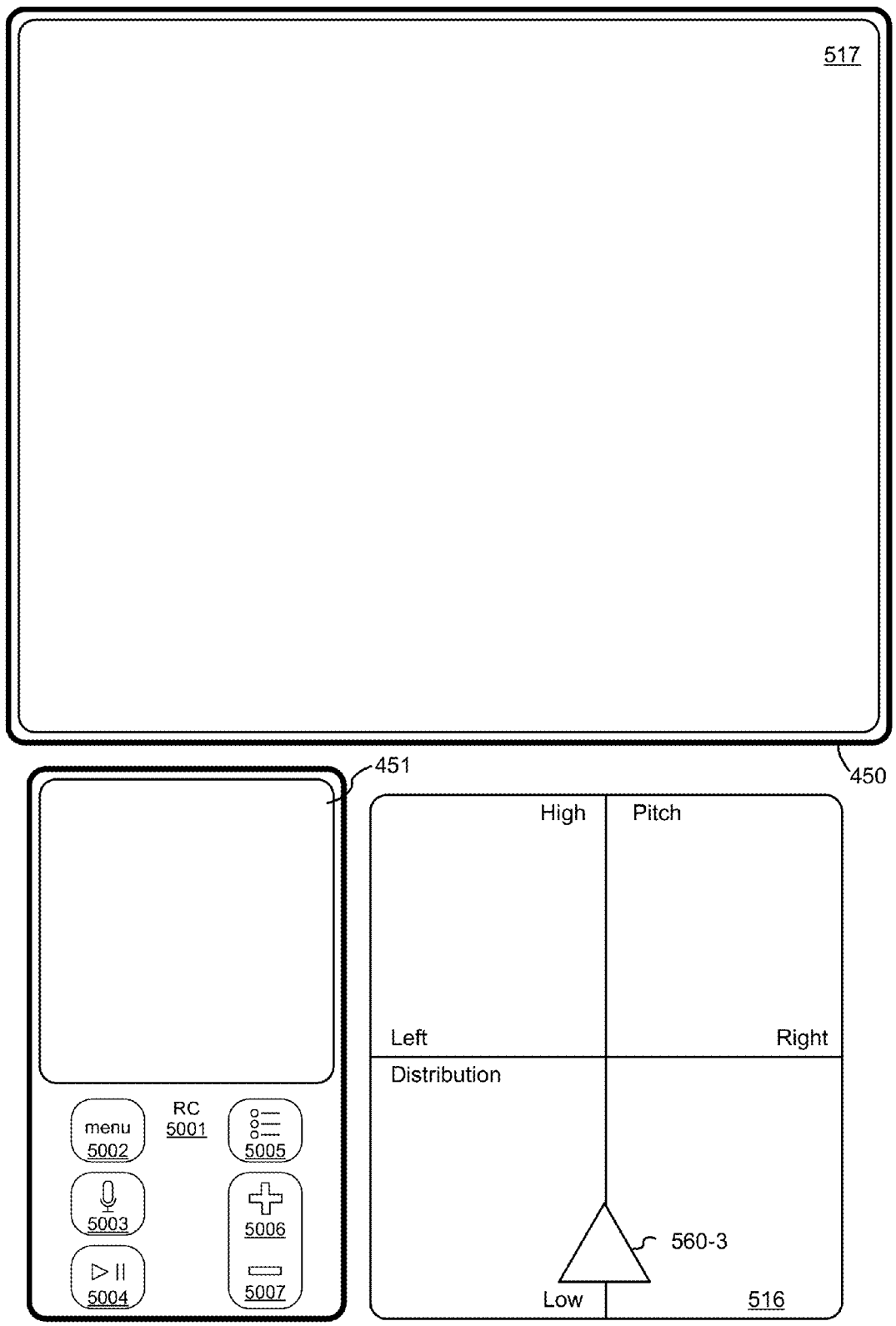
Figure 5I:
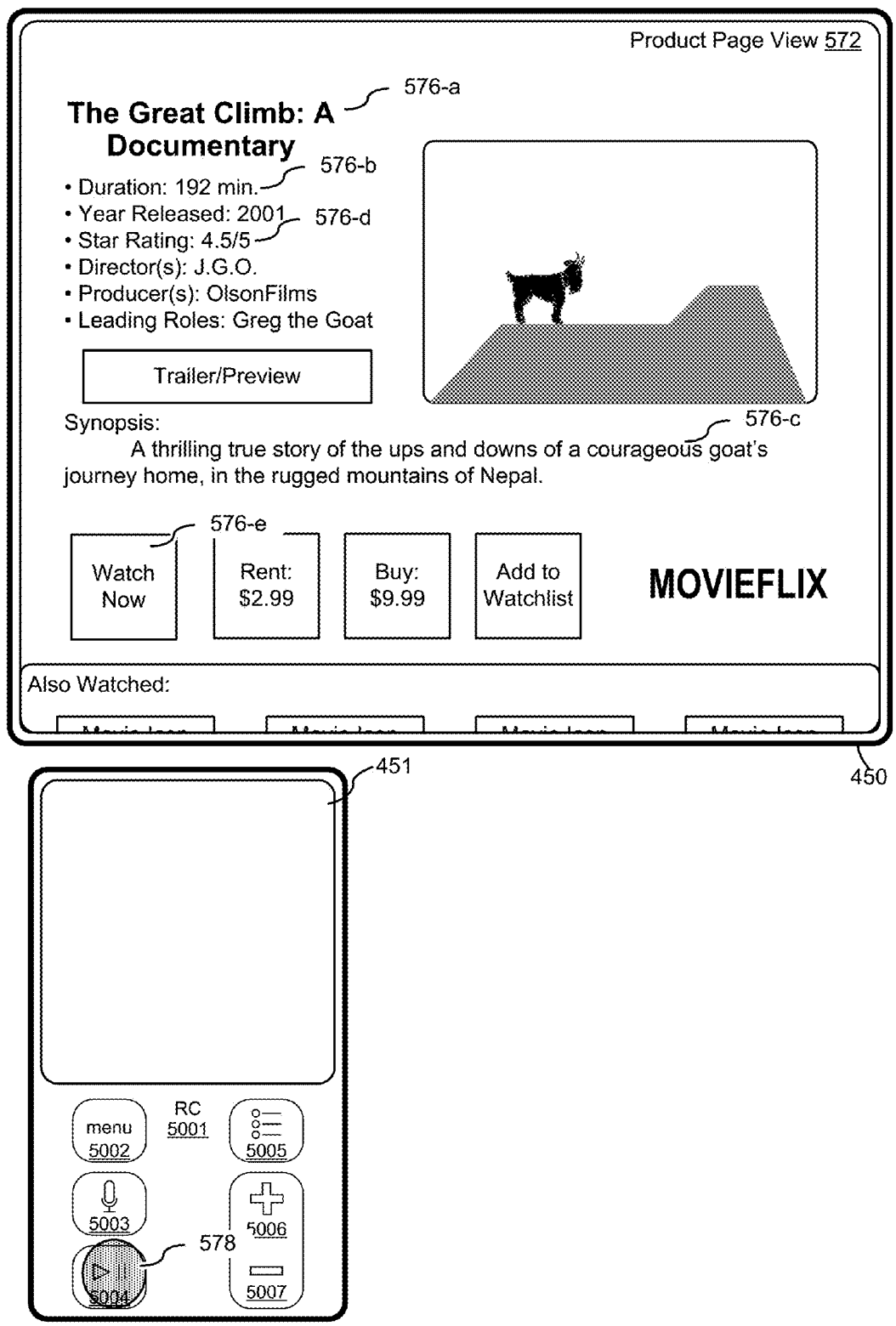
Figure 5J:
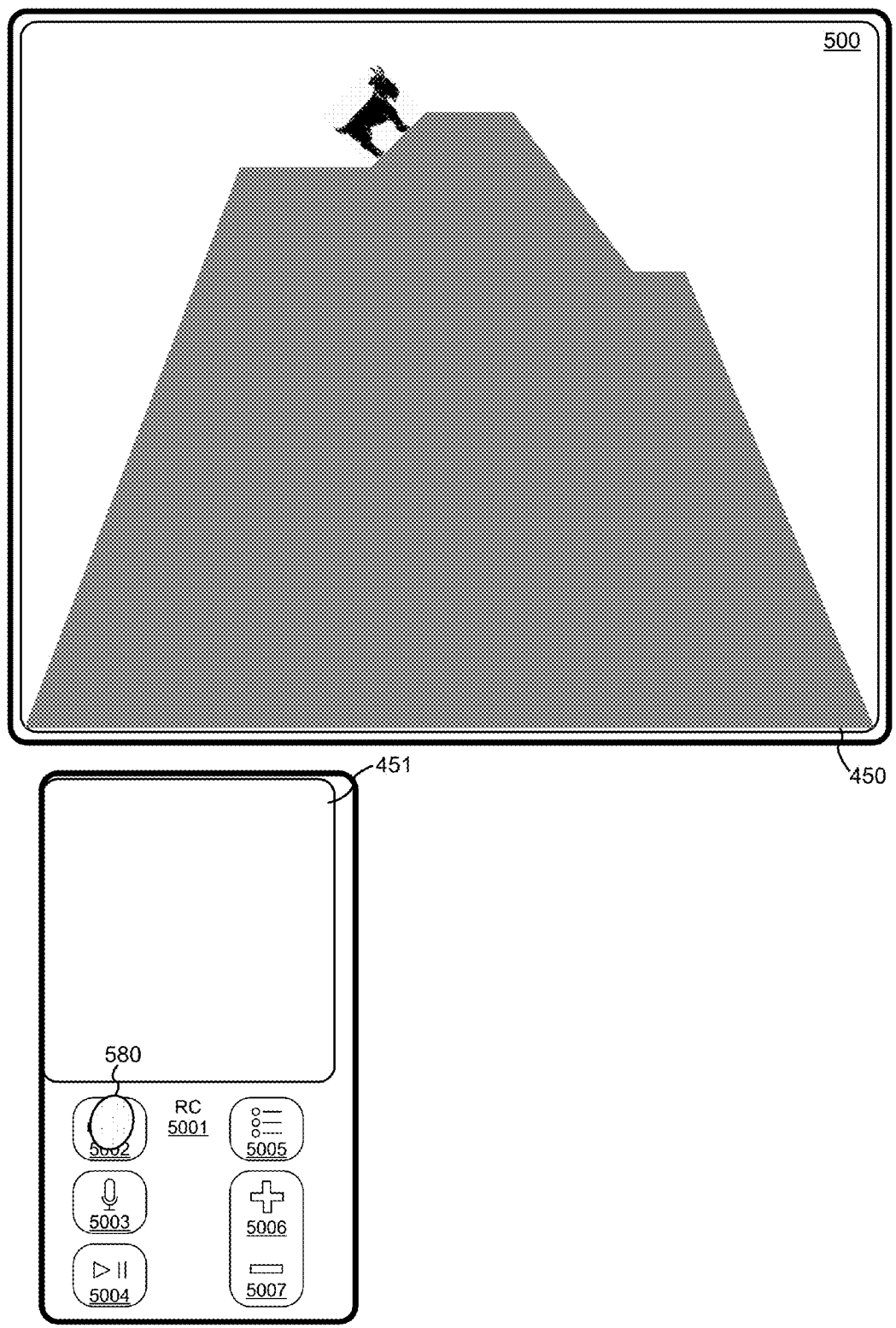
Figure 5K:
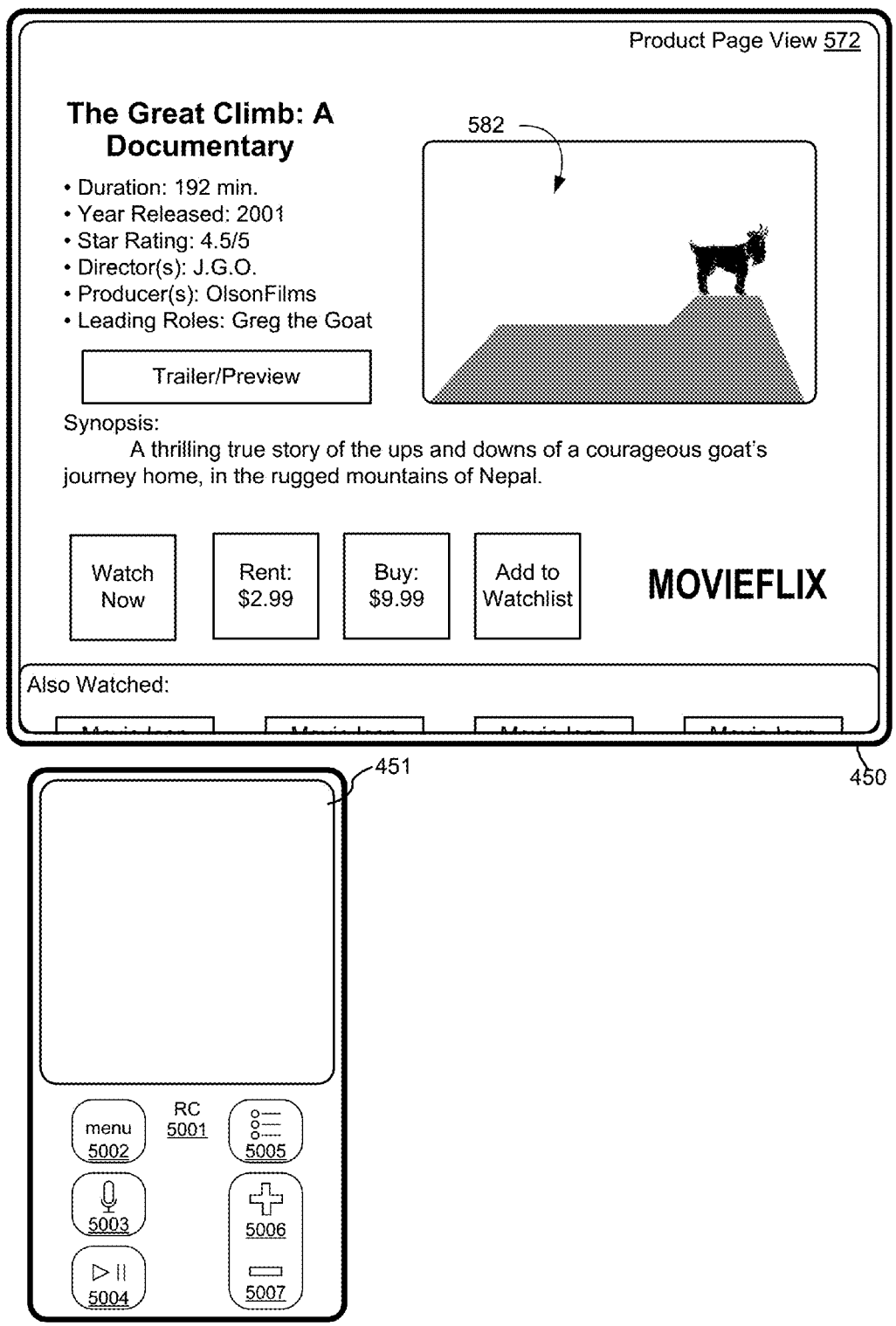
Figure 5L:
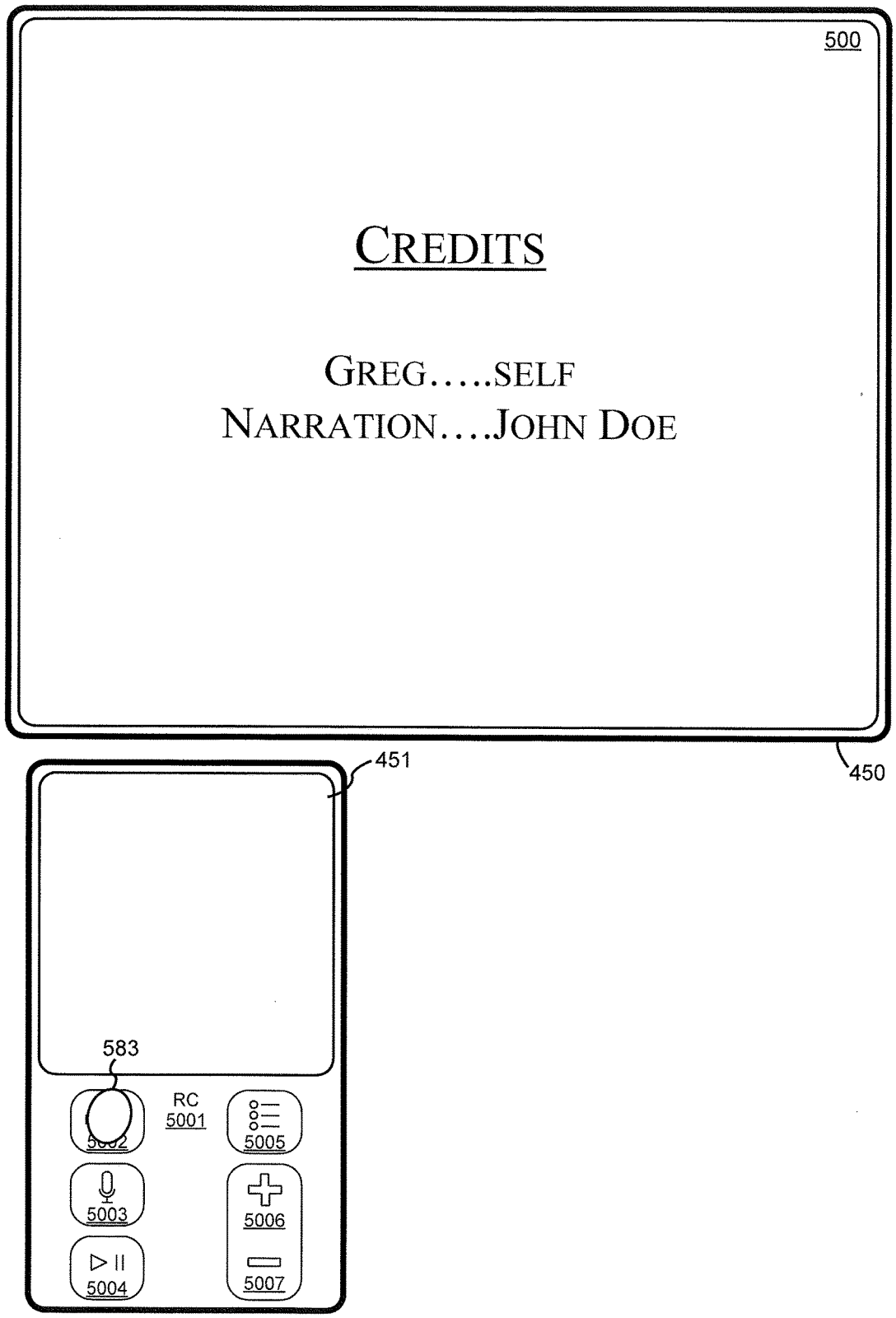
Figure 5M:
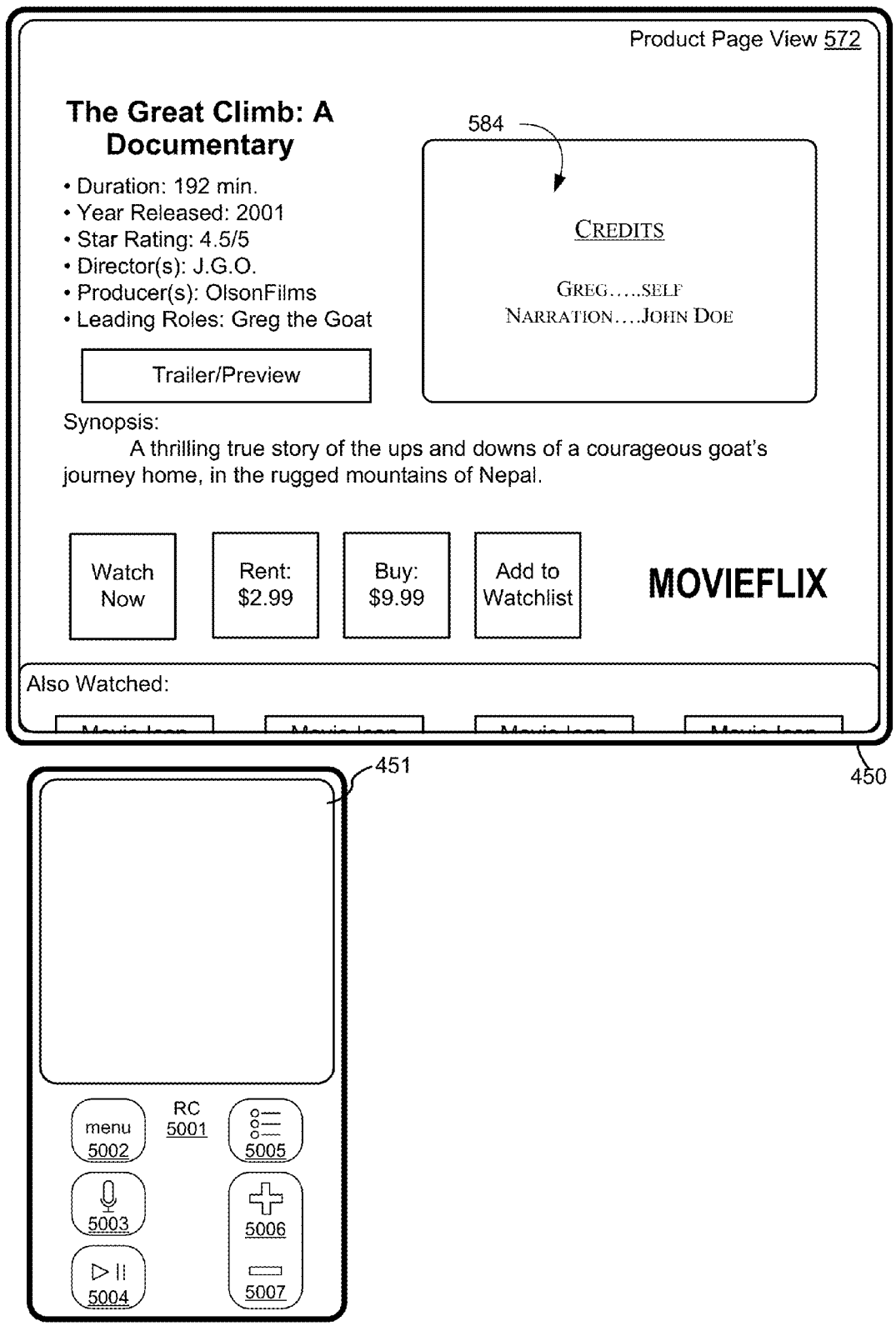
Figure 5N:
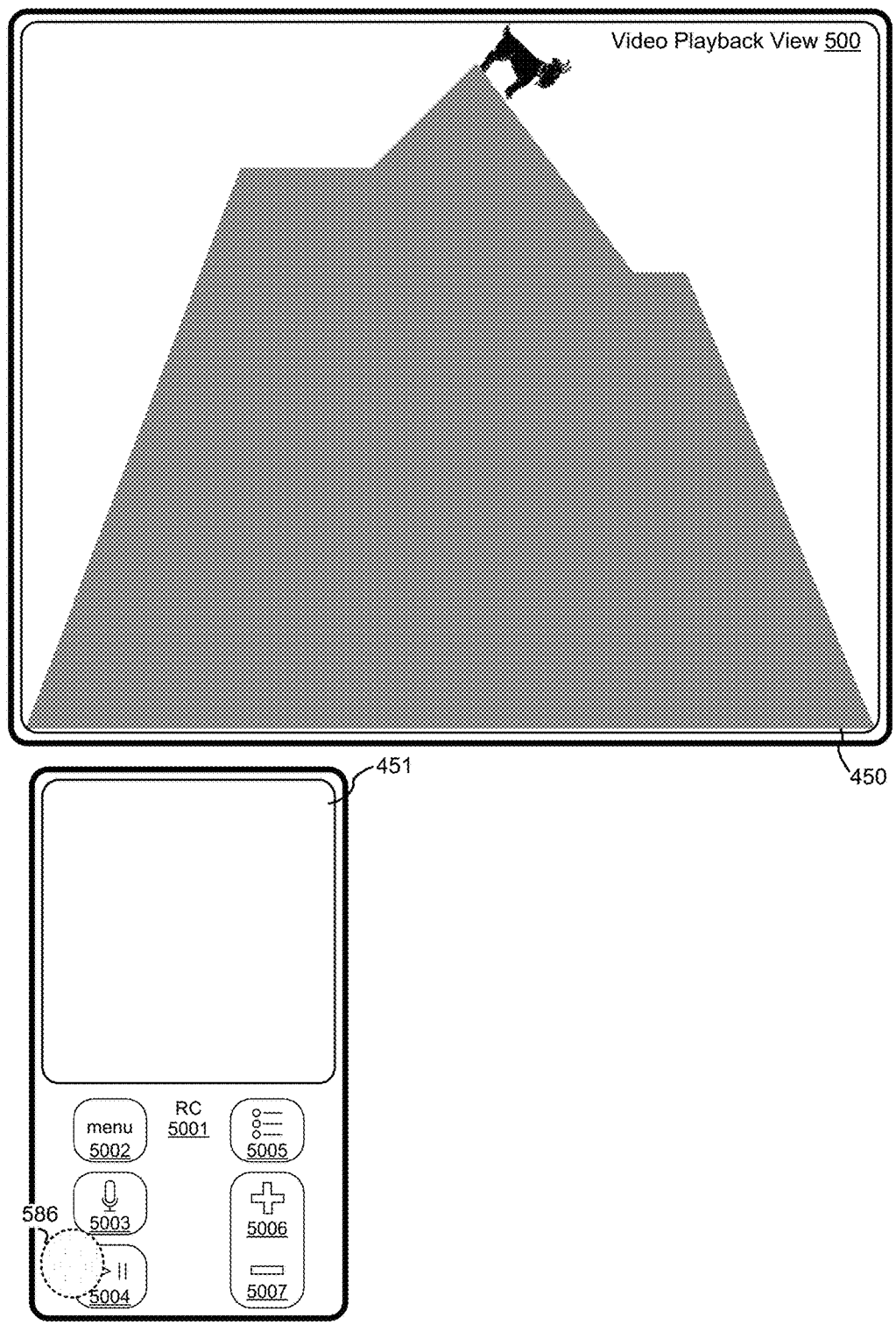
Figure 5O:
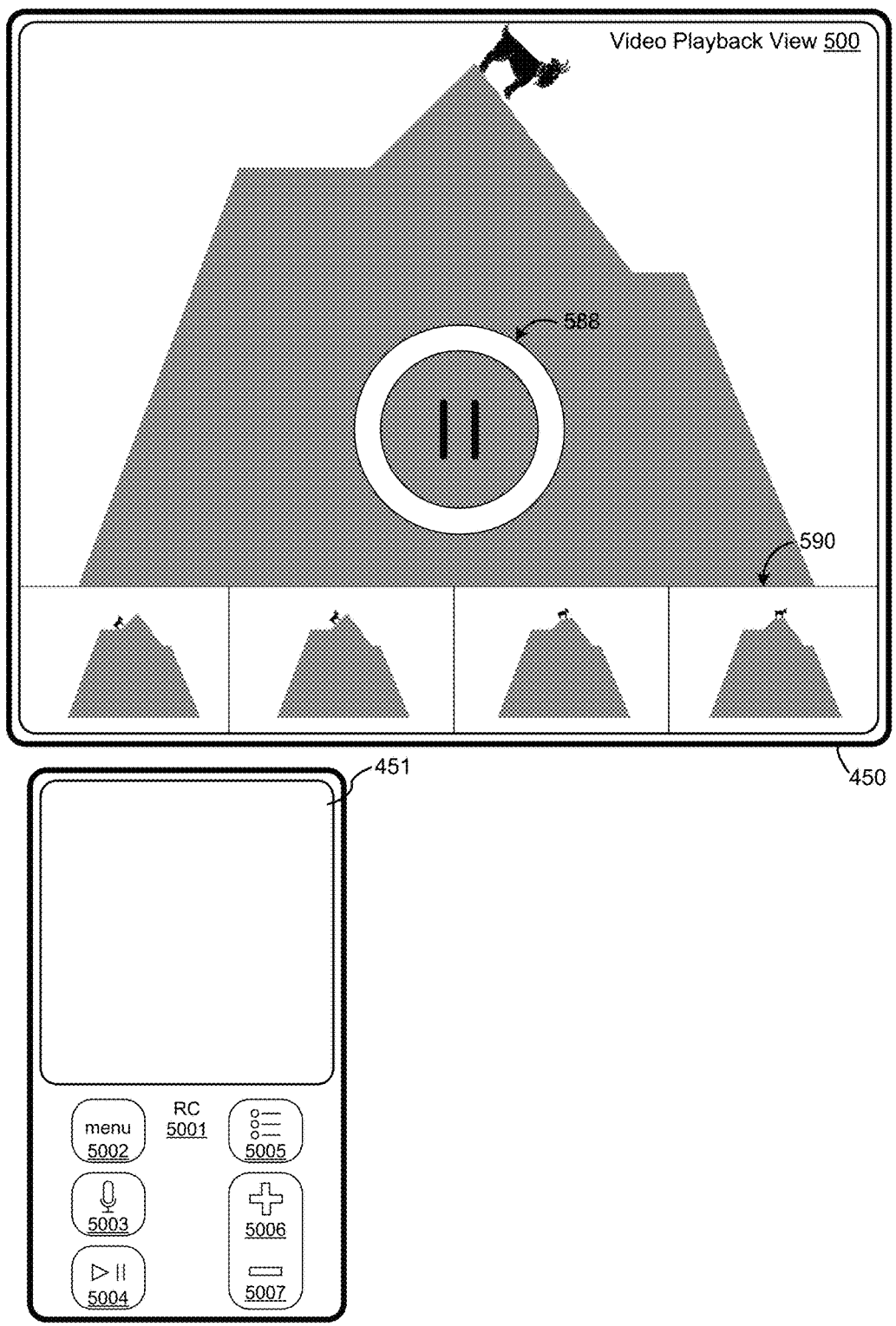
Figure 5P:
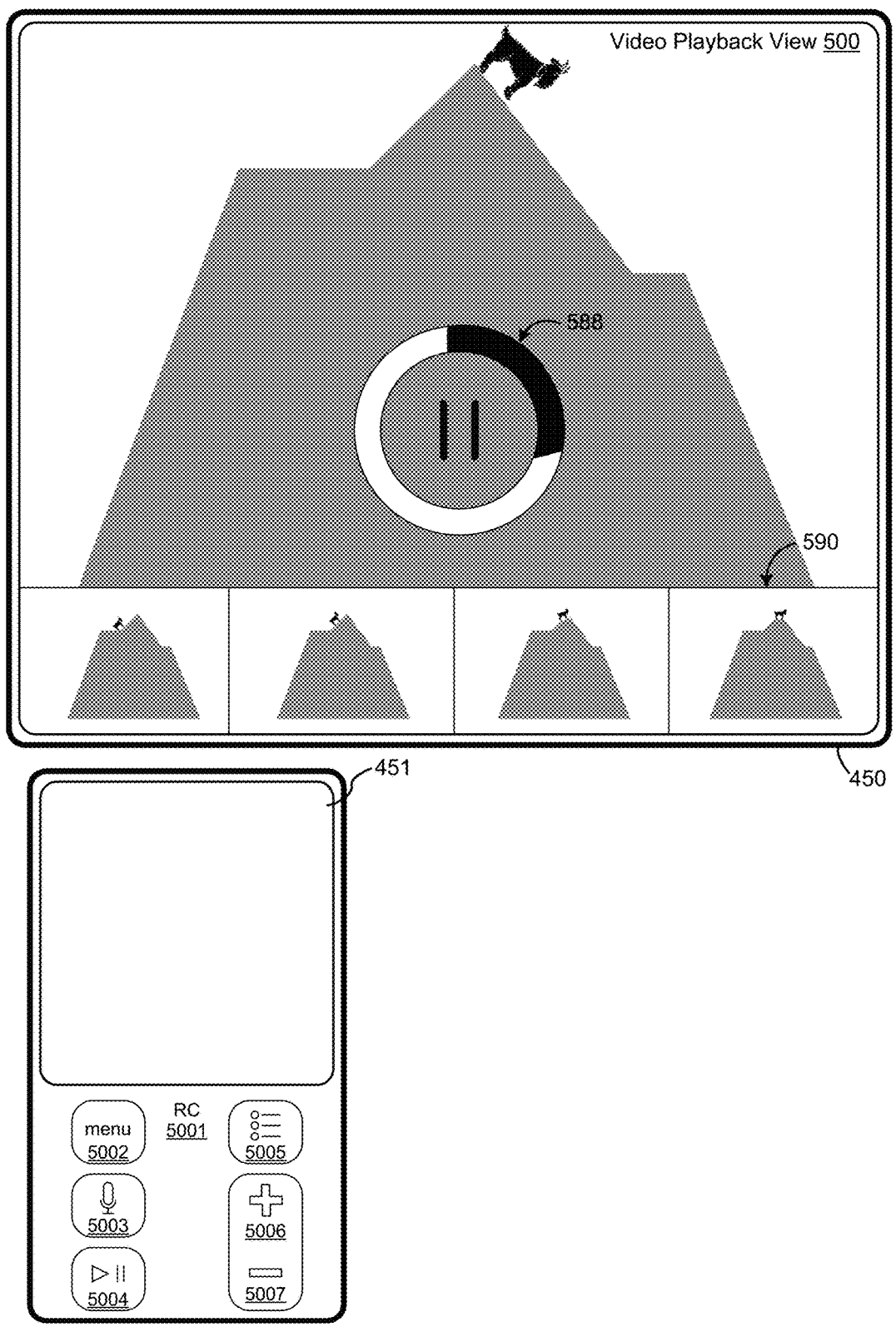
Figure 5Q:
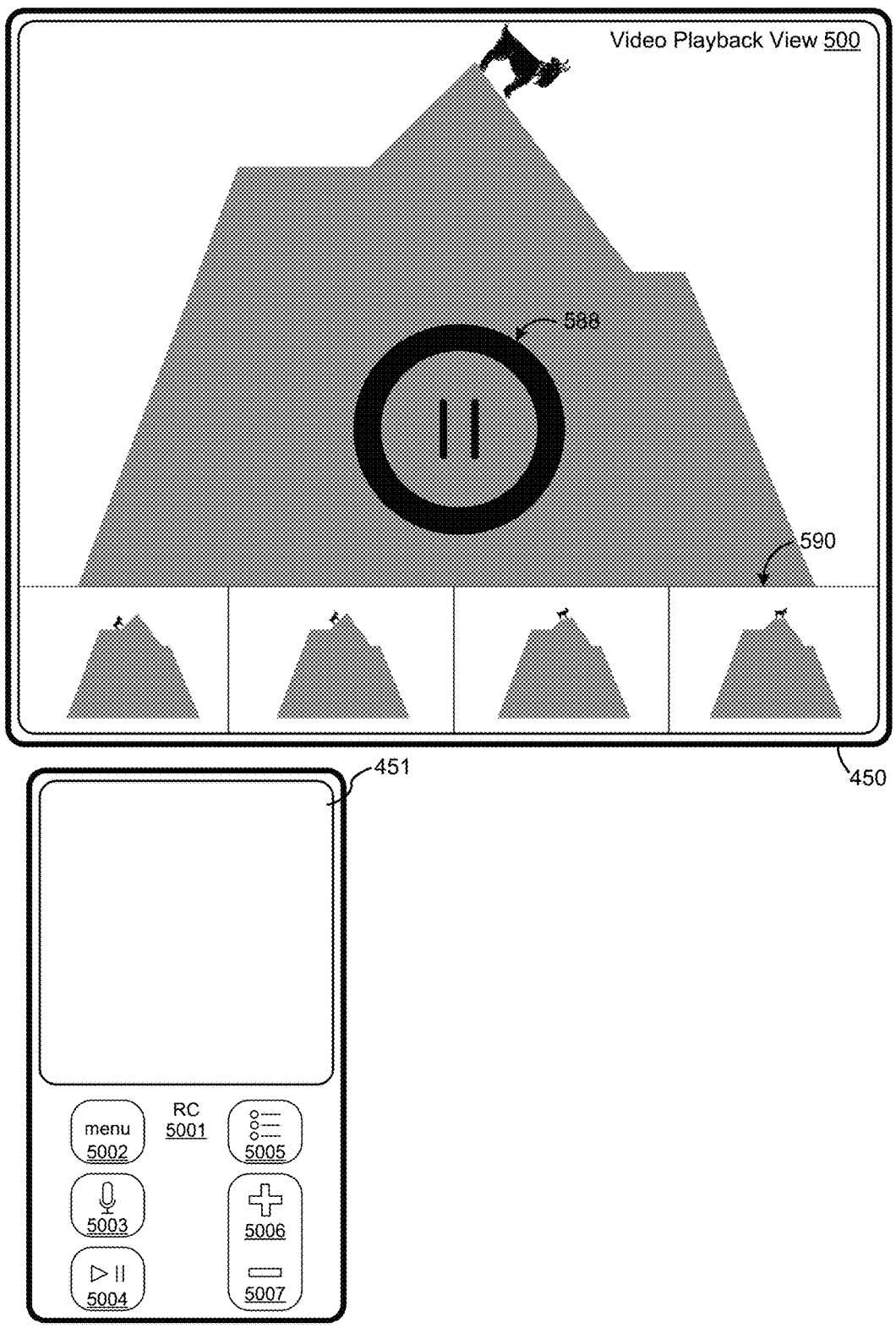
Figure 5R:
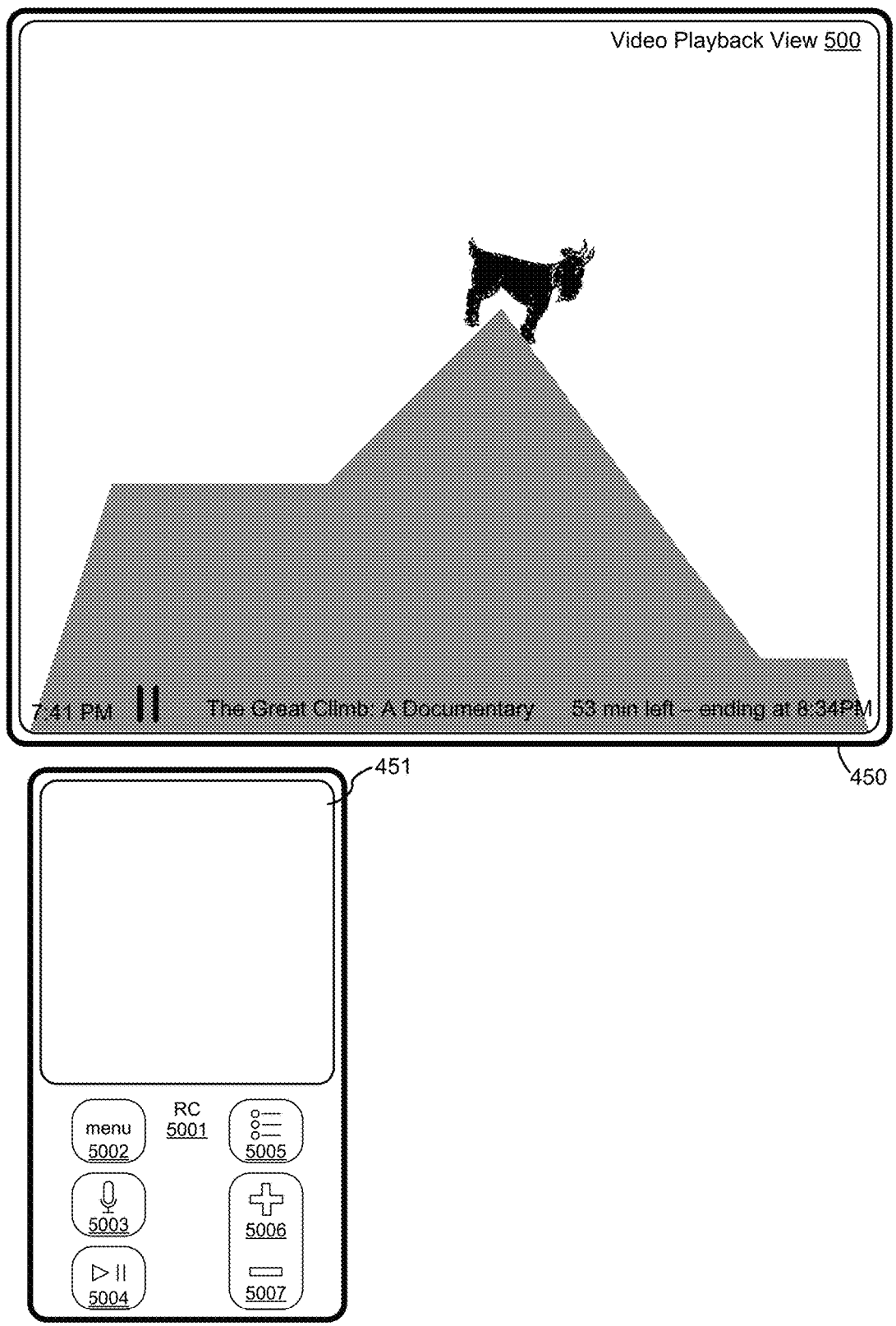
Figure 5S:
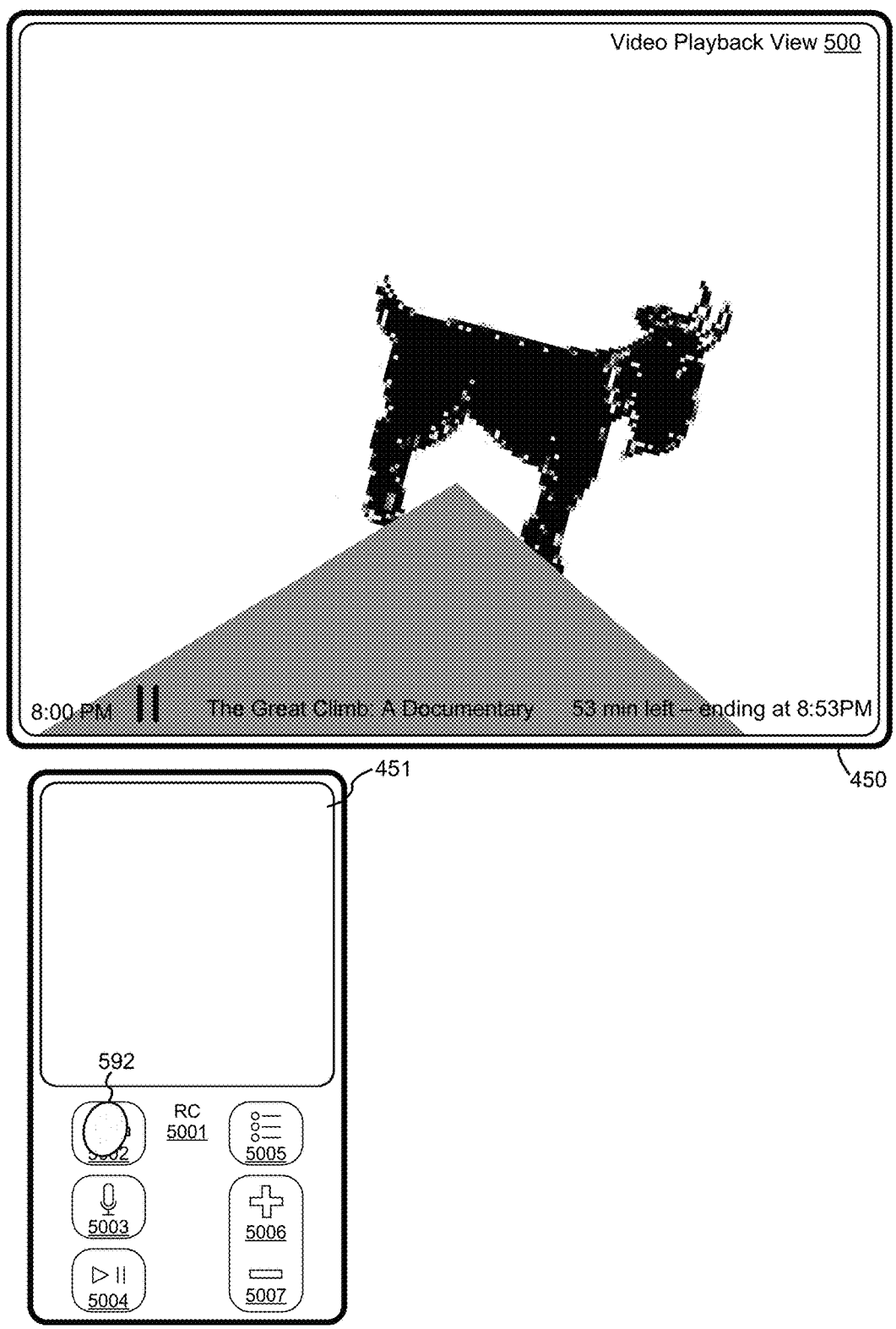

FIG. 5Z illustrates that home screen user interface 530 has scrolled back in response to user input 552. In addition, the current focus has moved from icon 550-*d* to application icon 532-*e* in response to user input 552.

Audio diagram 516 in FIG. 5Z includes a representation of sound output 538-8, provided by the audio system, that corresponds to the movement of the current focus from icon 550-*d* to application icon 532-*e*.

In FIG. 5Z, the electronic device receives user input 554 (e.g., a tap gesture) on remote control 5001. User input 552 corresponds to a request to activate application icon 532-*e* (or a corresponding application).

FIG. 5AA illustrates that user interface 594 of a game application (e.g., a ping pong game application) is displayed in response to user input 554.

Audio diagram 516 in FIG. 5AA includes a representation of sound output 556-1, which indicates that application icon 532-*e* (FIG. 5Z) has been activated.

FIG. 5AA also illustrates that the electronic device receives user input 558 (e.g., a button press) on menu button 5002 of remote control 5001.

FIG. 5BB illustrates that home screen user interface 530 is displayed in response to user input 558 (FIG. 5AA).

Audio diagram 516 in FIG. 5BB includes a representation of sound output 560-1, which indicates that the user interface of the game application is replaced with home screen user interface 530.

FIG. 5BB also illustrates that the electronic device receives user input 562 on remote control 5001. User input 562 corresponds to a request to move the current focus from application icon 532-*e* to an icon in a row of icons above application icon 532-*e* (e.g., a row of movie icons 534).

FIG. 5CC illustrates that the current focus has moved from application icon 532-*e* to movie icon 534-*c* in response to user input 562 (FIG. 5BB).

Audio diagram 516 in FIG. 5CC includes a representation of sound output 538-9 that corresponds to the movement of the current focus from application icon 532-*e* to movie icon 534-*c*.

FIG. 5CC also illustrates that the electronic device receives user input 564 on remote control 5001.

FIG. 5DD illustrates that the current focus has moved from movie icon 534-*c* to movie icon 534-*b* in response to user input 564 (FIG. 5CC).

Audio diagram 516 in FIG. 5DD includes a representation of sound output 538-10 that corresponds to the movement of the current focus from movie icon 534-*c* to movie icon 534-*b*.

FIG. 5DD also illustrates that the electronic device receives user input 566 on remote control 5001.

FIG. 5EE illustrates that the current focus has moved from movie icon 534-*b* to movie icon 534-*a* in response to user input 566 (FIG. 5DD).

Audio diagram 516 in FIG. 5EE includes a representation of sound output 538-11 that corresponds to the movement of the current focus from movie icon 534-*b* to movie icon 534-*a*.

FIG. 5EE also illustrates that the electronic device receives user input 568 (e.g., a tap gesture) on remote control 5001.

FIG. 5FF illustrates that product page view 572 is displayed in response to user input 568 (FIG. 5EE).

Audio diagram 516 in FIG. 5FF includes a representation of sound output 556-2, which indicates that movie icon 534-*a* (FIG. 5EE) has been activated.

FIG. 5FF also illustrates that the electronic device receives user input 570 (e.g., a button press) on menu button 5002 of remote control 5001.

FIG. 5GG illustrates that home screen user interface 530 is displayed in response to user input 570 (FIG. 5FF).

Audio diagram 516 in FIG. 5GG includes a representation of sound output 560-2, which indicates that the user interface of product page view 572 is replaced with home screen user interface 530.

FIG. 5GG also illustrates that the electronic device receives user input 574 (e.g., a button press) on menu button 5002 of remote control 5001.

FIG. 5HH illustrates that screen saver user interface 517 is displayed in response to user input 574 (FIG. 5GG).

Audio diagram 516 in FIG. 5HH includes a representation of sound output 560-3, which indicates that home screen user interface 530 is replaced with screen saver user interface 517. In some embodiments, screen saver user interface 517 is subsequently updated as illustrated in FIGS. 5A-5E in the absence of a user input.

In some embodiments, a user input (e.g., a button press on a button of remote control 5001 or a tap gesture on touch sensitive surface 451), while screen saver user interface 517 is displayed on display 450, initiates replacing screen saver user interface 517 with home screen user interface 530.

In some embodiments, as illustrated in FIGS. 5T-5Z and 5BB-5GG, home screen user interface 530 is, among other things, a video selection user interface that includes representations of a plurality of media items (e.g., movie icons 534). In some embodiments, a user input that selects a particular movie item (e.g., user input 568 in FIG. 5EE) results in display of product page view 572 (FIG. 5II) that includes descriptive information 576 about a corresponding movie. Thus, FIG. 5II is, in some embodiments, a starting point for the functionality described below with reference to FIGS. 5JJ-5MM.

FIGS. 5II-5MM illustrate operations associated with a product page view, in accordance with some embodiments. The user interfaces in these figures are used to illustrate the processes described below, including the processes in FIGS. 9A-9C.

FIG. 5II illustrates display of product page view 572. Product page view 572 includes descriptive information 576 about a media item (e.g., a video corresponding to movie icon 534-*a*, FIG. 5AA), such as the title 576-*a*, running time 576-*b*, plot summary 576-*c*, ratings 576-*d*, and an affordance to play the media item. While product page view 572 is displayed, the electronic device also provides, to the audio system, sound information to provide a first sound output (e.g., a sound output) that is based on the media item. In some embodiments, the first sound output is based on the genre of the media item. For example, "The Great Climb" is categorized as a thrilling documentary and the first sound output includes triumphant orchestral music. In some embodiments, the first sound output includes a track from a sound track of the media item. For example, when the user has not started watching the media item, the first sound output includes a representative track that is pre-selected as representing the overall feel of the movie. In some embodiments, when the user has not yet started watching the media item, the first sound output includes a track that is also used for a trailer of the media item. In some embodiments, when the user has not yet started watching the media item, the first sound output corresponds to a tone of the first scene or is a soundtrack used for the opening credits.

FIG. 5II illustrates remote control 5001 detecting input 578 that corresponds to a request to playback the media item (e.g., a user input such as a button press on play/pause button 5004). FIG. 5JJ illustrates that the electronic device responds to the request to playback the media item by providing information to the display to playback the media item (e.g., by displaying video playback user interface 500, described below).

FIG. 5JJ illustrates that, in response to receiving the user input 578 that corresponds to a request to playback the media item, the electronic device provides, to the display, data to playback the media item.

FIG. 5JJ also illustrates that the electronic device receives user input 580 (e.g., a button press) on menu button 5002 of remote control 5001.

FIG. 5KK illustrates that product page view 572 is displayed in response to user input 580 (FIG. 5JJ).

In some embodiments, product page view 572 displayed in response to user input 580 (FIG. 5KK) is different from product page view 572 displayed before the playback of media item (FIG. 5II). For example, product page view 572 in FIG. 5KK includes one or more selected still images 582 from the media item. In some embodiments, the one or more selected still images 582 are based on the playback position. In some embodiments, the one or more selected still images 582 are distinct from a frame or paused image of the play back position. For example, as can be seen from FIG. 5JJ, the user paused the media item just before the goat reached the summit of the mountain. But, as shown in FIG. 5KK, selected still image 582 is an image of the goat at the summit. In some embodiments, still image 582 is a preselected image for the scene of the playback position. In this way, still image 582 can be selected to be more representative of the scene and can avoid, for example, actors' faces looking awkward when the media item is paused at an inopportune time. Alternatively, in some embodiments, product page view 572 displayed in response to user input 580 is the same as product page view 572 displayed before the playback of media item (FIG. 5II).

The electronic device also provides, to the audio system, sound information to provide a sound output that corresponds to the media item, during presentation of the media item information user interface by the display. For example, while the display displays product page view 572 (FIG. 5KK), the audio system plays a track from the sound track that is different from the track that was played when product page view 572 was previously displayed (e.g., in FIG. 5II, before the user began watching the media item). In some embodiments, the track is a track that corresponds to the playback position (e.g., a location where the user paused the media item or stopped watching the media item). In some embodiments, the sound output is not part of the soundtrack for the media item but is, instead, based on one or more characteristics of the media item at the playback position. For example, when the playback position is at a dark scene in the movie (e.g., based on a color analysis of the displayed colors in the scene), the second sound output is "dark" music.

FIG. 5LL illustrates that end credits of the media item are displayed in video playback user interface 500. FIG. 5LL also illustrates that the electronic device receives user input 583 (e.g., a button press) on menu button 5002 of remote control 5001 while the ending credit is displayed.

FIG. 5MM illustrates that product page view 572 is displayed in response to user input 583 (FIG. 5LL). In some embodiments, product page view 572 in FIG. 5MM includes one or more selected still images 584 from the media item (e.g., showing the end credits).

FIGS. 5NN-5SS illustrate operations associated with a paused state of a video, in accordance with some embodiments. The user interfaces in these figures are used to illustrate the processes described below, including the processes in FIGS. 10A-10B.

FIG. 5NN illustrates video playback view 500 during the playback of the media item. FIG. 5NN also illustrates that user input 586 (e.g., a button press) is detected on play/pause button 5004.

FIG. 5OO illustrates the media item displayed in video playback view 500, during an exemplary paused mode, or during a paused state (e.g., in response to detecting user input 586). In some embodiments, during this exemplary paused mode, a count-down clock 588 is displayed over the media item displayed in video playback view 500 (e.g., over a still image or frame representative of the point in the video where it was paused). In some embodiments, count-down clock 588 is translucent or partially transparent. In some embodiments, while the media item is displayed during a paused mode, one or more still images 590 are displayed overlaid over the media item. In some embodiments, still images 590 include representative frames selected from a predefined time interval before the point in the media item where it was paused. For example, still images 590 include four frames of dramatic or interesting scenes from within the five minutes of the movie preceding the current paused point in the playback of the movie.

FIG. 5PP illustrates that in some embodiments, display of count-down clock 588 includes display of an animation corresponding to a predefined time interval before another exemplary paused state or another exemplary representation of the paused state is displayed (e.g., a screensaver or slideshow). In some embodiments, if a user input is detected before the predefined time interval represented by count-down clock 588 elapses, the playback of the media item resumes, whereas, in some embodiments, the progression of the count-down clock 588 pauses (e.g., for a predefined time, or indefinitely) until another user input is detected corresponding to a request to resume playback of the media item.

FIG. 5QQ illustrates an exemplary representation of count-down clock 588 after its associated predefined time interval has completely elapsed (e.g., a ring being filled, the count-down clock 588 reaching 100% opacity, count-down clock 588 growing up to a certain size, etc.). In some embodiments, after the predefined time interval elapses, an animation or transition is displayed before another exemplary representation of a paused state of the media item is displayed.

FIG. 5RR illustrates another exemplary representation of a paused state of the media item. In some embodiments, a slideshow or screensaver of still images is displayed, corresponding to the point in the media item where it was paused. For example, a slideshow or screensaver comprising ten still images from the previous three to five minutes before the paused point in the movie, are displayed (e.g., randomly or in a looped sequence). In some embodiments, while displaying the slideshow or screensaver, one or more paused-state elements are displayed, such as a current time, a status indicator (e.g., a flashing pause symbol), media information and/or an end time indicator. In some embodiments, the still images are representative frames of the media item, pre-selected for portrayal in the slideshow or screensaver (e.g., pre-selected by the movie director). In some embodiments, the still images are automatically extracted frames from the media item.

FIG. 5SS illustrates that, in some embodiments, as time elapses, one or more paused-state elements are modified or updated. For example, the current time shows that the time is now 8:00 PM (rather than 7:41 PM, as shown in FIG. 5RR), and the end time indicator has also been updated to indicate that the paused media item will end playback at 8:53 PM (rather than at 8:34 PM, as shown in FIG. 5RR). FIG. 5SS also illustrates detection of exemplary user input 592 (e.g., a button press) on menu button 5002.

In some embodiments, product page view 572 (e.g., FIG. 5KK) is displayed in response to user input 592.

FIGS. 6A-6C illustrate a flow diagram of method 600 of changing visual characteristics of a user interface in conjunction with changing audio components corresponding to the user interface object, in accordance with some embodiments. Method 600 is performed at an electronic device (e.g., device 300, FIG. 3, or portable multifunction device 100, FIG. 1A) in communication with a display and an audio system.

In some embodiments, the audio system includes a digital-to-analog converter. In some embodiments, the audio system includes a signal amplifier. In some embodiments, the audio system is coupled with one or more speakers. In some embodiments, the audio system is coupled with a plurality of speakers. In some embodiments, the audio system includes one or more speakers. In some embodiments, the audio system is integrated with the display (e.g., a television with an audio processing circuit and speakers). In some embodiments, the audio system is distinct and separate from the display (e.g., a display screen and a separate audio system).

Some operations in method 600 are, optionally, combined and/or the order of some operations is, optionally, changed. In some embodiments, the user interfaces in FIGS. 5A-5G are used to illustrate the processes described with regard to method 600.

As described below, method 600 includes providing a sound output for a screen saver user interface. The method reduces the cognitive burden on a user when interacting with user interface objects (e.g., control user interface objects), thereby creating a more efficient human-machine interface. By providing additional information (e.g., indicating a state of the screen saver), unnecessary operations can be avoided or reduced (e.g., interaction with the device to check on the status of the device). Providing sound output helps a user interact with the device more efficiently and reducing unnecessary operations conserve power.

The device provides (602), to the display, data to present a user interface generated by the device. In some embodiments, the user interface is automatically generated by the device. The user interface includes a first user interface object with first visual characteristics. The user interface also includes a second user interface object with second visual characteristics that is distinct from the first user interface object. For example, the device (e.g., device 300, FIG. 3, or portable multifunction device 100, FIG. 1A) automatically generates a graphical user interface that includes a first user interface object with first visual characteristics and a second user interface object with second visual characteristics. The device sends data to the display (e.g., display 450) that is used by the display to display, show, or otherwise present the graphical user interface (e.g., user interface 517 with first user interface object 501-*a* (a first bubble) and second user interface object 501-*b* (a second bubble) as shown in FIG. 5B). In FIG. 5B, first user interface object 501-*a* and second user interface object 501-*b* have different visual characteristics, such as different sizes and different locations on the display.

In some embodiments, the first visual characteristics include (604) a size and/or a location of the first user interface object. In some embodiments, the second visual characteristics include a size and/or a location of the second user interface object. For example, as explained above, first user interface object 501-*a* and second user interface object 501-*b* in FIG. 5B have different sizes and different locations on the display.

In some embodiments, the first visual characteristics of the first user interface object and the second visual characteristics of the second user interface object are (606) determined independently of a user input. For example, the first visual characteristics of the first user interface object and the second visual characteristics of the second user interface object may be initially determined independently of a user input. In some embodiments, the first user interface object and the second user interface object are generated pseudo-randomly. For example, the size, location, speed, and/or direction of movement of a respective user interface object are determined pseudo-randomly. In some embodiments, all user interface objects in the user interface are generated independently of a user input. In some embodiments, changes to the first user interface object and the second user interface object are determined pseudo-randomly.

The device provides (608) to the audio system, sound information to provide a sound output. The sound output includes a first audio component that corresponds to the first user interface object. The sound output further includes a second audio component that corresponds to the second user interface object and is distinct from the first audio component. For example, the first audio component may be a first tone and the second audio component may be a second tone, with each tone having one or more aural characteristics such as pitch, timbre, volume, attack, sustain, decay, etc. In some embodiments, the sound output includes a third audio component that is independent of the first user interface object and the second user interface object. In some embodiments, the third audio component is independent of any user interface object in the user interface.

In some embodiments, the second audio component is selected (610) based at least in part on the first audio component. In some embodiments, a pitch of the second audio component is selected based on a pitch of the first audio component. For example, when the first audio component and any other audio components, if any, that are concurrently output with the first audio component have pitches (or notes) of a particular chord (e.g., A minor eleventh), the second audio component is selected to have a pitch (or note) of the particular chord.

In some embodiments, the user interface includes a plurality of user interface objects, and the sound output has respective audio components that correspond to respective user interface objects in the plurality of user interface objects. In some embodiments, the sound output has at least one audio component (e.g., a base tone or melody) that is independent of the plurality of user interface objects.

While the user interface is being presented on the display and the sound output is being provided, the device provides (612, FIG. 6B) to the display, data to update the user interface, and provides, to the audio system, sound information to update the sound output. Updating the user interface and updating the sound output includes changing at least one visual characteristic (e.g., size and/or position) of the first visual characteristics of the first user interface object in conjunction with (e.g., concurrently) changing the first audio component that corresponds to the first user interface object and changing at least one visual characteristic (e.g., size and/or position) of the second visual characteristics of the second user interface object in conjunction with (e.g., concurrently) changing the second audio component that corresponds to the second user interface object. For example, the device sends data to the display (e.g., display 450, FIGS. 5A-5G) that is used by the display to update the graphical user interface (e.g., by moving first user interface object 501-*a* and second user interface object 501-*b* between their respective locations in user interface 517 as shown in FIGS. 5B and 5C). Note that the size and location of first user interface object 501-*a* has changed between FIG. 5B and FIG. 5C. Similarly, the size of second user interface object 501-*b* has changed between FIG. 5B and FIG. 5C. The change in visual characteristics of the first user interface object 501-*a* occurs in conjunction with a change in the audio component that corresponds to the first user interface object 501-*a* (e.g., as represented by the changing first audio component 503 in FIGS. 5B and 5C). For example, the sound that corresponds to the first user interface object 501-*a* changes as the first bubble expands and moves on the display. Similarly, the change in visual characteristics of the second user interface object 501-*b* occurs in conjunction with a change in the audio component that corresponds to the second user interface object 501-*b*. For example, the sound that corresponds to the second user interface object 501-*b* as the second bubble expands on the display.

Providing the data to update the user interface occurs independently of user input. In some embodiments, providing the sound information to update the sound output occurs independently of user input. For example, the displayed user interface and the corresponding sound are updated automatically, without user input. In some embodiments, the displayed user interface and the corresponding sound are updated as long as no user input is detected (e.g., the user interface generated by the device with the first and second user interface objects is a screen saver user interface and the screen saver continues to be updated as long as no button is pressed on a remote, no contact is detected on a touch-sensitive surface of the remote, or the like). In some embodiments, after the displayed user interface and the corresponding sound are updated while no user input is detected, a user input is detected and, in response, the device stops providing the data to update the user interface and stops providing the sound information to update the sound output. Instead, the device provides data to the display to present a second user interface (e.g., the user interface that was displayed just before a screen saver user interface, such as screen saver user interface 517 shown in FIGS. 5A-5F, with the first and second user interface objects, generated by the device, was displayed).

In some embodiments, the first audio component that corresponds to the first user interface object is changed (614) in accordance with changes to at least one visual characteristic of the first visual characteristics of the first user interface object. For example, changes to the first audio component are determined, subsequent to determining changes to (at least one visual characteristic of) the first visual characteristics of the first user interface object, based on the changes to the first visual characteristics of the first user interface object. In some embodiments, the second audio component that corresponds to the second user interface object is changed in accordance with changes to at least one visual characteristic of the second visual characteristics of the second user interface object. For example, changes to the second audio component are determined, subsequent to determining changes to the second visual characteristics of the second user interface object, based on the changes to the second visual characteristics of the second user interface object.

In some embodiments, an audio component that corresponds to a respective user interface object (e.g., the first user interface object) is changed in accordance with changes to the respective user interface object (e.g., changes to at least one visual characteristic of the first visual characteristics of the first user interface object), independently of changes to other user interface objects (e.g., changes to at least one visual characteristic of the second visual characteristics of the second user interface object). For example, the audio component that corresponds to the respective user interface object changes based solely on changes to the respective user interface object.

In some embodiments, audio components that correspond to a plurality of user interface objects, including a respective user interface object, are changed in accordance with changes to the respective user interface object (e.g., changes to at least one visual characteristic of the first visual characteristics of the first user interface object). For example, when the respective user interface object appears in the user interface, a volume of audio components that correspond to the plurality of user interface objects, other than the respective user interface object, is reduced.

In some embodiments, at least one visual characteristic of the first visual characteristics of the first user interface object is changed (616) in accordance with changes to the first audio component. For example, changes to the first visual characteristics of the first user interface object are determined subsequent to determining changes to the first audio component. In some embodiments, at least one visual characteristic of the second visual characteristics of the second user interface object is changed in accordance with changes to the second audio component.

In some embodiments, updating the user interface and updating the sound output further includes (618) ceasing to display the first user interface object and ceasing to provide a sound output that includes the first audio component that corresponds to the first user interface object (e.g., the first user interface object expands, fades, and disappears from the user interface as shown in FIG. 5E); ceasing to display the second user interface object and ceasing to provide a sound output that includes the second audio component that corresponds to the second user interface object (e.g., the second user interface object expands, fades, and disappears from the user interface); and/or displaying one or more respective user interface objects and providing a sound output that includes one or more respective audio components that correspond to the one or more respective user interface objects (e.g., user interface objects distinct from the first user interface object and the second user interface object are displayed as shown in FIG. 5C).

In some embodiments, updating the sound output includes (620) determining whether predetermined inactivity criteria are satisfied (e.g., no user input has been received for a predetermined time period or a remote control is put down). In accordance with a determination that the predetermined inactivity criteria are satisfied, the device changes a volume of the sound output. In some embodiments, changing the volume of the sound output includes increasing or decreasing a volume of respective audio components.

In some embodiments, a pitch of a respective audio component corresponds (622, FIG. 6C) to an initial size of a corresponding user interface object (e.g., a pitch of audio component 503 corresponds to an initial size of user interface object 501-*a* in FIG. 5A), a stereo balance of the respective audio component corresponds to a location of the corresponding user interface object on the display (e.g., a stereo balance of audio component 503 corresponds to a location of user interface object 501-*a* on display 450 in FIG. 5A), and/or a change in a volume of the respective audio component corresponds to a change in a size of the corresponding user interface object (e.g., a change in a volume of audio component 503 corresponds to a change in a size of user interface object 501-*a* in FIG. 5B). In some embodiments, the volume of the respective audio component corresponds to the size of the corresponding user interface object (e.g., the volume decreases as the size of the corresponding user interface object increases as shown in FIGS. 5A-5F, or alternatively, the volume increases as the size of the corresponding user interface object increases). In some embodiments, the audio components are generated pseudo-randomly. For example, the pitch, volume, and/or stereo balance of respective audio components are determined pseudo-randomly. Thus, the audio components are not part of a predetermined sequence of notes.

In some embodiments, the device detects (624) a user input (e.g., detecting pressing a button or picking up a remote control). In response to detecting the user input, the device provides, to the audio system, sound information to change respective audio components that correspond to respective user interface objects (e.g., reducing a volume and/or increasing an attack of respective audio components). As used herein, an attack refers to how hard a note is hit (e.g., the rate at which the amplitude of the sound increases over time to its peak volume as shown in FIG. 5H). In response to detecting the user input, the device further provides, to the display, data to update the user interface and display one or more control user interface objects (e.g., including (additional) control user interface objects, such as buttons, icons, sliders, menus, etc., in the user interface or replacing the user interface with a second user interface that includes the one or more control user interface objects, as shown in FIG. 5G).

In some embodiments, the sound information provided to the audio system includes (626) information to provide a sound output that includes an audio component that is not harmonious with the respective audio components that correspond to respective user interface objects. In some embodiments, the sound information provided to the audio system includes information to provide a sound output that includes an audio component that is not harmonious with the respective audio components that correspond to respective user interface objects. In some embodiments, the audio component that is not harmonious with the respective audio component has a preset (e.g., fixed) pitch.

In some embodiments, the first audio component and the second audio component are harmonious. In some embodiments, respective audio components that correspond to respective user interface objects are harmonious (e.g., the respective audio components have pitches of a particular chord).

In some embodiments, prior to detecting a user input (e.g., a user picking up a remote control), the device provides (628) data to the display, data to display the user interface and updates the user interface without providing, to the audio system, sound information to provide the sound output. Subsequent to detecting the user input, the device provides, to the display, data to display the user interface and update the user interface and providing, to the audio system, sound information to provide the sound output and update the sound output (e.g., ceasing to provide the sound output as illustrated in FIG. 5G, or alternatively reducing a volume of the sound output, etc.). In some embodiments, the first user interface object and the second user interface object move slower prior to detecting the user input than after detecting the user input.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 600 described above with respect to FIGS. 6A-6C. For example, the user interface objects, user interfaces, and sound outputs described above with reference to method 600 optionally have one or more of the characteristics of the user interface objects, user interfaces, and sound outputs described herein with reference to other methods described herein (e.g., methods 700, 800, 900, and 1000). For brevity, these details are not repeated here.

FIGS. 7A-7D are flow diagrams illustrating method 700 of providing sound information corresponding to a user's interaction with a user interface object, in accordance with some embodiments. Method 700 is performed at an electronic device (e.g., device 300, FIG. 3, or portable multifunction device 100, FIG. 1A) in communication with a display and an audio system. In some embodiments, the electronic device is in communication with a user input device (e.g., a remote user input device, such as a remote control) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device.

In some embodiments, the audio system includes a digital-to-analog converter. In some embodiments, the audio system includes a signal amplifier. In some embodiments, the audio system includes one or more speakers. In some embodiments, the audio system is integrated with the display (e.g., a television with an audio processing circuit and speakers). In some embodiments, the audio system is distinct and separate from the display (e.g., a display screen and a separate audio system). In some embodiments, the device includes a touch-sensitive surface. In some embodiments, the display is a touch-screen display and the touch-sensitive surface is on or integrated with the display. In some embodiments, the display is separate from the touch-sensitive surface (e.g., the touch-sensitive surface is integrated with a remote control for a television).

Some operations in method 700 are, optionally, combined and/or the order of some operations is, optionally, changed. In some embodiments, the user interfaces in FIGS. 5I-5S are used to illustrate the processes described with regard to method 700.

As described below, method 700 provides a sound output corresponding to a user's interaction with user interface objects. The method reduces the cognitive burden on a user when interacting with user interface objects (e.g., control user interface objects), thereby creating a more efficient human-machine interface. Providing sound output helps a user manipulate user interface objects faster and more efficiently, thereby conserving power.

The device provides (702), to the display, data to present a user interface with a plurality of user interface objects, including a control user interface object (e.g., a thumb of a slider, etc.) at a first location on the display. The control user interface object is configured to control a respective parameter (e.g., current position in a navigation slider). In some embodiments, the control user interface object is not an audio control user interface object. For example, the control user interface object is a thumb (e.g., a playhead) of a slider that controls the current position of a video (e.g., movie) that is being displayed on the display, as shown in FIGS. 5J-5P and FIG. 5R-5S (thumb 504 of slider 506).

The device receives (704) a first input (e.g., a drag gesture on a touch-sensitive surface) that corresponds to a first interaction with the control user interface object on the display (e.g., an interaction to adjust the position of a thumb of a slider). While receiving (706) the first input that corresponds to the first interaction with the control user interface object on the display (e.g., concurrently with at least a portion of the first input), the device provides (708), to the display, data to move the control user interface object, in accordance with the first input, from the first location on the display to a second location on the display, distinct from the first location on the display. For example, as shown in FIG. 5K-5L, drag gesture 512 drags thumb 504 from position 504-1 to 504-2.

In some embodiments, in response to receiving the first input that corresponds to the first interaction with the control user interface object on the display: the device provides (710), to the display, data to move the control user interface object, in accordance with the first input, from the first location on the display to the second location on the display, distinct from the first location on the display, and visually distinguish the control user interface object in accordance with the first input during the movement of the control user interface object from the first location on the display to the second location on the display (e.g., the device displays a tail of the thumb movement and/or lengthens or stretches the thumb in the direction from the first location on the display toward the second location on the display, as shown in FIGS. 5K-5L, FIGS. 5M-5N, and FIG. 5R-5S).

While receiving the first input that corresponds to the first interaction with the control user interface object on the display, the device provides (712), to the audio system, first sound information to provide a first sound output with one or more characteristics that are different from the respective parameter controlled by the control user interface object and that change in accordance with movement of the control user interface object from the first location on the display to the second location on the display (e.g., the first sound output is audio feedback that corresponds to movement of a slider control). In some embodiments, the data is provided to the display and the first sound information is provided to the audio system in response to receiving the first input. In some embodiments, the first sound output is provided by the audio system during the duration of the first interaction with the control user interface object.

In some embodiments, in accordance with a determination that the first input meets first input criteria, the first sound output has (714, FIG. 7B) a first set of characteristics (e.g., pitch, volume). In accordance with a determination that the first input meets second input criteria, the first sound output has a second set of characteristics that are different from the first set of characteristics (e.g., pitch, volume). For example, the volume of the first sound output is increased if the first input moves faster than a predefined speed threshold, and the volume of the first sound output is decreased if the first input moves slower than the predefined speed threshold.

In some embodiments, the one or more characteristics include (716) a pitch of the first sound output, a volume of the first sound output, and/or a distribution (also called "balance") of the first sound output over a plurality of spatial channels. In some embodiments, the one or more characteristics include a timbre of the first sound output and/or one or more audio envelope characteristics of the first sound output (e.g., an attack, sustain, delay and/or release characteristic). For example, as illustrated in FIGS. 5I-5R, the device changes the pitch and balance of the sound output in accordance with movement of the control user interface object from the first location on the display to the second location. In some embodiments, only one characteristic (e.g., the pitch or balance) of the sound output is based on the movement of the control user interface object.

In some embodiments, the audio system is (718) coupled with a plurality of speakers that corresponds to a plurality of spatial channels. In some embodiments, the plurality of spatial channels includes a left channel and a right channel. In some embodiments, the plurality of spatial channels includes a left channel, a right channel, a front channel, and a rear channel. In some embodiments, the plurality of spatial channels includes a left channel, a right channel, a top channel, and a bottom channel. In some embodiments, the plurality of spatial channels includes a left channel, a right channel, a front channel, a rear channel, a top channel, and a bottom channel. In some embodiments, providing, to the audio system, the first sound information to provide the first sound output includes determining a distribution (also called a balance) of the first sound output over the plurality of spatial channels in accordance with a direction of the movement of the control user interface object from the first location on the display to the second location on the display. In some embodiments, providing, to the audio system, the first sound information to provide the first sound output includes adjusting a distribution of the first sound output over the plurality of spatial channels in accordance with the direction of the movement of the control user interface object from the first location on the display to the second location on the display. For example, a leftward movement of the control user interface object results in a leftward shift of the distribution of the first sound output over the plurality of spatial channels; a rightward movement of the control user interface object results in a rightward shift of the distribution of the first sound output over the plurality of spatial channels. In some embodiments, the first sound information includes information to provide the first sound output in accordance with the determined distribution of the first sound output over the plurality of spatial channels.

In some embodiments, the audio system is (720) coupled with a plurality of speakers that corresponds to a plurality of spatial channels (e.g., as described above). In some embodiments, providing, to the audio system, the first sound information to provide the first sound output includes determining a distribution of the first sound output over the plurality of spatial channels (e.g., a ratio of an intensity of the first sound output to be output through the left channel and an intensity of the first sound output to be output through the right channel) in accordance with a location of the control user interface object on the display during the movement of the control user interface object from the second location on the display to the third location on the display. In some embodiments, providing, to the audio system, the first sound information to provide the first sound output includes adjusting a distribution of the first sound output over the plurality of spatial channels in accordance with the location of the control user interface object on the display during the movement of the control user interface object from the second location on the display to the third location on the display. For example, when a thumb of a horizontal slider is positioned to the left of the midpoint of the slider, the distribution of the first sound output over the plurality of spatial channels is shifted to the left; when the thumb of the horizontal slider is positioned to the right of the midpoint of the slider, the distribution of the first sound output over the plurality of spatial channels is shifted to the right.

In some embodiments, the first sound information includes information to provide the first sound output in accordance with the determined distribution of the first sound output over the plurality of spatial channels. For example, the sound output is played with a panning value (e.g., stereo panning (left/right) or other multi-channel panning) determined based on a position of the control user interface object.

In some embodiments, providing, to the audio system, the first sound information to provide the first sound output includes (722, FIG. 7C) determining a volume of the first sound output in accordance with a speed of the movement of the control user interface object from the first location on the display to the second location on the display. In some embodiments, providing, to the audio system, the first sound information to provide the first sound output includes adjusting the volume of the first sound output in accordance with the speed of the movement of the control user interface object from the first location on the display to the second location on the display. In some embodiments, the first sound information includes information to provide the first sound output in accordance with the determined volume of the first sound output. In some embodiments, the speed of the movement of the control user interface object from the first location on the display to the second location on the display is higher than the speed of the movement of the control user interface object from the second location on the display to the third location on the display (described with reference to operation 728), and the volume of the first sound output is lower than the volume of the second sound output (described with reference to operation 728) (e.g., when the control user interface object moves faster, the volume of the sound output is reduced). In some embodiments, the speed of the movement of the control user interface object (e.g., a thumb of a slider) from the first location on the display to the second location on the display is higher than the speed of the movement of the control user interface object from the second location on the display to the third location (described with reference to operation 728) on the display, and the volume of the first sound output is higher than the volume of the second sound output (described with reference to operation 728)(e.g., when the control user interface object moves faster, the volume of the sound output is increased).

In some embodiments, the control user interface object is (724) a thumb on a slider (FIGS. 5J-5S). A pitch of the first sound output changes in accordance with a position of the control user interface object on the slider (e.g., a distance of the control user interface object from one end of the slider, a distance of the control user interface object from a center of the slider, or a distance of the control user interface object from a nearest end of the slider). In some embodiments, the first sound output has a first pitch when the thumb is at a first position, and a second pitch that is lower than the first pitch when the thumb is at a second position to the left of the first position. In some embodiments, the pitch is lower when the thumb is farther to the right.

In some embodiments, after responding to the first input, the device receives (726) a second input that corresponds to a second interaction with the control user interface object on the display (e.g., an interaction to further adjust position of a thumb of a slider). In response to and while receiving the second input that corresponds to the second interaction with the control user interface object on the display: the device provides (728), to the display, data to move the control user interface object, in accordance with the second input, from the second location on the display to a third location on the display, distinct from the second location on the display; and provides, to the audio system, second sound information to provide a second sound output with one or more characteristics that change in accordance with movement of the control user interface object from the second location on the display to the third location on the display (e.g., the second sound output is audio feedback that corresponds to additional movement of a slider control). In some embodiments, the respective sound output has a first pitch and the subsequent sound output has a second pitch that is distinct from the first pitch.

In some embodiments, the control user interface object is (730, FIG. 7D) a thumb on a slider. The second location on the display is not a terminus of the slider. In some embodiments, the third location on the display (or another location that is a previous location on the display) is not a terminus of the slider. In some embodiments, the device receives (732) an input that corresponds to a respective interaction with the control user interface object on the display. In response to receiving the input that corresponds to the respective interaction with the control user interface object on the display: the device provides (734), to the display, data to move the control user interface object, in accordance with the input, to a fourth location on the display, where the fourth location on the display is a terminus of the slider. In some embodiments, the control user interface object moves from the second location on the display. In some embodiments, the control user interface object moves from the third location on the display (or another location that is a previous location on the display). In some embodiments, the fourth location on the display is distinct from the second location on the display. In some embodiments, the fourth location on the display is distinct from the third location on the display. The device also provides, to the audio system, sound information to provide a third sound output to indicate that the control user interface object is located at a terminus of the slider, where the third sound output is distinct from the first sound output. In some embodiments, the third sound output is distinct from the second sound output. In some embodiments, the fourth sound output is a bouncing sound (e.g., a reverberating "BOING") that provides audio feedback corresponding to a rubber band effect (e.g., as illustrated in FIGS. 5O-5P).

Figure 7C:
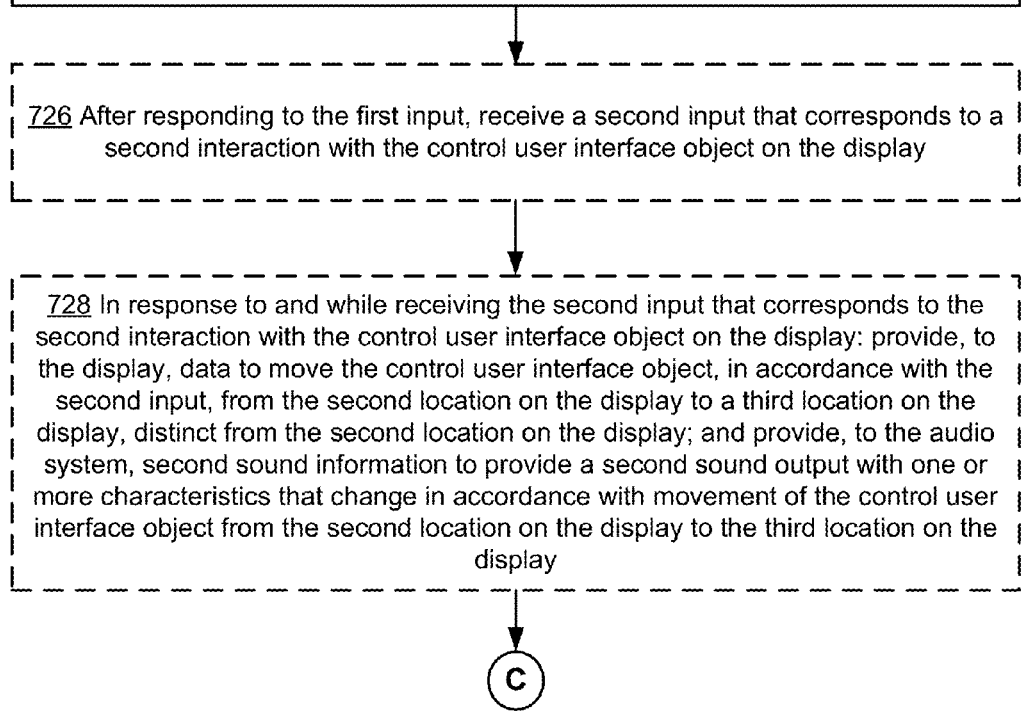
Figure 7D:
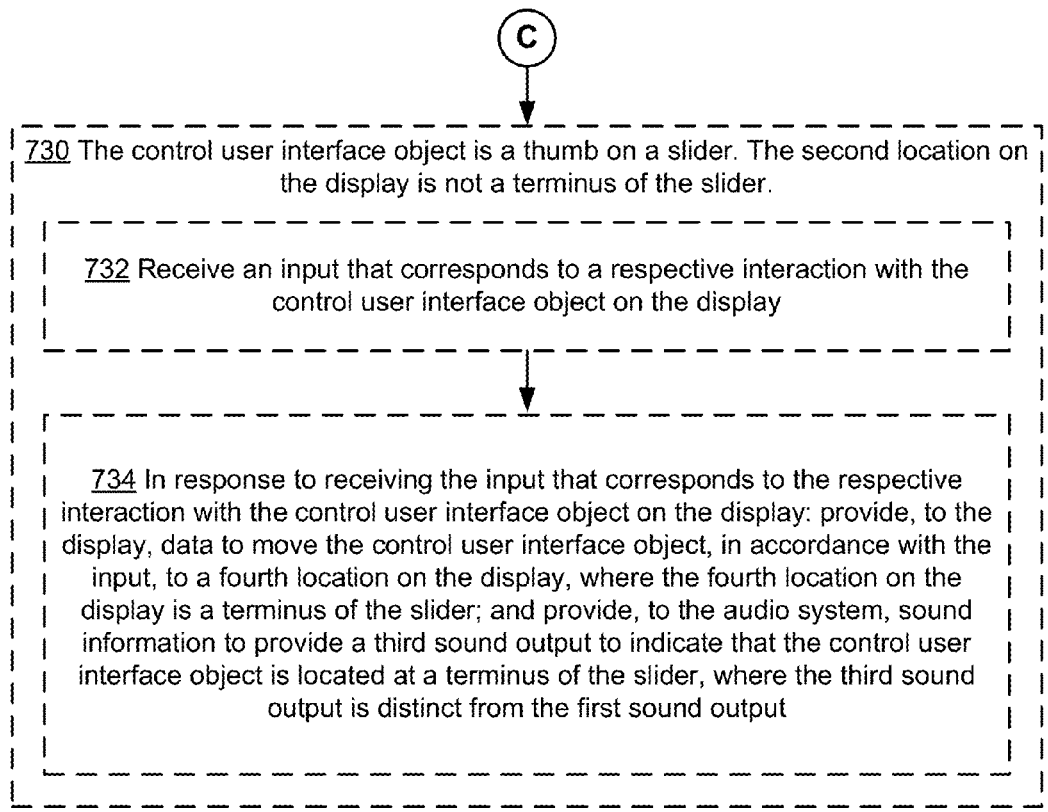

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, and 1000) are also applicable in an analogous manner to method 700 described above with respect to FIGS. 7A-7C. For example, the user interface objects, user interfaces, and sound outputs described above with reference to method 700 optionally have one or more of the characteristics of the user interface objects, user interfaces, and sound outputs described herein with reference to other methods described herein (e.g., methods 600, 800, 900, and 1000). For brevity, these details are not repeated here.

FIGS. 8A-8C are flow diagrams illustrating method 800 of providing sound information corresponding to a user's interaction with a user interface object, in accordance with some embodiments. Method 800 is performed at an electronic device (e.g., device 300, FIG. 3, or portable multifunction device 100, FIG. 1A) in communication with a display and an audio system. In some embodiments, the electronic device is in communication with a user input device (e.g., a remote user input device, such as a remote control) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 800 are, optionally, combined and/or the order of some operations is, optionally, changed.

In some embodiments, the audio system includes a digital-to-analog converter. In some embodiments, the audio system includes a signal amplifier. In some embodiments, the audio system includes one or more speakers. In some embodiments, the audio system is integrated with the display (e.g., a television with an audio processing circuit and speakers). In some embodiments, the audio system is distinct and separate from the display (e.g., a display screen and a separate audio system). In some embodiments, the device includes a touch-sensitive surface. In some embodiments, the display is a touch-screen display and the touch-sensitive surface is on or integrated with the display. In some embodiments, the display is separate from the touch-sensitive surface (e.g., the touch-sensitive surface is integrated with a remote control for a television).

Some operations in method 800 are, optionally, combined and/or the order of some operations is, optionally, changed. In some embodiments, the user interfaces in FIGS. 5T-5AA are used to illustrate the processes described with regard to method 800.

As described below, method 800 provides sound output corresponding to a user's interaction with user interface objects. The method reduces the cognitive burden on a user when interacting with user interface objects (e.g., by moving a current focus), thereby creating a more efficient human-machine interface. Providing sound output helps a user manipulate user interface objects faster and more efficiently, thereby conserving power.

The device provides (802), to the display, data to present a first user interface with a plurality of user interface objects, where a current focus is on a first user interface object of the plurality of user interface objects. In some embodiments, while the current focus is on the first user interface object, the first user interface object is visually distinguished from the other user interface objects in the plurality of user interface objects. For example, as shown in FIG. 5T, application icon 532-e is visually distinguished from the other application icons 532 by being slightly larger and having a highlighted border.

While the display is presenting the first user interface, the device receives (804) an input (e.g., a drag gesture on a touch-sensitive surface) that corresponds to a request to change a location of the current focus in the first user interface, the input having a direction and a magnitude (e.g., a speed and/or distance of the input). In some embodiments, the electronic device is in communication with a remote control and the input is received from the remote control. For example, as shown in FIG. 5T, user input 536 is detected on touch-sensitive surface 451 of remote control 5001.

In response to receiving the input that corresponds to the request to change the location of the current focus in the first user interface, the device provides (806), to the display, data to move the current focus from the first user interface object to a second user interface object, where the second user interface object is selected for the current focus in accordance with the direction and/or the magnitude of the input. For example, as shown in FIGS. 5T-5U, the device moves the current focus from application icon 532-e (FIG. 5T) to application icon 532-d (FIG. 5U) in response to user input 536. In some embodiments, while the current focus is on the second user interface object, the second user interface object is visually distinguished from the other user interface objects in the plurality of user interface objects. In some embodiments, while the current focus is on a respective user interface object, the respective user interface object is visually distinguished from the other user interface objects in the plurality of user interface objects.

Also in response to receiving the input that corresponds to the request to change the location of the current focus in the first user interface, the device provides, to the audio system, first sound information to provide a first sound output that corresponds to the movement of the current focus from the first user interface object to the second user interface object, where the first sound output is provided concurrently with display of the current focus moving from the first user interface object to the second user interface object, and a pitch of the first sound output is determined based at least in part on a size of the first user interface object (e.g., low pitch if the first user interface object is large and high pitch if the first user interface object is small), a type of the first user interface object (e.g., low pitch if the first user interface object is a genre icon and high pitch if the first user interface object is a movie poster), a size of the second user interface object (e.g., low pitch if the second user interface object is large and high pitch if the second user interface object is small), and/or a type of the second user interface object (e.g., low pitch if the second user interface object is a genre icon and high pitch if the second user interface object is a movie poster). For example, the pitch of sound output 538-1 shown in FIG. 5U for an application icon 532-d is higher than the pitch of sound output 538-9 shown in FIG. 5CC for a movie icon 534-c, which is larger than application icon 532-d.

In some embodiments, the first sound output is characterized by a pitch, a volume, a timbre, one or more audio envelope characteristics (e.g., attack, decay, sustain and/or release) and/or a distribution over a plurality of spatial channels. In some embodiments, the pitch, the volume, the timbre, the one or more audio envelope characteristics (e.g., attack, decay, sustain and/or release) and/or the distribution over a plurality of spatial channels are determined based on any of: the size of the first user interface object, the type of the first user interface object, the size of the second user interface object, the type of the second user interface object, the magnitude of the input and/or the direction of the input.

In some embodiments, the pitch of the first sound output is determined based on characteristics (e.g., the size and/or type) of the second user interface object (e.g., and not any characteristics of the first user interface object). In some embodiments, the first sound output is an "entering" sound or "moving over" sound that provides a user with audio feedback indicating the size and/or type of user interface object she is navigating to. In some embodiments, the pitch of the first sound output is determined based on characteristics (the size and/or type) of the first user interface object (e.g., and not any characteristics of the second user interface object). In some embodiments, the first sound output is an "exiting" sound or "moving from" sound that provides the user with audio feedback indicating the size and/or type of user interface object she is navigating away from.

In some embodiments, the volume of the first sound output is (808) determined based on the magnitude of the input (e.g., the speed and/or distance of the input). For example, the volume of the first sound output is reduced in accordance with a determination that the speed and/or distance of the input exceeds a predefined threshold.

In some embodiments, one or more user interface objects are located between the first user interface object and the second user interface object on the display, and the current focus moves from the first user interface object to the second user interface object via the one or more user interface objects in accordance with the direction and/or the magnitude of the input (e.g., the current focus in FIGS. 5W-5X moves from application icon 532-b to application icon 532-e via application icons 532-c and 532-d).

In some embodiments, the volume of the first sound output is (810) reduced in accordance with a determination that the magnitude of the input satisfies predefined input criteria (e.g., speed and/or distance criteria). For example, the first sound output is a "moving over" sound (e.g., as described above) that is quieter when the second user interface object is farther away on the display (e.g., from the first user interface object) than when the second user interface object is closer to the first user interface object, as shown in FIGS. 5W-5X. In some embodiments, a respective number (e.g., count) of user interface objects are located between the first user interface object and the second user interface object on the display. The current focus moves from the first user interface object to the second user interface object via the user interface objects located between the first user interface object and the second user interface object and the volume of the first sound output is based on the respective number (e.g., count) of the user interface objects located between the first user interface object and the second user interface object on the display (e.g., giving the user audio feedback indicative of how many user interface objects the user is moving over).

In some embodiments, a release of the first sound output is (812) reduced in accordance with a determination that the magnitude of the input satisfies predefined input criteria. For example, for navigation across discrete objects (e.g., representations of a plurality of videos in a video selection user interface, such as a television home screen), the first sound output has a shorter release when the magnitude satisfies predefined input criteria (e.g., with respect to speed and/or distance), and a longer release when the magnitude does not satisfy the predefined input criteria (e.g., a longer release when the speed of the first input is slower, giving the user audio feedback indicating that the input is more gradual).

In some embodiments, a distribution of the first sound output over a plurality of spatial channels is (814) adjusted in accordance with a location of the second user interface object in the first user interface (e.g., a left audio channel is increased and/or a right audio channel is reduced when the current focus moves to a user interface object located on a left side of the first user interface, and a right audio channel is increased and/or a left audio channel is reduced when the current focus moves to a user interface object located on a right side of the first user interface, as shown in FIGS. 5CC-5EE). In some embodiments, the distribution of the first sound output over the plurality of spatial channels is adjusted in accordance with a relative location (e.g., up/down, left or right) of the second user interface object with respect to the first user interface object. In some embodiments, the distribution of the first sound output over the plurality of spatial channels is adjusted in accordance with the movement (e.g., up/down, left or right) of the current focus from the first user interface object to the second user interface object. In some embodiments, the plurality of spatial channels includes a left audio channel, a right audio channel, an up audio channel, and a down audio channel. For example, an up audio channel is increased and/or a down audio channel is reduced when the current focus moves to a user interface object located on an upper side of the first user interface, and a down audio channel is increased and/or an up audio channel is reduced when the current focus moves to a user interface object located on a lower side of the first user interface.

In some embodiments, the pitch of the first sound output is (816, FIG. 8B) determined based on the size of the second user interface object and/or the type of the second user interface object (e.g., and not based on the size of the first user interface object and/or the type of the first user interface object). In response to receiving the input that corresponds to the request to change the location of the current focus in the first user interface, the device provides, to the audio system, second sound information to provide a second sound output that corresponds to the movement of the current focus from the first user interface object to the second user interface object, where a pitch of the second sound output is determined based at least in part on the size of the first user interface object and/or the type of the first user interface object (e.g., and not based on the size of the second user interface object and/or the type of the second user interface object). For example, the first sound output indicates the current focus "moving over" to the second user interface object (e.g., an entering sound), and the second sound output indicates the current focus "moving from" the first user interface object (e.g., an exit sound). As shown in FIGS. 5T-5U, in conjunction with moving the current focus from application icon 532-e to application icon 532-d, sound output 540-1 (an exemplary exit sound) and sound output 538-1 (an exemplary entering sound) are sequentially provided. In some embodiments, the second sound output begins prior to the first sound output beginning In some embodiments, the second sound output terminates prior to the first sound output terminating. In some embodiments, at least a portion of the second sound output is provided concurrently with the first sound output. In some embodiments, the first sound output begins after the second sound output terminates (e.g., the first sound output and the second sound output do not overlap).

In some embodiments, the first user interface includes three or more user interface objects of distinct sizes, and the three or more user interface objects correspond to sound outputs with one or more distinct sound characteristics (e.g., different pitch).

In some embodiments, in response to receiving one or more inputs that correspond to one or more requests to change the location of the current focus in the first user interface: the device provides (818), to the display, data to move the current focus from the second user interface object to a third user interface object. The device also provides, to the audio system, third sound information to provide a third sound output that corresponds to the movement of the current focus from the second user interface object to the third user interface object, where the third sound output is provided concurrently with display of the current focus moving from the second user interface object to the third user interface object. The device also provides, to the display, data to move the current focus from the third user interface object to a fourth user interface object and provides, to the audio system, fourth sound information to provide a fourth sound output that corresponds to the movement of the current focus from the third user interface object to the fourth user interface object. The fourth sound output is provided concurrently with display of the current focus moving from the third user interface object to the fourth user interface object. For example, the current focus moves to icon 550-d with sound output 538-7 (FIG. 5Y), followed by movement of the current focus to application icon 532-e with sound output 538-8 (FIG. 5Z), and to movie icon 534-c with sound output 538-9 (FIG. 5CC).

In some embodiments, a sound output that corresponds to the movement of the current focus to a largest object of the second user interface object, the third user interface object, and the fourth user interface object has a pitch that is lower than respective sound outputs that correspond to the movement of the current focus to the remaining two of the second user interface object, the third user interface object, and the fourth user interface object (e.g., when the third user interface object is the largest object among the second user interface object, the third user interface object, and the fourth user interface object, a sound output that corresponds to the movement of the current focus to the third user interface object has a pitch that is lower than a pitch of a sound output that corresponds to the movement of the current focus to the second user interface object and a pitch of a sound output that corresponds to the movement of the current focus to the fourth user interface object). For example, in FIGS. 5Y-5CC, movie icon 534-c is the largest object among icon 550-d, application icon 532-e, and movie icon 534-*c*, and corresponding sound output 538-9 has the lowest pitch among the sound outputs associated with icon 550-*d*, application icon 532-*e*, and movie icon 534-*c*.

In some embodiments, a sound output that corresponds to the movement of the current focus to a smallest object of the second user interface object, the third user interface object, and the fourth user interface object has a pitch that is higher than respective sound outputs that correspond to the movement of the current focus to the remaining two of the second user interface object, the third user interface object, and the fourth user interface object (e.g., when the second user interface object is the smallest object among the second user interface object, the third user interface object, and the fourth user interface object, a sound output that corresponds to the movement of the current focus to the second user interface object has a pitch that is higher than a pitch of a sound output that corresponds to the movement of the current focus to the third user interface object and a pitch of a sound output that corresponds to the movement of the current focus to the fourth user interface object). For example, in FIGS. 5Y-5CC, application icon 532-*e* is the smallest object among icon 550-*d*, application icon 532-*e*, and movie icon 534-*c*, and corresponding sound output 538-9 has the highest pitch among the sound outputs associated with icon 550-*d*, application icon 532-*e*, and movie icon 534-*c*.

While the display is presenting the first user interface with the plurality of user interface objects, where the first user interface with the plurality of user interface objects is included in a hierarchy of user interfaces, the device receives (820, FIG. 8C) an input that corresponds to a request to replace the first user interface with a second user interface in the hierarchy of user interfaces (e.g., input 574 pressing menu button 5002 as shown in FIG. 5GG or user input 554 on touch-sensitive surface 451 as shown in FIG. 5Z). For description of these and related features, we assume that an exemplary hierarchy of user interfaces includes a screen saver user interface (e.g., screen saver user interface 517 in FIG. 5HH), a home screen user interface (e.g., home screen user interface 530 in FIG. 5GG) below the screen saver user interface, and an application user interface (e.g., game user interface 594 in FIG. 5AA) below the home screen user interface (e.g., the hierarchy of user interfaces includes, in the order of hierarchy from top to bottom, screen saver user interface 517, home screen user interface 530, and game user interface 594). In response to receiving the input that corresponds to the request to replace the first user interface with the second user interface: the device provides (822), to the display, data to replace the first user interface with the second user interface (e.g., in response to input 574 pressing menu button 5002, screen saver user interface 517 replaces home screen user interface 530 as shown in FIGS. 5GG-5HH, and in response to user input 554 on touch-sensitive surface 451, game user interface 594 replaces home screen user interface 530). In accordance with a determination that the first user interface is located above the second user interface in the hierarchy of user interfaces (e.g., navigating from a higher user interface to a lower user interface in the exemplary hierarchy, such as navigating from home screen user interface 530 to game user interface 594), the device provides, to the audio system, fifth sound information to provide a fifth sound output (e.g., a high pitch sound, such as sound output 556-1 in FIG. 5AA). In some embodiments, the fifth sound output is provided concurrently with replacing the first user interface with the second user interface. In some embodiments, the first user interface is located immediately above the second user interface in the hierarchy of user interfaces (e.g., home screen user interface 530 is located immediately above game user interface 594 in the exemplary hierarchy). In accordance with a determination that the first user interface is located below the second user interface in the hierarchy of user interfaces (e.g., navigating from a lower user interface to a higher use interface in the exemplary hierarchy, such as navigating from home screen user interface 530 to screen saver user interface 517), the device provides, to the audio system, sixth sound information to provide a sixth sound output that is distinct from the fifth sound output (e.g., a low pitch sound, such as sound output 560-3 in FIG. 5HH). In some embodiments, the sixth sound output is provided concurrently with replacing the first user interface with the second user interface. In some embodiments, the first user interface is located immediately below the second user interface in the hierarchy of user interfaces (e.g., home screen user interface 530 is located immediately below screen saver user interface 517 in the exemplary hierarchy). Thus, the fifth sound output and/or the sixth sound output can be used to indicate whether the user is navigating toward the top or bottom of the hierarchy.

In some embodiments, the fifth sound output is distinct from the first sound output. In some embodiments, the fifth sound output is distinct from the second sound output. In some embodiments, the fifth sound output is distinct from the third sound output. In some embodiments, the fifth sound output is distinct from the fourth sound output. In some embodiments, the sixth sound output is distinct from the first sound output. In some embodiments, the sixth sound output is distinct from the second sound output. In some embodiments, the sixth sound output is distinct from the third sound output. In some embodiments, the sixth sound output is distinct from the fourth sound output. In some embodiments, the sixth sound output is distinct from the fifth sound output.

While the display is presenting the first user interface, the device receives (824) an input that corresponds to a request to activate a user interface object with the current focus (e.g., the user interface object overlaid by, surrounded by, or adjacent to, the current focus). In response to receiving the input that corresponds to the request to activate a user interface object with the current focus, in accordance with a determination that the first user interface object is with the current focus, the device provides (826), to the audio system, seventh sound information to provide a seventh sound output that corresponds to the activation of the first user interface object. For example, application icon 532-*e* (FIG. 5Z) is activated in conjunction with providing sound output 556-1 (FIG. 5AA). In accordance with a determination that the second user interface object is with the current focus, the device provides, to the audio system, eighth sound information to provide an eighth sound output that corresponds to the activation of the second user interface object. The eighth sound output is distinct from the seventh sound output. For example, movie icon 534-*a* (FIG. 5EE) is activated in conjunction with providing sound output 556-2 (FIG. 5FF). A relationship between one or more characteristics of a sound output that corresponds to a movement of the current focus to the first user interface object and the one or more characteristics of the second sound output corresponds to a relationship between the one or more characteristics of the seventh sound output and the one or more characteristics of the eighth sound output. For example, when the first user interface object is smaller than the second user interface object, a sound output that corresponds to a movement of the current focus to the first user interface object has a pitch higher than a pitch of a sound output that corresponds to a movement of the current focus to the second user interface object, and a sound output that corresponds to an activation of the first user interface object has a pitch higher than a pitch of a sound output that corresponds to an activation of the second user interface object (e.g., sound output 538-8, in FIG. 5Z, that corresponds to a movement of the current focus to application icon 532-e has a higher pitch than sound output 538-11, in FIG. 5EE, that corresponds to a movement of the current focus to movie icon 534-a, and sound output 556-1, in FIG. 5AA, that corresponds to an activation of application icon 532-e has a higher pitch than sound output 556-2, in FIG. 5FF, that corresponds to an activation of movie icon 534-a).

In some embodiments, a respective sound output is a single tone or chord (e.g., the sound "DING"). In some embodiments, a respective sound output is a single tone or chord in a melody (e.g., the sound "DING" in a short melody "DING DONG," where a melody includes at least two tones and chords). In some embodiments, the sound output is provided (or determined, modified, etc.) in accordance with a determined characteristic when a single tone or chord in the melody is provided (or determined, modified, etc.) in accordance with the determined characteristic (e.g., a respective sound output with a determined pitch is provided when the sound "DING" in melody "DING DONG" is provided with the determined pitch). In some embodiments, a sound output that is melody and is provided (or determined, modified, etc.) in accordance with a determined characteristic when the entire melody is provided (or determined, modified, etc.) in accordance the determined characteristic (e.g., the sound output is a V-I cadence, where I represents a root chord that is determined in accordance with a determined pitch and V is a chord five musical steps above the root chord I). In some embodiments, the pitch is a perceived pitch.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, and 1000) are also applicable in an analogous manner to method 800 described above with respect to FIGS. 8A-8C. For example, the user interface objects, user interfaces, and sound outputs described above with reference to method 800 optionally have one or more of the characteristics of the user interface objects, user interfaces, and sound outputs described herein with reference to other methods described herein (e.g., methods 600, 700, 900, and 1000). For brevity, these details are not repeated here.

FIGS. 9A-9C are flow diagrams illustrating method 900 of providing sound information for a video information user interface, in accordance with some embodiments. Method 900 is performed at an electronic device (e.g., device 300, FIG. 3, or portable multifunction device 100, FIG. 1A) in communication with a display and an audio system. In some embodiments, the electronic device is in communication with a user input device (e.g., a remote user input device, such as a remote control) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 900 are, optionally, combined and/or the order of some operations is, optionally, changed.

In some embodiments, the audio system includes a digital-to-analog converter. In some embodiments, the audio system includes a signal amplifier. In some embodiments, the audio system includes one or more speakers. In some embodiments, the audio system is integrated with the display (e.g., a television with an audio processing circuit and speakers). In some embodiments, the audio system is distinct and separate from the display (e.g., a display screen and a separate audio system).

Some operations in method 900 are, optionally, combined and/or the order of some operations is, optionally, changed. In some embodiments, the user interfaces in FIGS. 5II-5MM are used to illustrate the processes described with regard to method 900.

As described below, pausing a playback of a video includes providing data to present a plurality of still images from the video while the playback of the video is paused. The plurality of still images from the video helps the user understand the context of the video around where the playback of the video was paused, even before the playback of the video is resumed. Thus, the user can understand the context of the video soon after the playback of the video is resumed.

The device provides (902), to the display, data to present a first video information user interface that includes descriptive information about a first video. For example, the first video information user interface (e.g., product page view 572 in FIG. 5II) includes information such as a title, running time, plot summary, rating, affordance to play the first video, etc.

In some embodiments, prior to the display presenting the first video information user interface: the device provides (904), to the display, data to present a video selection user interface that includes representations of a plurality of videos (e.g., icons with posters and/or titles that correspond to each of a plurality of videos). The device receives an input that corresponds to a selection of a representation of the first video in the plurality of videos, wherein the first video information user interface for the first video is presented in response to receiving the input that corresponds to the selection of the representation of the first video. For example, the user interface in FIG. 5GG is displayed prior to display of the user interface in FIG. 5II and the user interface in FIG. 5II is presented in response to the user activating movie icon 534-a (FIG. 5GG).

The device provides (906), to the audio system, sound information to provide a first sound output, which corresponds to (e.g., is based on) the first video, during presentation of the first video information user interface by the display. In some embodiments, the sound information is audio based on the genre of the first video (e.g., dark ambient sound for a drama, or light ambient sound for a comedy, etc.). In some embodiments, the genre of the first video is determined using metadata associated with the video (e.g., metadata indicating one or more genre classifications for the video or a first scene in the video). In some embodiments, the sound information is audio generated from sounds or music in the first video itself (e.g., the audio is audio from a soundtrack of the first video). In some embodiments, the sound information is audio selected to correspond to the tone of a particular scene in the first video. For example, in some embodiments, the device analyzes the color distribution of the first scene of the first video to determine whether the scene is "bright" or "dark" and matches the audio to be either "bright" or "dark." In some embodiments, the first sound output loops (repeats) while the first video information user interface about the first video is displayed.

In some embodiments, the first video information user interface includes (908) a plurality of user interface objects. For example, as shown in FIG. 5II, the user interface includes an affordance to "Watch Now" and a "Trailer/Preview" affordance. A first user interface object of the plurality of user interface objects is configured to, when selected (or activated), initiate the electronic device providing, to the audio system, sound information to provide a sound output that corresponds to at least a portion of a first soundtrack of the first video (e.g., activating a play user interface object in the first video information user interface initiates outputting a gunshot sound from the first video). A second user interface object of the plurality of user interface objects is configured to, when selected (or activated), initiate the electronic device providing, to the audio system, sound information to provide a sound output that corresponds to at least a portion of a second soundtrack, distinct from the first soundtrack, of the first video (e.g., activating a trailer user interface object in the first video information user interface initiates outputting a horse sound from the first video).

While the display is presenting the first video information user interface that includes descriptive information about the first video, the device receives (910) an input that corresponds to a request to playback the first video (e.g., receiving an input that corresponds to activation of a play icon in the video information user interface, or activation of a play button on a remote control in communication with the device). In response to receiving the input that corresponds to the request to playback the first video, the device provides (912), to the display, data to replace presentation of the first video information user interface with playback of the first video (e.g., video playback view 500 in FIG. 5JJ). For example, the user decides to watch the first video and activates playback of the first video accordingly.

During the playback of the first video, the device receives (914, FIG. 9B) an input that corresponds to a request to display a second video information user interface about the first video (e.g., receiving input 580 that corresponds to activation of a pause icon or a back icon, or activation of a pause button or a back button, such as menu button 5002, on a remote control in communication with the device, as shown in FIG. 5JJ). In some embodiments, the second video information user interface about the first video is distinct from the first video information user interface about the first video. For example, the second video information is a "pause" screen distinct from a product page view. In some embodiments, the second video information user interface about the first video is the same as the first video information user interface about the first video. In some embodiments, when the user pauses the video, the device returns to the first video information user interface.

In response to receiving the input that corresponds to the request to display the second video information user interface about the first video: the device provides (916), to the display, data to replace the playback of the first video with the second video information user interface about the first video (e.g., product page view 572 in FIG. 5KK). The device provides, to the audio system, sound information to provide a second sound output, distinct from the first sound output, that corresponds to (e.g., is based on) the first video, during presentation of the second video information user interface by the display. In some embodiments, the second sound output loops (repeats) while the second video information user interface about the first video is displayed.

In some embodiments, the second sound output is (918) a soundtrack of the first video that corresponds to a position in the first video being played when the input that corresponds to the request to display the second video information user interface is received. In some embodiments, the second sound output is selected from soundtracks of the first video that correspond to a chapter of the first video that encompasses the position in the first video being played when the input that corresponds to the request to display the second video information user interface is received.

In some embodiments, in accordance with a determination that the input that corresponds to the request to display the second video information user interface is received within a predetermined duration from an ending of the first video (e.g., input 583 while the end credits are displayed, as shown in FIG. 5LL), an end credits soundtrack of the first video is (920) selected for the second sound output. For example, if the first video is near (e.g., close enough to) the ending, an end credits soundtrack is played with the video information user interface.

In some embodiments, subsequent to initiating the playback of the first video, the device receives (922, FIG. 9C) an input that corresponds to a request to pause the first video. In response to receiving the input that corresponds to the request to pause the first video: the device pauses (924) the playback of the first video at a first playback position in a timeline of the first video and provides to the display, data to present one or more selected still images from the first video, wherein the one or more selected still images are selected based on the first playback position at which the first video is paused (e.g., if the input that corresponds to the request to pause the first video is received while the audio system outputs a first soundtrack of the first video, the audio system continues to output the first soundtrack of the first video while the first video is paused). The device further provides, to the audio system, sound information to provide a sound output that corresponds to a soundtrack of the first video at the first playback position.

In some embodiments, subsequent to initiating the playback of the first video, the device receives (926) an input that corresponds to a request to pause the first video. In response to receiving the input that corresponds to the request to pause the first video: the device pauses (928) the playback of the first video at a first playback position in a timeline of the first video; and provides, to the display, data to present one or more selected still images from the first video (e.g., FIGS. 5OO-5SS). The one or more selected still images are selected based on the first playback position at which the first video is paused. The device further provides, to the audio system, sound information to provide a sound output that corresponds to one or more characteristics (e.g., tempo, chords of the original soundtrack) of the first video at the first playback position. In some embodiments, the method includes identifying a tempo and/or chords of the original soundtrack at or within a time window of a predefined duration encompassing the first playback position, and selecting music that is distinct from the original soundtrack based on the tempo and/or chords of the original soundtrack at the first playback position.

In some embodiments, the first sound output and/or the second sound output are (930) selected from soundtracks of the first video. In some embodiments, the first sound output is theme music of the first video. In some embodiments, the first sound output is independent of a current playback position in the first video. For example, the first sound output is selected even before the first video is played.

In some embodiments, the first sound output and/or the second sound output are (932) selected (e.g., from soundtracks independent of the first video, such as a collection of soundtracks from movies of various genres) based on one or more characteristics of the first video (e.g., genre, user rating, critics rating, etc.). For example, electronic music is selected for a science fiction movie, and western music is selected for a western movie (e.g., based on metadata associated with the first video). For example, music that starts with a fast tempo and/or with a major chord is selected for a movie that has a user rating and/or a critics rating above predefined criteria, and music that starts with a slow tempo and/or with a minor chord is selected for a movie that has a user rating and/or a critics rating below the predefined criteria.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 1000) are also applicable in an analogous manner to method 900 described above with respect to FIGS. 9A-9C. For example, the user interface objects, user interfaces, sound outputs, and still images described above with reference to method 900 optionally have one or more of the characteristics of the user interface objects, user interfaces, sound outputs, and still images, described herein with reference to other methods described herein (e.g., methods 600, 700, 800, and 1000). For brevity, these details are not repeated here.

FIGS. 10A-10B illustrate a flow diagram of a method 1000 of providing audiovisual information while a video is in a paused state, in accordance with some embodiments. Method 1000 is performed at an electronic device (e.g., device 300, FIG. 3, or portable multifunction device 100, FIG. 1A) in communication with a display, and in some embodiments, a touch-sensitive surface. In some embodiments, the display is a touch-screen display and the touch-sensitive surface is on or integrated with the display. In some embodiments, the display is separate from the touch-sensitive surface. Some operations in method 10 are, optionally, combined and/or the order of some operations is, optionally, changed.

As described below, method 1000 provides an intuitive way to provide audiovisual information while a video is in a paused state. The method reduces the cognitive burden on a user when observing audiovisual information while a video is in a paused state, thereby creating a more efficient human-machine interface. Enabling a user to observe audiovisual information while a video is in a paused state also conserves power.

The device provides (1002), to the display, data to present a first video. For example, data to present a movie or a television program (e.g., video playback view 500 in FIG. 5NN). While the display is presenting (e.g., playing back) the first video, the device receives (1004) an input that corresponds to a user request to pause the first video. For example, receiving an input that corresponds to activation of a pause icon, a pause gesture on a touch-sensitive surface on the device or on a remote control in communication with the device, or activation of a pause button on a remote control in communication with the device (e.g., input 586 on play/pause button 5004 in FIG. 5NN).

In response to receiving the input that corresponds to the user request to pause the first video, the device pauses (1006) the presenting of the first video at a first playback position in a timeline of the first video. Subsequent to pausing the presenting of the first video at the first playback position in the timeline of the first video and while the presenting of the first video is paused, the device provides (1008), to the display, data to present a plurality of selected still images from the first video (e.g., automatically selected still images), where the plurality of selected still images are selected based on the first playback position at which the first video was paused. For example, the device provides, to the display, data to present the plurality of selected still images, as shown in FIGS. 5OO-5SS.

In some embodiments, the plurality of selected still images is presented sequentially while the first video is paused. In some embodiments, the selected still images are presented in chronological order while the first video is paused. In some embodiments, the selected still images are presented in random order while the first video is paused. In some embodiments, the selected still images are sequentially provided to the display while the first video is paused. In some embodiments, the selected still images are provided in chronological order while the first video is paused. In some embodiments, the selected still images are provided in random order while the first video is paused.

In some embodiments, the plurality of selected still images is selected (1010) from a range of playback positions for the first video between the first playback position in the timeline and a second playback position in the timeline that precedes the first playback position. In some embodiments, the second playback position in the timeline precedes (1012) the first playback position by a predetermined time interval. For example, the plurality of still images is selected from a 30 second range, and the first playback position is at 0:45:00 and the second playback position is at 0:44:30. In some embodiments, the images are selected so as to exclude any images corresponding to playback of the video after the first playback position. For instance, the images are selected to avoid revealing anything about the storyline after the first playback position.

In some embodiments, the second playback position in the timeline precedes (1014) the first playback position by a time interval that is determined subsequent to receiving the input that corresponds to the request to pause the first video. For example, the time interval is determined in response to receiving the input that corresponds to the request to pause the first video or immediately before providing the data to present the plurality of selected still images from the first video. In some embodiments, a longer time interval is used if frames between the first playback position in the timeline and a second playback position in the timeline that precedes the first playback position change less than first predefined frame-change criteria. In some embodiments, one of the predefined frame-change criteria is the amount of movement detected in the frames. For example, if there is very little movement in the 30 seconds or 60 seconds preceding the first playback position, the time interval is increased to 2 minutes preceding the first playback position. In some embodiments, a shorter time interval is used if frames between the first playback position in the timeline and the second playback position in the timeline that precedes the first playback position change more than second predefined frame-change criteria. In some embodiments, one of the predefined frame-change criteria is the genre of the video being displayed. For example, a longer time interval is used if the first video is for classical music performance, and a shorter time interval is used if the first video is an action movie.

In some embodiments, the plurality of selected still images of the video includes (1016, FIG. 10B) a still image that is not consecutive in the video to any other still images in the plurality of selected still images. For example, the still image is separated from any other still images by at least one frame of the video (e.g., one or more frames are located in the video between any two selected still images). In some embodiments, the still images are not played at a video rate (e.g., each still image may be displayed for several seconds). In some embodiments, the plurality of selected still images includes (1018) representative frames. In some embodiments, the method includes identifying the representative frames based on predefined representative frame criteria (e.g., frames with characters and/or objects in a central area of a respective frame, frames with movement of objects less than predefined movement criteria, etc.).

In some embodiments, subsequent to pausing the presenting of the first video at the first playback position in the timeline of the first video and while the presenting of the first video is paused, the device provides (1020), to the display, data to present an animation indicating a transition to a slideshow mode (e.g., count-down clock 588 in FIG. 5PP). In some embodiments, the plurality of selected still images is displayed in a slideshow mode while the video is paused. In some embodiments, the animation indicating the transition to the slideshow mode includes (1022) a count-down clock. In some embodiments, displaying the plurality of images in a slideshow mode includes displaying a time marker indicating the position in the timeline of the video corresponding to the first playback position (e.g., where the video was paused). In some embodiments, displaying the plurality of images in a slideshow mode includes displaying a clock indicating the current time of day (e.g., that is current 8:03 pm).

In some embodiments, the device repeats (1024) provision, to the display, of the data to present the plurality of selected still images from the first video. In some embodiments, sequential display of the plurality of selected still images is repeated (e.g., in a loop). In some embodiments, display of the plurality of selected still images is repeated in a randomized fashion. In some embodiments, the device provides (1026), to the display, data to present a respective still image of the plurality of selected still images with a panning effect and/or a zooming effect. In some embodiments, the device provides, to the display, data to present a respective still image of the plurality of selected still images with a degree of transparency (e.g., as the next still image is displayed).

In some embodiments, the device is in communication with an audio system, and the device provides (1028), to the audio system, sound information to provide a first sound output that corresponds to the first video being presented on the display. In some embodiments, the device provides (1030), to the audio system, sound information to provide a sound output that is selected based on the first playback position at which the first video was paused.

It should be understood that the particular order in which the operations in FIGS. 10A-10B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 900) are also applicable in an analogous manner to method 1000 described above with respect to FIGS. 10A-10B. For example, the user interface objects, user interfaces, still images, and sound outputs described above with reference to method 1000 optionally have one or more of the characteristics of the user interface objects, user interfaces, still images, and sound outputs described herein with reference to other methods described herein (e.g., methods 600, 700, 800, and 900). For brevity, these details are not repeated here.

Figure 11:
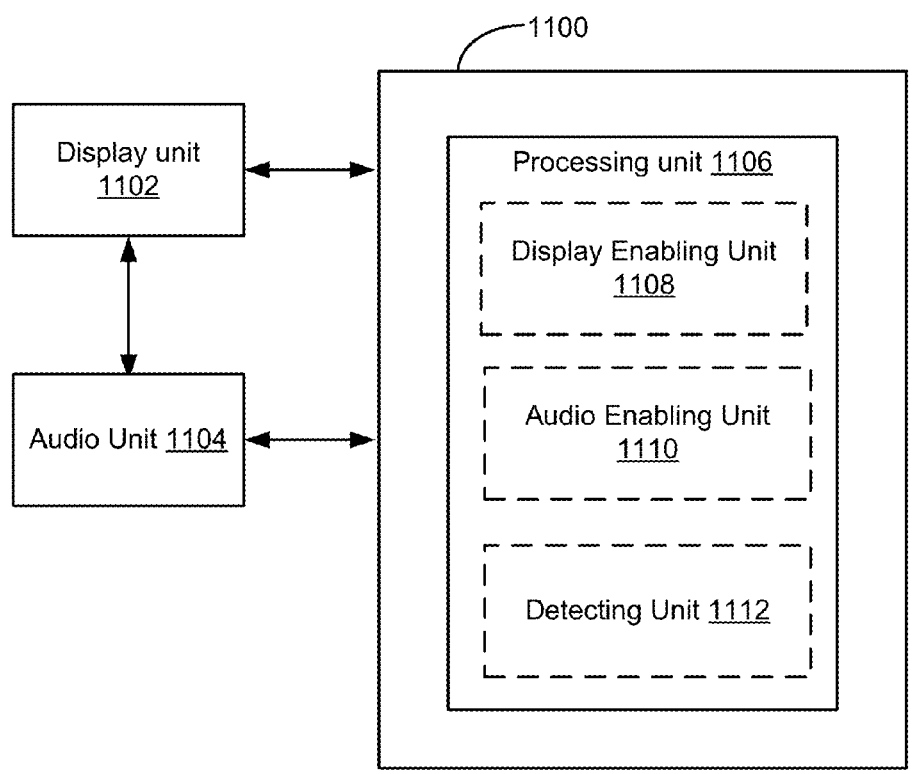
FIG. 11 is a functional block diagram of an electronic device in accordance with some embodiments.

In accordance with some embodiments, FIG. 11 shows a functional block diagram of electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, electronic device 1100 includes processing unit 1106. In some embodiments, electronic device 1100 is in communication with display unit 1102 (e.g., configured to display a user interface) and audio unit 1104 (e.g., configured to provide sound outputs). In some embodiments, processing unit 1106 includes: display enabling unit 1108, audio enabling unit 1110, and detecting unit 1112.

Processing unit 1106 is configured to provide (e.g., with display enabling unit 1108), to display unit 1102, data to present a user interface generated by the device. The user interface includes a first user interface object with first visual characteristics. The user interface also includes a second user interface object with second visual characteristics that is distinct from the first user interface object.

Processing unit 1106 is configured to provide (e.g., with audio enabling unit 1110), to audio unit 1104, sound information to provide a sound output. The sound output includes a first audio component that corresponds to the first user interface object. The sound output also includes a second audio component that corresponds to the second user interface object and is distinct from the first audio component.

Processing unit 1106 is configured to, while the user interface is being presented on display unit 1102 and the sound output is being provided, provide (e.g., with display enabling unit 1108), to display unit 1102, data to update the user interface and provide (e.g., with audio enabling unit 1110), to audio unit 1104, sound information to update the sound output. Updating the user interface and updating the sound output includes changing at least one visual characteristic of the first visual characteristics of the first user interface object in conjunction with changing the first audio component that corresponds to the first user interface object and changing at least one visual characteristic of the second visual characteristics of the second user interface object in conjunction with changing the second audio component that corresponds to the second user interface object. Providing the data to update the user interface occurs independently of user input.

In some embodiments, the first visual characteristics include a size and/or a location of the first user interface object.

In some embodiments, updating the user interface and updating the sound output further includes: ceasing to display the first user interface object and ceasing to provide a sound output that includes the first audio component that corresponds to the first user interface object, ceasing to display the second user interface object and ceasing to provide a sound output that includes the second audio component that corresponds to the second user interface object, and/or displaying one or more respective user interface objects and providing a sound output that includes one or more respective audio components that correspond to the one or more respective user interface objects.

In some embodiments, the first audio component that corresponds to the first user interface object is changed in accordance with changes to at least one visual characteristic of the first visual characteristics of the first user interface object.

In some embodiments, at least one visual characteristic of the first visual characteristics of the first user interface object is changed in accordance with changes to the first audio component.

In some embodiments, a pitch of a respective audio component corresponds to an initial size of a corresponding user interface object, a stereo balance of the respective audio component corresponds to a location of the corresponding user interface object on the display unit 1102, and/or a change in a volume of the respective audio component corresponds to a change in a size of the corresponding user interface object.

In some embodiments, the first visual characteristics of the first user interface object and the second visual characteristics of the second user interface object are determined independently of a user input.

In some embodiments, the second audio component is selected based at least in part on the first audio component.

In some embodiments, updating the sound output includes determining whether predetermined inactivity criteria are satisfied, and, in accordance with a determination that the predetermined inactivity criteria are satisfied, changing a volume of the sound output.

In some embodiments, Processing unit 1106 is configured to detect (e.g., using detecting unit 1112) a user input. Processing unit 1106 is configured to, in response to detecting the user input, provide (e.g., using audio enabling unit 1110), to audio unit 1104, sound information to change respective audio components that correspond to respective user interface objects and provide (e.g., using display enabling unit 1108), to display unit 1102, data to update the user interface and display one or more control user interface objects.

In some embodiments, the sound information provided to audio unit 1104 includes information to provide a sound output that includes an audio component that is not harmonious with the respective audio components that correspond to respective user interface objects.

In some embodiments, processing unit 1106 is configured to, prior to detecting a user input, provide (e.g., using display enabling unit 1108), to display unit 1102, data to display the user interface and update the user interface without providing, to audio unit 1104, sound information to provide the sound output. Processing unit 1106 is configured to, subsequent to detecting the user input, provide (e.g., using display enabling unit 1108), to display unit 1102, data to display the user interface and update the user interface and provide, to audio unit 1104, sound information to provide the sound output and update the sound output.

Figure 12:
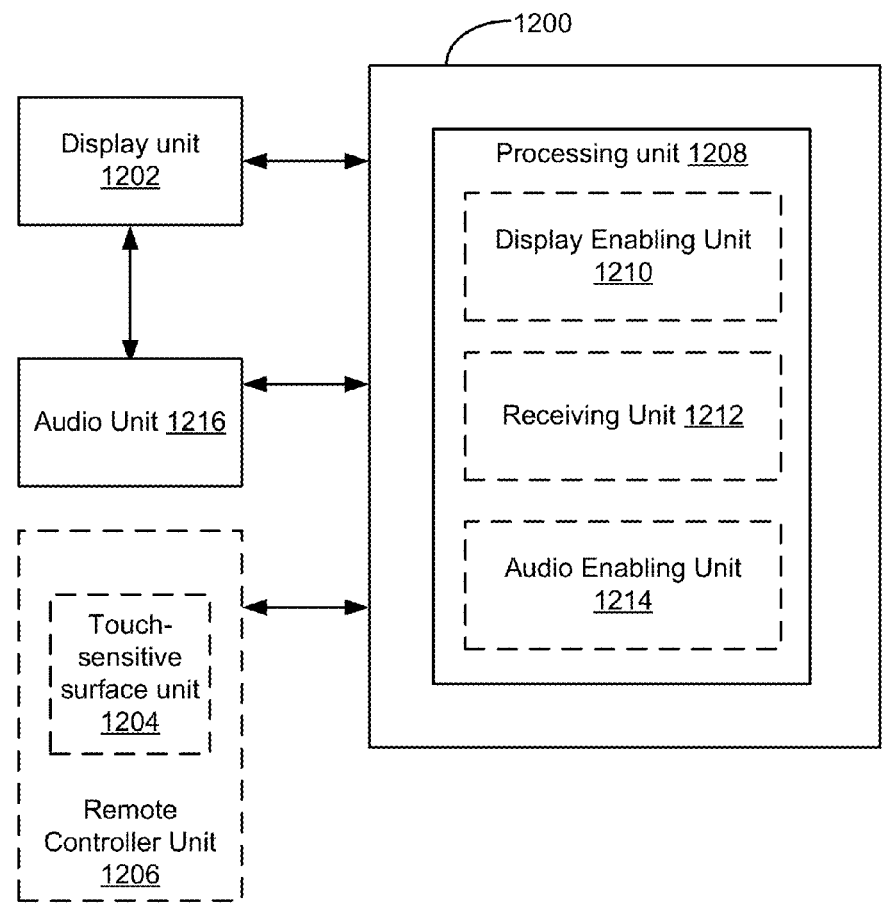
FIG. 12 is a functional block diagram of an electronic device in accordance with some embodiments.

In accordance with some embodiments, FIG. 12 shows a functional block diagram of electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, electronic device 1200 is in communication with display unit 1202 (e.g., configured to display a user interface), audio unit 1216 (e.g., configured to provide sound outputs), and in some embodiments, with remote control unit 1206 configured to detect user inputs and send them to device 1200. In some embodiments, remote control unit 1206 includes touch-sensitive surface unit 1204 configured to receive contacts. In some embodiments, processing unit 1208 includes: display enabling unit 1210, receiving unit 1212, and audio enabling unit 1214.

In accordance with some embodiments, processing unit 1208 is configured to provide, to display unit 1202, data to present a user interface with a plurality of user interface objects (e.g., with display enabling unit 1210), including a control user interface object at a first location on display unit 1202. The control user interface object is configured to control a respective parameter. Processing unit 1208 is configured to receive (e.g., with receiving unit 1212) a first input (e.g., on touch-sensitive surface unit 1204) that corresponds to a first interaction with the control user interface object on display unit 1202. Processing unit 1208 is configured to, while receiving the first input that corresponds to the first interaction with the control user interface object on display unit 1202, provide, to display unit 1202, data to move the control user interface object, in accordance with the first input, from the first location on display unit 1202 to a second location on display unit 1202, distinct from the first location on display unit 1202; and provide, to audio unit 1216 (e.g., with audio enabling unit 1214), first sound information to provide a first sound output with one or more characteristics that are different from the respective parameter controlled by the control user interface object and that change in accordance with movement of the control user interface object from the first location on display unit 1202 to the second location on display unit 1202.

In some embodiments, in accordance with a determination that the first input meets first input criteria, the first sound output has a first set of characteristics, and, in accordance with a determination that the first input meets second input criteria, the first sound output has a second set of characteristics that are different from the first set of characteristics.

In some embodiments, processing unit 1208 is configured to, after responding to the first input, receive (e.g., with receiving unit 1212) a second input (e.g., on touch-sensitive surface unit 1204) that corresponds to a second interaction with the control user interface object on display unit 1202. Processing unit 1208 is configured to, in response to and while receiving the second input that corresponds to the second interaction with the control user interface object on display unit 1202, provide (e.g., with display enabling unit 1210), to display unit 1202, data to move the control user interface object, in accordance with the second input, from the second location on display unit 1202 to a third location on display unit 1202, distinct from the second location on display unit 1202. Processing unit 1208 is also configured to, in response to and while receiving the second input, provide (e.g., with audio enabling unit 1214), to audio unit 1216, second sound information to provide a second sound output with one or more characteristics that change in accordance with movement of the control user interface object from the second location on display unit 1202 to the third location on display unit 1202.

In some embodiments, the one or more characteristics include a pitch of the first sound output, a volume of the first sound output, and/or a distribution of the first sound output over a plurality of spatial channels.

In some embodiments, audio unit 1216 is coupled with a plurality of speakers that corresponds to a plurality of spatial channels. Providing, to audio unit 1216, the first sound information to provide the first sound output includes determining (e.g., with audio enabling unit 1214) a distribution of the first sound output over the plurality of spatial channels in accordance with a direction of the movement of the control user interface object from the first location on display unit 1202 to the second location on display unit 1202.

In some embodiments, audio unit 1216 is coupled with a plurality of speakers that corresponds to a plurality of spatial channels. Providing, to audio unit 1216, the first sound information to provide the first sound output includes determining (e.g., with audio enabling unit 1214) a distribution of the first sound output over the plurality of spatial channels in accordance with a location of the control user interface object on display unit 1202 during the movement of the control user interface object from the second location on display unit 1202 to the third location on display unit 1202.

In some embodiments, providing, to audio unit 1216, the first sound information to provide the first sound output includes determining (e.g., with audio enabling unit 1214) a volume of the first sound output in accordance with a speed of the movement of the control user interface object from the first location on display unit 1202 to the second location on display unit 1202.

In some embodiments, the control user interface object is a thumb on a slider. A pitch of the first sound output changes in accordance with a position (e.g., location) of the control user interface object on the slider.

In some embodiments, the control user interface object is a thumb on a slider. The second location on display unit 1202 is not a terminus of the slider. Processing unit 1208 is configured to receive (e.g., with receiving unit 1212) an input (e.g., on touch-sensitive surface unit 1204) that corresponds to a respective interaction with the control user interface object on display unit 1202. Processing unit 1208 is configured to, in response to receiving the input that corresponds to the respective interaction with the control user interface object on display unit 1202, provide (e.g., with display enabling unit 1210), to display unit 1202, data to move the control user interface object, in accordance with the input, to a fourth location on display unit 1202, wherein the fourth location on display unit 1202 is a terminus of the slider; and provide (e.g., with audio enabling unit 1214), to audio unit 1216, sound information to provide a third sound output to indicate that the control user interface object is located at a terminus of the slider, wherein the third sound output is distinct from the first sound output.

In some embodiments, processing unit 1208 is configured to, in response to receiving the first input that corresponds to the first interaction with the control user interface object on display unit 1202, provide (e.g., with display enabling unit 1210), to display unit 1202, data to move the control user interface object, in accordance with the first input, from the first location on display unit 1202 to the second location on display unit 1202 distinct from the first location on display unit 1202, and visually distinguish (e.g., with display enabling unit 1210) the control user interface object in accordance with the first input during the movement of the control user interface object from the first location on display unit 1202 to the second location on display unit 1202.

In accordance with some embodiments, processing unit 1208 is configured to provide (e.g., with display enabling unit 1210), to display unit 1202, data to present a first user interface with a plurality of user interface objects, wherein a current focus is on a first user interface object of the plurality of user interface objects. Processing unit 1208 is configured to, while display unit 1202 is presenting the first user interface, receive (e.g., with receiving unit 1212) an input (e.g., on touch-sensitive surface unit 1204) that corresponds to a request to change a location of the current focus in the first user interface, the input having a direction and a magnitude. Processing unit 1208 is configured to, in response to receiving the input that corresponds to the request to change the location of the current focus in the first user interface, provide (e.g., with display enabling unit 1210), to display unit 1202), data to move the current focus from the first user interface object to a second user interface object, wherein the second user interface object is selected for the current focus in accordance with the direction and/or the magnitude of the input; and provide (e.g., with audio enabling unit 1214), to audio unit 1216, first sound information to provide a first sound output that corresponds to the movement of the current focus from the first user interface object to the second user interface object, wherein the first sound output is provided concurrently with display of the current focus moving from the first user interface object to the second user interface object. A pitch of the first sound output is determined (e.g., by audio enabling unit 1214) based at least in part on a size of the first user interface object, a type of the first user interface object, a size of the second user interface object, and/or a type of the second user interface object.

In some embodiments, the volume of the first sound output is determined (e.g., by audio enabling unit 1214) based on the magnitude of the input.

In some embodiments, the volume of the first sound output is reduced (e.g., by audio enabling unit 1214) in accordance with a determination that the magnitude of the input satisfies predefined input criteria.

In some embodiments, a distribution of the first sound output over a plurality of spatial channels is adjusted (e.g., by audio enabling unit 1214) in accordance with a location of the second user interface object in the first user interface.

In some embodiments, the pitch of the first sound output is determined (e.g., by audio enabling unit 1214) based on the size of the second user interface object and/or the type of the second user interface object. In response to receiving the input that corresponds to the request to change the location of the current focus in the first user interface, processing unit 1208 is configured to provide (e.g., with audio enabling unit 1214), to audio unit 1216, second sound information to provide a second sound output that corresponds to the movement of the current focus from the first user interface object to the second user interface object, wherein a pitch of the second sound output is determined based at least in part on the size of the first user interface object and/or the type of the first user interface object.

In some embodiments, a release of the first sound output is reduced (e.g., by audio enabling unit 1214) in accordance with a determination that the magnitude of the input satisfies predefined input criteria.

In some embodiments, processing unit 1208 is configured to, in response to receiving one or more inputs (e.g., by receiving unit 1212) that correspond to one or more requests to change the location of the current focus in the first user interface, provide (e.g., with display enabling unit 1210), to display unit 1202, data to move the current focus from the second user interface object to a third user interface object; provide (e.g., with audio enabling unit 1214), to audio unit 1216, third sound information to provide a third sound output that corresponds to the movement of the current focus from the second user interface object to the third user interface object, wherein the third sound output is provided concurrently with display of the current focus moving from the second user interface object to the third user interface object; provide (e.g., with display enabling unit 1210), to display unit 1202, data to move the current focus from the third user interface object to a fourth user interface object; and provide (e.g., with audio enabling unit 1214), to audio unit 1216, fourth sound information to provide a fourth sound output that corresponds to the movement of the current focus from the third user interface object to the fourth user interface object, wherein the fourth sound output is provided concurrently with display of the current focus moving from the third user interface object to the fourth user interface object. A sound output that corresponds to the movement of the current focus to a largest object of the second user interface object, the third user interface object, and the fourth user interface object has a pitch that is lower than respective sound outputs that correspond to the movement of the current focus to the remaining two of the second user interface object, the third user interface object, and the fourth user interface object. A sound output that corresponds to the movement of the current focus to a smallest object of the second user interface object, the third user interface object, and the fourth user interface object has a pitch that is higher than respective sound outputs that correspond to the movement of the current focus to the remaining two of the second user interface object, the third user interface object, and the fourth user interface object.

In some embodiments, the first user interface with the plurality of user interface objects is included in a hierarchy of user interfaces. Processing unit 1208 is configured to, while display unit 1202 is presenting the first user interface with the plurality of user interface objects, receive (e.g., with receiving unit 1212) an input (e.g., on touch-sensitive surface unit 1204) that corresponds to a request to replace the first user interface with a second user interface in the hierarchy of user interfaces; and, in response to receiving the input that corresponds to the request to replace the first user interface with the second user interface, provide (e.g., with display enabling unit 1210), to display unit 1202, data to replace the first user interface with the second user interface; in accordance with a determination that the first user interface is located above the second user interface in the hierarchy of user interfaces, provide (e.g., with audio enabling unit 1214), to audio unit 1216, fifth sound information to provide a fifth sound output; and, in accordance with a determination that the first user interface is located below the second user interface in the hierarchy of user interfaces, provide (e.g., with audio enabling unit 1214), to audio unit 1216, sixth sound information to provide a sixth sound output that is distinct from the fifth sound output.

In some embodiments, processing unit 1208 is configured to, while display unit 1202 is presenting the first user interface, receive (e.g., with receiving unit 1212) an input (e.g., on touch-sensitive surface unit 1204) that corresponds to a request to activate a user interface object with the current focus; in response to receiving the input that corresponds to the request to activate a user interface object with the current focus: in accordance with a determination that the first user interface object is with the current focus, provide (e.g., with audio enabling unit 1214), to audio unit 1216, seventh sound information to provide a seventh sound output that corresponds to the activation of the first user interface object; and, in accordance with a determination that the second user interface object is with the current focus, provide, to audio unit 1216, eighth sound information to provide an eighth sound output that corresponds to the activation of the second user interface object. The eighth sound output is distinct from the seventh sound output. A relationship between one or more characteristics of a sound output that corresponds to a movement of the current focus to the first user interface object and the one or more characteristics of the second sound output corresponds to a relationship between the one or more characteristics of the seventh sound output and the one or more characteristics of the eighth sound output.

In accordance with some embodiments, processing unit 1208 is configured to provide (e.g., with display enabling unit 1210), to display unit 1202, data to present a first video information user interface that includes descriptive information about a first video; provide (e.g., with audio enabling unit 1214), to audio unit 1216, sound information to provide a first sound output, which corresponds to the first video, during presentation of the first video information user interface by display unit 1202; while display unit 1202 is presenting the first video information user interface that includes descriptive information about the first video, receive (e.g., with receiving unit 1212) an input (e.g., on touch-sensitive surface unit 1204) that corresponds to a request to playback the first video; in response to receiving the input that corresponds to the request to playback the first video, provide (e.g., with display enabling unit 1210), to display unit 1202, data to replace presentation of the first video information user interface with playback of the first video; during the playback of the first video, receive (e.g., with receiving unit 1212) an input (e.g., on touch-sensitive surface unit 1204) that corresponds to a request to display a second video information user interface about the first video; in response to receiving the input that corresponds to the request to display the second video information user interface about the first video, provide, to display unit 1202, data to replace the playback of the first video with the second video information user interface about the first video, and provide, to audio unit 1216, sound information to provide a second sound output, distinct from the first sound output, that corresponds to the first video, during presentation of the second video information user interface by display unit 1202.

In some embodiments, the first sound output and/or the second sound output are selected from soundtracks of the first video.

In some embodiments, the second sound output is a soundtrack of the first video that corresponds to a position in the first video being played when the input that corresponds to the request to display the second video information user interface is received.

In some embodiments, in accordance with a determination that the input that corresponds to the request to display the second video information user interface is received within a predetermined duration from an ending of the first video, an end credits soundtrack of the first video is selected (e.g., by audio enabling unit 1214) for the second sound output.

In some embodiments, processing unit 1208 is configured to, subsequent to initiating the playback of the first video, receive (e.g., with receiving unit 1212) an input (e.g., on touch-sensitive surface unit 1204) that corresponds to a request to pause the first video; and, in response to receiving the input that corresponds to the request to pause the first video, pause (e.g., with display enabling unit 1210) the playback of the first video at a first playback position in a timeline of the first video; provide (e.g., with display enabling unit 1210) to display unit 1202, data to present one or more selected still images from the first video, wherein the one or more selected still images are selected based on the first playback position at which the first video is paused; and provide (e.g., with audio enabling unit 1214), to audio unit 1216, sound information to provide a sound output that corresponds to a soundtrack of the first video at the first playback position.

In some embodiments, processing unit 1208 is configured to, subsequent to initiating the playback of the first video, receive (e.g., with receiving unit 1212) an input (e.g., on touch-sensitive surface unit 1204) that corresponds to a request to pause the first video; and, in response to receiving the input that corresponds to the request to pause the first video, pause (e.g., with display enabling unit 1210) the playback of the first video at a first playback position in a timeline of the first video; provide (e.g., with display enabling unit 1210), to display unit 1202, data to present one or more selected still images from the first video, wherein the one or more selected still images are selected based on the first playback position at which the first video is paused, and provide (e.g., with audio enabling unit 1214), to audio unit 1216, sound information to provide a sound output that corresponds to one or more characteristics of the first video at the first playback position.

In some embodiments, the first video information user interface includes a plurality of user interface objects. A first user interface object of the plurality of user interface objects is configured to, when selected, initiate electronic device 1200 providing (e.g., with audio enabling unit 1214), to audio unit 1216, sound information to provide a sound output that corresponds to at least a portion of a first soundtrack of the first video. A second user interface object of the plurality of user interface objects is configured to, when selected, initiate electronic device 1200 providing (e.g., with audio enabling unit 1214), to audio unit 1216, sound information to provide a sound output that corresponds to at least a portion of a second soundtrack, distinct from the first soundtrack, of the first video.

In some embodiments, the first sound output and/or the second sound output are selected based on one or more characteristics of the first video.

In some embodiments, processing unit 1208 is configured to, prior to display unit 1202 presenting the first video information user interface, provide, to display unit 1202, data to present a video selection user interface that includes representations of a plurality of videos; and receive (e.g., with receiving unit 1212) an input (e.g., on touch-sensitive surface unit 1204) that corresponds to a selection of a representation of the first video in the plurality of videos, wherein the first video information user interface for the first video is presented in response to receiving the input that corresponds to the selection of the representation of the first video.

Figure 13:
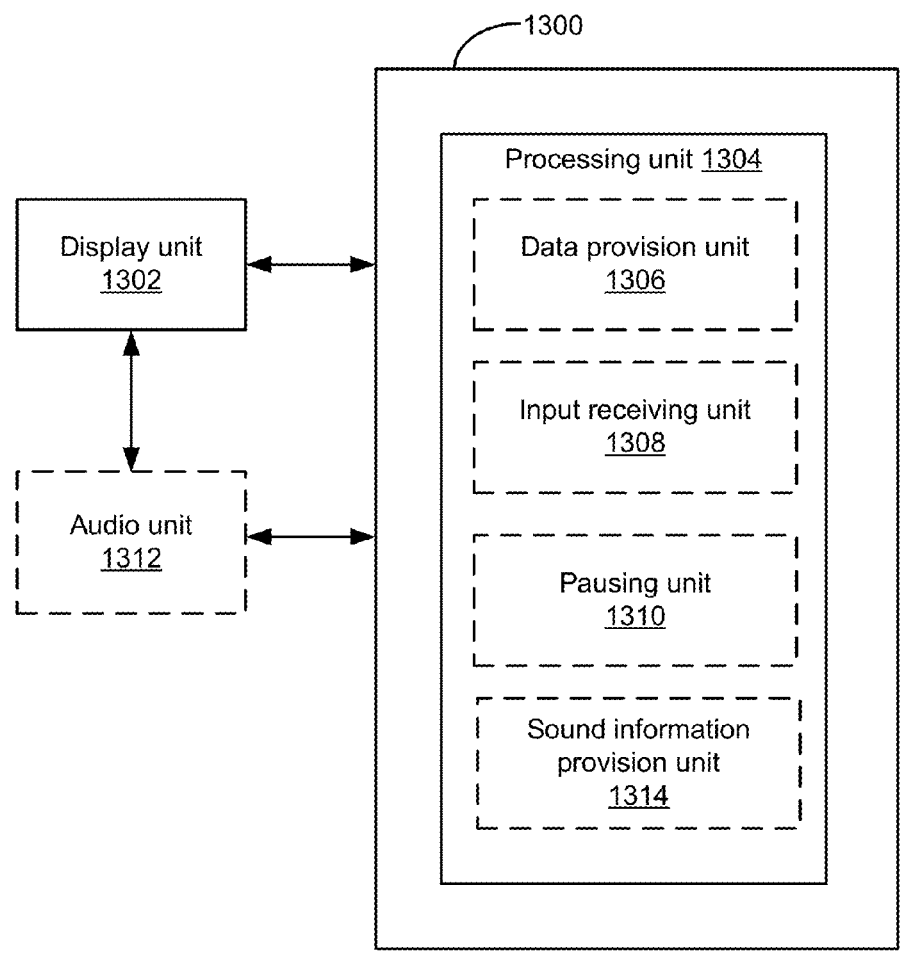
FIG. 13 is a functional block diagram of an electronic device in accordance with some embodiments.

In accordance with some embodiments, FIG. 13 shows a functional block diagram of electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, electronic device 1300 is in communication with a display unit 1302. Display unit 1302 is configured to display video playback information. In some embodiments, electronic device 1300 is in communication with an audio unit 1312. Electronic device 1300 includes a processing unit 1304 in communication with display unit 1302, and, in some embodiments, with audio unit 1312. In some embodiments, processing unit 1304 includes: a data provision unit 1306, an input receiving unit 1308, a pausing unit 1310, and a sound provision unit 1314.

Processing unit 1304 is configured to: provide (e.g., with data provision unit 1306), to display unit 1302, data to present a first video; while display unit 1302 is presenting the first video, receive (e.g., with input receiving unit 1308) an input that corresponds to a user request to pause the first video; in response to receiving the input that corresponds to the user request to pause the first video, pause (e.g. using pausing unit 1310) the presenting of the first video at a first playback position in a timeline of the first video; and, subsequent to pausing the presenting of the first video at the first playback position in the timeline of the first video and while the presenting of the first video is paused, provide (e.g., with data provision unit 1306), to display unit 1302, data to present a plurality of selected still images from the first video, wherein the plurality of selected still images are selected based on the first playback position at which the first video was paused.

In some embodiments, the plurality of selected still images is selected from a range of playback positions for the first video between the first playback position in the timeline and a second playback position in the timeline that precedes the first playback position.

In some embodiments, the second playback position in the timeline precedes the first playback position by a predetermined time interval.

In some embodiments, the second playback position in the timeline precedes the first playback position by a time interval that is determined subsequent to receiving the input that corresponds to the request to pause the first video.

In some embodiments, the plurality of selected still images of the video includes a still image that is not consecutive in the video to any other still images in the plurality of selected still images.

In some embodiments, the plurality of selected still images includes representative frames.

In some embodiments, device 1300 is in communication with audio unit 1312, and processing unit 1304 is further configured to provide (e.g., with sound information provision unit 1314), to audio unit 1312, sound information to provide a first sound output that corresponds to the first video being presented on display unit 1302.

In some embodiments, processing unit 1304 is configured to provide (e.g., with sound information provision unit 1314), to audio unit 1312, sound information to provide a sound output that is selected based on the first playback position at which the first video was paused.

In some embodiments, processing unit 1304 is configured to, subsequent to pausing the presenting of the first video at the first playback position in the timeline of the first video and while the presenting of the first video is paused, provide (e.g., using data provision unit 1306), to display unit 1302, data to present an animation indicating a transition to a slideshow mode.

In some embodiments, the animation indicating the transition to the slideshow mode includes a count-down clock.

In some embodiments, processing unit 1304 is configured to repeat provision (e.g., using data provision unit 1306), to display unit 1302, of the data to present the plurality of selected still images from the first video.

In some embodiments, processing unit 1304 is configured to provide (e.g., using data provision unit 1306), to display unit 1302, data to present a respective still image of the plurality of selected still images with a panning effect and/or a zooming effect.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C, 7A-7D, 8A-8C, 9A-9C, and 10A-10B are, optionally, implemented by components depicted in FIGS. 1A-1B or FIG. 10, or FIG. 11. For example, receiving operation 704, receiving operation 804, and receiving operation 910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with one or more processors and memory, wherein the device is in communication with a display and an audio system:
providing, to the display, data to present a first user interface with a plurality of user interface objects, wherein a current focus is on a first user interface object of the plurality of user interface objects;
while the display is presenting the first user interface, receiving an input that corresponds to a request to change a location of the current focus in the first user interface, the input having a direction and a magnitude; and,
in response to receiving the input that corresponds to the request to change the location of the current focus in the first user interface:
providing, to the display, data to move the current focus from the first user interface object to a second user interface object, wherein the second user interface object is selected for the current focus in accordance with the direction and/or the magnitude of the input; and
providing, to the audio system, first sound information to provide a first sound output that corresponds to the movement of the current focus from the first user interface object to the second user interface object, wherein the first sound output is provided concurrently with display of the current focus moving from the first user interface object to the second user interface object, and a pitch of the first sound output is determined based at least in part on a size of the first user interface object and/or a size of the second user interface object.

2. The method of claim 1, wherein a volume of the first sound output is determined based on the magnitude of the input.

3. The method of claim 2, wherein the volume of the first sound output is reduced in accordance with a determination that the magnitude of the input satisfies predefined input criteria.

4. The method of claim 1, wherein a distribution of the first sound output over a plurality of spatial channels is adjusted in accordance with a location of the second user interface object in the first user interface.

5. The method of claim 1, wherein:
the pitch of the first sound output is determined based on the size of the second user interface object; and
the method includes, in response to receiving the input that corresponds to the request to change the location of the current focus in the first user interface, providing, to the audio system, second sound information to provide a second sound output that corresponds to the movement of the current focus from the first user interface object to the second user interface object, wherein a pitch of the second sound output is determined based at least in part on the size of the first user interface object.

6. The method of claim 1, wherein a release of the first sound output is reduced in accordance with a determination that the magnitude of the input satisfies predefined input criteria.

7. The method of claim 1, including:
in response to receiving one or more inputs that correspond to one or more requests to change the location of the current focus in the first user interface:

providing, to the display, data to move the current focus from the second user interface object to a third user interface object;
providing, to the audio system, third sound information to provide a third sound output that corresponds to the movement of the current focus from the second user interface object to the third user interface object, wherein the third sound output is provided concurrently with display of the current focus moving from the second user interface object to the third user interface object;
providing, to the display, data to move the current focus from the third user interface object to a fourth user interface object; and
providing, to the audio system, fourth sound information to provide a fourth sound output that corresponds to the movement of the current focus from the third user interface object to the fourth user interface object, wherein the fourth sound output is provided concurrently with display of the current focus moving from the third user interface object to the fourth user interface object, wherein:
 a sound output that corresponds to the movement of the current focus to a largest object of the second user interface object, the third user interface object, and the fourth user interface object has a pitch that is lower than respective sound outputs that correspond to the movement of the current focus to the remaining two of the second user interface object, the third user interface object, and the fourth user interface object; and
 a sound output that corresponds to the movement of the current focus to a smallest object of the second user interface object, the third user interface object, and the fourth user interface object has a pitch that is higher than respective sound outputs that correspond to the movement of the current focus to the remaining two of the second user interface object, the third user interface object, and the fourth user interface object.

8. The method of claim 1, including:
while the display is presenting the first user interface with the plurality of user interface objects, wherein the first user interface with the plurality of user interface objects is included in a hierarchy of user interfaces:
 receiving an input that corresponds to a request to replace the first user interface with a second user interface in the hierarchy of user interfaces; and,
in response to receiving the input that corresponds to the request to replace the first user interface with the second user interface:
 providing, to the display, data to replace the first user interface with the second user interface;
 in accordance with a determination that the first user interface is located above the second user interface in the hierarchy of user interfaces, providing, to the audio system, fifth sound information to provide a fifth sound output; and,
 in accordance with a determination that the first user interface is located below the second user interface in the hierarchy of user interfaces, providing, to the audio system, sixth sound information to provide a sixth sound output that is distinct from the fifth sound output.

9. The method of claim 1, including:
while the display is presenting the first user interface, receiving an input that corresponds to a request to activate a user interface object with the current focus;
in response to receiving the input that corresponds to the request to activate a user interface object with the current focus:
 in accordance with a determination that the first user interface object is with the current focus, providing, to the audio system, seventh sound information to provide a seventh sound output that corresponds to the activation of the first user interface object; and,
 in accordance with a determination that the second user interface object is with the current focus, providing, to the audio system, eighth sound information to provide an eighth sound output that corresponds to the activation of the second user interface object, wherein:
  the eighth sound output is distinct from the seventh sound output; and
  a relationship between one or more characteristics of a sound output that corresponds to a movement of the current focus to the first user interface object and the one or more characteristics of the second sound output corresponds to a relationship between the one or more characteristics of the seventh sound output and the one or more characteristics of the eighth sound output.

10. An electronic device in communication with a display and an audio system, the device comprising:
one or more processors; and
memory storing one or more programs for execution by the one or more processors, the one or more programs including instructions for:
 providing, to the display, data to present a first user interface with a plurality of user interface objects, wherein a current focus is on a first user interface object of the plurality of user interface objects;
 while the display is presenting the first user interface, receiving an input that corresponds to a request to change a location of the current focus in the first user interface, the input having a direction and a magnitude; and,
 in response to receiving the input that corresponds to the request to change the location of the current focus in the first user interface:
  providing, to the display, data to move the current focus from the first user interface object to a second user interface object, wherein the second user interface object is selected for the current focus in accordance with the direction and/or the magnitude of the input; and,
  providing, to the audio system, first sound information to provide a first sound output that corresponds to the movement of the current focus from the first user interface object to the second user interface object, wherein the first sound output is provided concurrently with display of the current focus moving from the first user interface object to the second user interface object, and a pitch of the first sound output is determined based at least in part on a size of the first user interface object and/or a size of the second user interface object.

11. A non-transitory computer readable storage medium storing one or more programs, the one or more programs comprising instructions which, when executed by an electronic device that is in communication with a display and an audio system, cause the electronic device to:
provide, to the display, data to present a first user interface with a plurality of user interface objects, wherein a current focus is on a first user interface object of the plurality of user interface objects;
while the display is presenting the first user interface, receive an input that corresponds to a request to change a location of the current focus in the first user interface, the input having a direction and a magnitude; and,
in response to receiving the input that corresponds to the request to change the location of the current focus in the first user interface:
provide, to the display, data to move the current focus from the first user interface object to a second user interface object, wherein the second user interface object is selected for the current focus in accordance with the direction and/or the magnitude of the input; and,
provide, to the audio system, first sound information to provide a first sound output that corresponds to the movement of the current focus from the first user interface object to the second user interface object, wherein the first sound output is provided concurrently with display of the current focus moving from the first user interface object to the second user interface object, and a pitch of the first sound output is determined based at least in part on a size of the first user interface object and/or a size of the second user interface object.

12. The device of claim 10, wherein a volume of the first sound output is determined based on the magnitude of the input.

13. The device of claim 12, wherein the volume of the first sound output is reduced in accordance with a determination that the magnitude of the input satisfies predefined input criteria.

14. The device of claim 10, wherein a distribution of the first sound output over a plurality of spatial channels is adjusted in accordance with a location of the second user interface object in the first user interface.

15. The device of claim 10, wherein:
the pitch of the first sound output is determined based on the size of the second user interface object; and
the device includes instructions for, in response to receiving the input that corresponds to the request to change the location of the current focus in the first user interface, providing, to the audio system, second sound information to provide a second sound output that corresponds to the movement of the current focus from the first user interface object to the second user interface object, wherein a pitch of the second sound output is determined based at least in part on the size of the first user interface object.

16. The device of claim 10, wherein a release of the first sound output is reduced in accordance with a determination that the magnitude of the input satisfies predefined input criteria.

17. The device of claim 10, including instructions for:
in response to receiving one or more inputs that correspond to one or more requests to change the location of the current focus in the first user interface:
providing, to the display, data to move the current focus from the second user interface object to a third user interface object;
providing, to the audio system, third sound information to provide a third sound output that corresponds to the movement of the current focus from the second user interface object to the third user interface object, wherein the third sound output is provided concurrently with display of the current focus moving from the second user interface object to the third user interface object;
providing, to the display, data to move the current focus from the third user interface object to a fourth user interface object; and
providing, to the audio system, fourth sound information to provide a fourth sound output that corresponds to the movement of the current focus from the third user interface object to the fourth user interface object, wherein the fourth sound output is provided concurrently with display of the current focus moving from the third user interface object to the fourth user interface object, wherein:
a sound output that corresponds to the movement of the current focus to a largest object of the second user interface object, the third user interface object, and the fourth user interface object has a pitch that is lower than respective sound outputs that correspond to the movement of the current focus to the remaining two of the second user interface object, the third user interface object, and the fourth user interface object; and
a sound output that corresponds to the movement of the current focus to a smallest object of the second user interface object, the third user interface object, and the fourth user interface object has a pitch that is higher than respective sound outputs that correspond to the movement of the current focus to the remaining two of the second user interface object, the third user interface object, and the fourth user interface object.

18. The device of claim 10, including instructions for:
while the display is presenting the first user interface with the plurality of user interface objects, wherein the first user interface with the plurality of user interface objects is included in a hierarchy of user interfaces:
receiving an input that corresponds to a request to replace the first user interface with a second user interface in the hierarchy of user interfaces; and, in response to receiving the input that corresponds to the request to replace the first user interface with the second user interface:
providing, to the display, data to replace the first user interface with the second user interface;
in accordance with a determination that the first user interface is located above the second user interface in the hierarchy of user interfaces, providing, to the audio system, fifth sound information to provide a fifth sound output; and,
in accordance with a determination that the first user interface is located below the second user interface in the hierarchy of user interfaces, providing, to the audio system, sixth sound information to provide a sixth sound output that is distinct from the fifth sound output.

19. The device of claim 10, including instructions for:
while the display is presenting the first user interface, receiving an input that corresponds to a request to activate a user interface object with the current focus;
in response to receiving the input that corresponds to the request to activate a user interface object with the current focus:

in accordance with a determination that the first user interface object is with the current focus, providing, to the audio system, seventh sound information to provide a seventh sound output that corresponds to the activation of the first user interface object; and, in accordance with a determination that the second user interface object is with the current focus, providing, to the audio system, eighth sound information to provide an eighth sound output that corresponds to the activation of the second user interface object, wherein:

the eighth sound output is distinct from the seventh sound output; and a relationship between one or more characteristics of a sound output that corresponds to a movement of the current focus to the first user interface object and the one or more characteristics of the second sound output corresponds to a relationship between the one or more characteristics of the seventh sound output and the one or more characteristics of the eighth sound output.

20. The storage medium of claim 11, wherein a volume of the first sound output is determined based on the magnitude of the input.

21. The storage medium of claim 20, wherein the volume of the first sound output is reduced in accordance with a determination that the magnitude of the input satisfies pre-defined input criteria.

22. The storage medium of claim 11, wherein a distribution of the first sound output over a plurality of spatial channels is adjusted in accordance with a location of the second user interface object in the first user interface.

23. The storage medium of claim 11, wherein:

the pitch of the first sound output is determined based on the size of the second user interface object; and the storage medium includes instructions which, when executed by the electronic device, cause the electronic device to, in response to receiving the input that corresponds to the request to change the location of the current focus in the first user interface, provide, to the audio system, second sound information to provide a second sound output that corresponds to the movement of the current focus from the first user interface object to the second user interface object, wherein a pitch of the second sound output is determined based at least in part on the size of the first user interface object.

24. The storage medium of claim 11, wherein a release of the first sound output is reduced in accordance with a determination that the magnitude of the input satisfies pre-defined input criteria.

25. The storage medium of claim 11, including instructions which, when executed by the electronic device, cause the electronic device to:

in response to receiving one or more inputs that correspond to one or more requests to change the location of the current focus in the first user interface:

provide, to the display, data to move the current focus from the second user interface object to a third user interface object;

provide, to the audio system, third sound information to provide a third sound output that corresponds to the movement of the current focus from the second user interface object to the third user interface object, wherein the third sound output is provided concurrently with display of the current focus moving from the second user interface object to the third user interface object;

provide, to the display, data to move the current focus from the third user interface object to a fourth user interface object; and provide, to the audio system, fourth sound information to provide a fourth sound output that corresponds to the movement of the current focus from the third user interface object to the fourth user interface object, wherein the fourth sound output is provided concurrently with display of the current focus moving from the third user interface object to the fourth user interface object, wherein:

a sound output that corresponds to the movement of the current focus to a largest object of the second user interface object, the third user interface object, and the fourth user interface object has a pitch that is lower than respective sound outputs that correspond to the movement of the current focus to the remaining two of the second user interface object, the third user interface object, and the fourth user interface object; and a sound output that corresponds to the movement of the current focus to a smallest object of the second user interface object, the third user interface object, and the fourth user interface object has a pitch that is higher than respective sound outputs that correspond to the movement of the current focus to the remaining two of the second user interface object, the third user interface object, and the fourth user interface object.

26. The storage medium of claim 11, including instructions which, when executed by the electronic device, cause the electronic device to:

while the display is presenting the first user interface with the plurality of user interface objects, wherein the first user interface with the plurality of user interface objects is included in a hierarchy of user interfaces:

receive an input that corresponds to a request to replace the first user interface with a second user interface in the hierarchy of user interfaces; and, in response to receiving the input that corresponds to the request to replace the first user interface with the second user interface:

provide, to the display, data to replace the first user interface with the second user interface;

in accordance with a determination that the first user interface is located above the second user interface in the hierarchy of user interfaces, provide, to the audio system, fifth sound information to provide a fifth sound output; and, in accordance with a determination that the first user interface is located below the second user interface in the hierarchy of user interfaces, provide, to the audio system, sixth sound information to provide a sixth sound output that is distinct from the fifth sound output.

27. The storage medium of claim 11, including instructions which, when executed by the electronic device, cause the electronic device to:

while the display is presenting the first user interface, receive an input that corresponds to a request to activate a user interface object with the current focus;

in response to receiving the input that corresponds to the request to activate a user interface object with the current focus:

in accordance with a determination that the first user interface object is with the current focus, provide, to the audio system, seventh sound information to provide a seventh sound output that corresponds to the activation of the first user interface object; and,
in accordance with a determination that the second user interface object is with the current focus, provide, to the audio system, eighth sound information to provide an eighth sound output that corresponds to the activation of the second user interface object, wherein:
the eighth sound output is distinct from the seventh sound output; and
a relationship between one or more characteristics of a sound output that corresponds to a movement of the current focus to the first user interface object and the one or more characteristics of the second sound output corresponds to a relationship between the one or more characteristics of the seventh sound output and the one or more characteristics of the eighth sound output.

\* \* \* \* \*